US009788324B2

(12) United States Patent
Yan et al.

(10) Patent No.: US 9,788,324 B2
(45) Date of Patent: Oct. 10, 2017

(54) CARRIER STATUS INDICATION METHOD AND DEVICE

(71) Applicant: Huawei Technologies Co., Ltd., Shenzhen, Guangdong (CN)

(72) Inventors: Zhiyu Yan, Beijing (CN); Sha Ma, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 79 days.

(21) Appl. No.: 14/987,201

(22) Filed: Jan. 4, 2016

(65) Prior Publication Data

US 2016/0119930 A1    Apr. 28, 2016

Related U.S. Application Data

(63) Continuation of application No. PCT/CN2013/084758, filed on Sep. 30, 2013, and a
(Continued)

(51) Int. Cl.
*H04W 72/04* (2009.01)
*H04L 5/00* (2006.01)
(Continued)

(52) U.S. Cl.
CPC ....... *H04W 72/0453* (2013.01); *H04L 1/0061* (2013.01); *H04L 5/0098* (2013.01); *H04W 72/1289* (2013.01); *H04W 74/006* (2013.01)

(58) Field of Classification Search
CPC ............... H04L 5/0098; H04L 1/0061; H04W 72/0453; H04W 72/1289; H04W 74/006
See application file for complete search history.

(56) References Cited

U.S. PATENT DOCUMENTS 5,649,295 A    7/1997 Shober et al.
2009/0257387 A1    10/2009 Gholmieh et al.
(Continued)

FOREIGN PATENT DOCUMENTS

CN    101909356 A    12/2010
CN    101998270 A    3/2011
(Continued)

OTHER PUBLICATIONS

Ericsson, ST-Ericsson, "Summary of the email discussion [68#23] LTE: CC activation/deactivation," 3GPP TSG-RAN WG2 #68bis, Tdoc R2-100079, Valencia, Spain, Jan. 18-22, 2010, 17 pages.
(Continued)

*Primary Examiner* — Khaled Kassim
*Assistant Examiner* — Syed S Ali

(57) ABSTRACT

Embodiments of the present invention relate to the field of communications, and disclose a carrier status indication method and a device, which can reduce a delay of indicating an activated state or a deactivated state of a carrier, and improve efficiency of indicating the activated state or deactivated state of the carrier. A specific solution is as follows: determining, by a base station, a carrier status of a carrier, where the carrier status is an activated state or a deactivated state; indicating first carrier information to user equipment by using a downlink physical control channel, where the first carrier information includes the carrier status of the carrier, and the first carrier information is used to enable the user equipment to perform communication on the carrier according to the carrier status. The present invention is applied in a carrier switching process.

14 Claims, 12 Drawing Sheets

Related U.S. Application Data continuation of application No. PCT/CN2013/078588, filed on Jul. 1, 2013.

(51) Int. Cl.
  *H04L 1/00* (2006.01)
  *H04W 72/12* (2009.01)
  *H04W 74/00* (2009.01)

(56) References Cited

U.S. PATENT DOCUMENTS

| | | | |
|---|---|---|---|
| 2011/0070845 A1* | 3/2011 | Chen | H04L 5/001 455/91 |
| 2011/0092240 A1 | 4/2011 | Aiba et al. | |
| 2011/0267955 A1 | 11/2011 | Dalsgaard | |
| 2012/0051313 A1 | 3/2012 | Seo et al. | |
| 2012/0281667 A1 | 11/2012 | Chang et al. | |
| 2013/0012186 A1 | 1/2013 | Kim et al. | |
| 2013/0016841 A1 | 1/2013 | Fong et al. | |
| 2013/0039202 A1* | 2/2013 | Feuersanger | H04L 5/001 370/252 |
| 2013/0094479 A1* | 4/2013 | Park | H04L 1/0077 370/336 |
| 2013/0242947 A1* | 9/2013 | Chen | H04W 72/04 370/335 |
| 2014/0233520 A1* | 8/2014 | Lee | H04B 7/0456 370/329 |
| 2014/0355493 A1* | 12/2014 | Niu | H04L 12/189 370/280 |
| 2015/0055485 A1* | 2/2015 | Kim | H04W 48/12 370/242 |
| 2017/0155489 A1* | 6/2017 | Kim | H04L 5/0055 |
| 2017/0163320 A1* | 6/2017 | Nagata | H04B 7/0456 |
| 2017/0163330 A1* | 6/2017 | Raleigh | H04B 7/15528 |
| 2017/0170889 A1* | 6/2017 | Kim | H04B 7/0626 |
| 2017/0170931 A1* | 6/2017 | Kusashima | H04L 1/1861 |
| 2017/0171845 A1* | 6/2017 | Seo | H04B 7/15507 |

FOREIGN PATENT DOCUMENTS

| | | |
|---|---|---|
| CN | 102123524 A | 7/2011 |
| CN | 102149208 A | 8/2011 |
| WO | 2011/063244 A2 | 5/2011 |
| WO | 2011/098236 A1 | 8/2011 |
| WO | 2011/119003 A2 | 9/2011 |

OTHER PUBLICATIONS

3GPP TS 36.211 V11.3.0 (Jun. 2013), 3rd Generation Partnership Project; Technical Specification Group Radio Access Network; Evolved Universal Terrestrial Radio Access (E-UTRA); Physical Channels and Modulation (Release 11), 108 pages.

3GPP TS 36.213 V11.3.0 (Jun. 2013), 3rd Generation Partnership Project; Technical Specification Group Radio Access Network; Evolved Universal Terrestrial Radio Access (E-UTRA); Physical layer procedures (Release 11), 176 pages.

* cited by examiner

CARRIER STATUS INDICATION METHOD AND DEVICE

CROSS-REFERENCE TO RELATED APPLICATIONS

This application is a continuation of International Application No. PCT/CN2013/084758, filed on Sep. 30, 2013, and is also a continuation of International Application No. PCT/CN2013/078588, filed on Jul. 1, 2013, both of which are hereby incorporated by reference in their entireties.

TECHNICAL FIELD

The present invention relates to the field of communications, and in particular, to a carrier status indication method and a device.

BACKGROUND

With a carrier aggregation (CA) technology introduced in the 3rd Generation Partnership Project (3GPP), user equipment (UE) may use multiple component carriers (CC) simultaneously to perform uplink and/or downlink communication, which can improve a transmission rate and quality of service of a network, ensure rates of common users without significantly increasing configuration bandwidth, and provide a higher throughput for some users.

CCs in carrier aggregation are classified, according to functions carried in the CCs, into a primary cell (PCell) and a secondary cell (SCell). The PCell is a cell that works on a primary frequency band; UE performs an initial connection establishment process or starts a connection re-establishment process in the cell, and the cell is indicated as a primary cell during a cell handover process. The SCell is a cell that works on a secondary frequency band; once a radio resource control (RRC) connection is established, the secondary cell may be configured, to provide an extra radio resource for UE. If CA is not configured, UE in an RRC connected state has only one serving cell, that is, the PCell; if CA is configured, a serving cell set includes the PCell and the SCell. In addition, carriers corresponding to the Pcell and Scell may be carriers of a same base station or may be carriers of different base stations. For example, carriers corresponding to the Pcell and Scell may be carriers of a macro base station, or may be carriers of small cell (Small cell) base stations that are densely deployed in a hotspot area of a macro cell on the basis of a conventional macro base station cellular network to meet a rapidly growing traffic requirement. When carriers corresponding to the Pcell and Scell are carriers of different base stations, a small cell base station may indicate a carrier status of a carrier of the small cell base station to a macro base station by means of an ideal backhaul or a non-ideal backhaul.

After an initial security activation procedure, the SCell cell may be activated or deactivated by using an RRC connection reconfiguration message. When user equipment has relatively low traffic, some CCs may be released (that is, deactivated), so as to avoid a waste of carrier resources and electric quantity of the user equipment in CA.

In the prior art, a combination of a user equipment SCell carrier activation or deactivation mechanism, which is based on a Media Access Control element (MAC CE), and deactivation timers (Deactivation Timers) is provided. An SCell activation or deactivation operation based on a MAC CE is controlled by a base station, and user equipment may acquire activation information or deactivation information according to an activation indication received from the base station.

However, to implement real-time dynamic adjustment of a carrier, fast carrier selection (FCS) needs to be implemented during carrier activation or deactivation. However, in the prior art, when an activated state or a deactivated state of a carrier is indicated to user equipment by using a MAC CE, a transmission delay of MAC signaling can hardly meet a requirement of the FCS, and indicating the activated or deactivated state of the carrier of a base station to user equipments one by one occupies channel resources and increases network load, which further increases an activation delay or a deactivation delay of the carrier; therefore, efficiency of indicating an activated state or a deactivated state of a carrier is relatively low.

SUMMARY

Embodiments of the present invention provide a carrier status indication method and a device, which can reduce a delay of indicating an activated state or a deactivated state of a carrier, and improve efficiency of indicating the activated state or deactivated state of the carrier.

According to a first aspect, a carrier status indication method is provided, including:

determining, by a base station, a carrier status of a carrier, where the carrier status is an activated state or a deactivated state; and indicating, by the base station, first carrier information to user equipment by using a downlink physical control channel, where the first carrier information includes the carrier status of the carrier, and the first carrier information is used to enable the user equipment to perform communication on the carrier according to the carrier status.

With reference to the first aspect, in a first possible implementation manner, the carrier status, included in the first carrier information, of the carrier includes: a carrier status of a carrier of the base station and/or a carrier status of a carrier of another base station.

With reference to the first aspect or the foregoing first possible implementation manner, in a second possible implementation manner, the indicating, by the base station, first carrier information to user equipment by using a downlink physical control channel includes:

indicating, by the base station, the first carrier information to the user equipment by using downlink control information carried by the downlink physical control channel, where the downlink control information is downlink control information that is obtained by scrambling a cyclic redundancy check CRC of the downlink physical control channel by using a carrier activation radio network temporary identifier RNTI, and the carrier activation RNTI is an RNTI that is used to identify the downlink physical control channel carrying the first carrier information and that is configured by the base station for the user equipment.

With reference to the first aspect or any one of the foregoing possible implementation manners, in a third possible implementation manner, the carrier is all carriers, whose carrier statuses can change, of the base station and/or the another base station; and before the indicating the first carrier information to the user equipment by using the downlink physical control channel, the method further includes:

indicating, by the base station, a carrier sequence number of each carrier in all the carriers to the user equipment by means of broadcasting;

or, sending, by the base station, a carrier sequence number of each carrier in all the carriers to the user equipment by using dedicated signaling, where the carrier sequence number is a sequence number configured for each carrier, each carrier has a different carrier sequence number, and the carrier sequence number and the carrier identified by the carrier sequence number are uniform for all user equipments served by the base station.

With reference to the first aspect or any one of the foregoing implementation manners, in a fourth possible implementation manner, the carrier sequence number is identified according to a central frequency of the carrier corresponding to the carrier sequence number, and/or, the carrier sequence number is identified according to a physical identifier of the carrier corresponding to the carrier sequence number.

With reference to the first aspect or any one of the foregoing implementation manners, in a fifth possible implementation manner, the carrier status, included in the first carrier information, of the carrier is carrier statuses of all the carriers.

With reference to the first aspect or any one of the foregoing possible implementation manners, in a sixth possible implementation manner, the user equipment is multiple user equipments, the carrier status, included in the first carrier information, of the carrier is carrier statuses of all carriers whose carrier statuses can change, where all the carriers whose carrier statuses can change are directed, in the base station, against each user equipment in the multiple user equipments.

With reference to the first aspect or any one of the foregoing possible implementation manners, in a seventh possible implementation manner, before the indicating, by the base station, first carrier information to user equipment by using a downlink physical control channel, the method further includes:

indicating, by the base station to the user equipment by using second signaling, a quantity of carriers whose carrier statuses have changed, where the carrier status, included in the first carrier information, of the carrier is the carrier statuses of the carriers whose carrier statuses have changed.

With reference to the first aspect or any one of the foregoing possible implementation manners, in an eighth possible implementation manner, the downlink control information is a downlink control information DCI format 3 or 3A; and a transmit power control TPC command in the DCI format 3 or 3A is also used for indicating the carrier status of the carrier.

With reference to the first aspect or any one of the foregoing possible implementation manners, in a ninth possible implementation manner, the indicating, by the base station, first carrier information to user equipment by using the downlink physical control channel includes:

indicating, by the base station, the first carrier information of the carrier of each user equipment in the multiple user equipments to the multiple user equipments by using multiple TPC commands in the downlink control information carried by the downlink physical control channel.

With reference to the first aspect or any one of the foregoing possible implementation manners, in a tenth possible implementation manner, before the indicating, by the base station, first carrier information to user equipment by using the downlink physical control channel, the method further includes:

notifying, by the base station, each user equipment of a carrier activation index by using first signaling, where the carrier activation index is used to indicate a location, in the downlink control information, of the first carrier information of the carrier of each user equipment.

With reference to the first aspect or any one of the foregoing possible implementation manners, in an eleventh possible implementation manner, the carrier status of the carrier is identified by means of a bitmap;

or, the carrier status of the carrier is encoded in unified encoding mode.

With reference to the first aspect or any one of the foregoing possible implementation manners, in a twelfth possible implementation manner, before the indicating, by the base station, the first carrier information to the user equipment by using the downlink physical control channel, the method further includes:

sending, by the base station, instruction information to the user equipment by using higher layer signaling, where the instruction information is used to instruct the user equipment to determine, by means of detection, the downlink physical control channel for indicating the first carrier information.

With reference to the first aspect or any one of the foregoing possible implementation manners, in a thirteenth possible implementation manner, before the indicating, by the base station, first carrier information to user equipment by using a downlink physical control channel, the method further includes:

repeatedly encoding, by the base station, the downlink control information;

or, encoding, by the base station, the downlink control information by using a first coding bit rate, where the first coding bit rate is lower than a second coding bit rate, and the second coding bit rate is a common coding bit rate;

or, repeatedly sending, by the base station to the user equipment, the downlink control information that is encoded.

With reference to the first aspect or any one of the foregoing possible implementation manners, in a fourteenth possible implementation manner, the downlink physical control channel includes: a physical downlink control channel PDCCH or an enhanced physical downlink control channel E-PDCCH.

According to a second aspect, a carrier status indication method is further provided, including:

determining, by a base station, a carrier status of a carrier, where the carrier status is an activated state or a deactivated state; and indicating, by the base station, first carrier information to user equipment by using a physical downlink shared channel that is indicated by a physical broadcast channel or by downlink control information, where the first carrier information includes the carrier status of the carrier, and the first carrier information is used to enable the user equipment to perform communication on the carrier according to the carrier status, where the downlink control information is carried by a downlink physical control channel, the downlink control information is obtained by scrambling a cyclic redundancy check CRC of the downlink physical control channel by using a carrier activation radio network temporary identifier RNTI, and the first carrier information is obtained by means of scrambling using the carrier activation RNTI; the carrier activation RNTI is an RNTI that is used to identify the downlink physical control channel carrying the downlink control information and that is configured by the base station for the user equipment, and an RNTI that is used to identify the first carrier information on the physical downlink shared channel and that is configured by the base station for the user equipment.

With reference to the second aspect, in a first possible implementation manner, the carrier status, included in the first carrier information, of the carrier includes: a carrier status of a carrier of the base station and/or a carrier status of a carrier of another base station.

With reference to the second aspect or the foregoing first possible implementation manner, in a second possible implementation manner, the carrier is all carriers, whose carrier statuses can change, of the base station and/or the another base station; and before the indicating, by the base station, first carrier information to user equipment by using a physical downlink shared channel that is indicated by a physical broadcast channel or by downlink control information, the method further includes:

indicating, by the base station, a carrier sequence number of each carrier in all the carriers to the user equipment by means of broadcasting;

or, sending, by the base station, a carrier sequence number of each carrier in all the carriers to the user equipment by using dedicated signaling, where the carrier sequence number is a sequence number configured for each carrier, each carrier has a different carrier sequence number, and the carrier sequence number and the carrier identified by the carrier sequence number are uniform for all user equipments served by the base station.

With reference to the second aspect or the foregoing second possible implementation manner, in a third possible implementation manner, the carrier sequence number is identified according to a central frequency of the carrier corresponding to the carrier sequence number, and/or, the carrier sequence number is identified according to a physical identifier of the carrier corresponding to the carrier sequence number.

With reference to the second aspect or any one of the foregoing possible implementation manners, in a fourth possible implementation manner, the carrier status, included in the first carrier information, of the carrier is carrier statuses of all the carriers.

With reference to the second aspect or any one of the foregoing first possible implementation manners, in a fifth possible implementation manner, before the indicating, by the base station, first carrier information to user equipment by using a physical downlink shared channel that is indicated by a physical broadcast channel or by downlink control information, the method further includes:

indicating, by the base station to the user equipment by using first signaling, a quantity of carriers whose carrier statuses have changed, where the carrier status, included in the first carrier information, of the carrier is the carrier statuses of the carriers whose carrier statuses have changed.

With reference to the second aspect or any one of the foregoing first possible implementation manners, in a sixth possible implementation manner, before the indicating, by the base station, first carrier information to user equipment by using a physical downlink shared channel that is indicated by a physical broadcast channel or by downlink control information, the method further includes:

sending, by the base station, instruction information to the user equipment by using higher layer signaling, where the instruction information is used to instruct the user equipment to determine, by means of detection, the physical downlink shared channel for indicating the first carrier information.

With reference to the second aspect or any one of the foregoing first possible implementation manners, in a seventh possible implementation manner, before the indicating, by the base station, first carrier information to user equipment by using a physical downlink shared channel that is indicated by downlink control information, the method further includes:

repeatedly encoding, by the base station, the downlink control information;

or, encoding, by the base station, the downlink control information by using a first coding bit rate, where the first coding bit rate is lower than a second coding bit rate, and the second coding bit rate is a common coding bit rate;

or, repeatedly sending, by the base station to the user equipment, the downlink control information that is encoded.

With reference to the second aspect or any one of the foregoing possible implementation manners, in an eighth possible implementation manner, the downlink physical control channel includes: a physical downlink control channel PDCCH or an enhanced physical downlink control channel E-PDCCH.

According to a third aspect, a carrier status indication method is further provided, including:

receiving, by user equipment, a downlink physical control channel sent by a base station, where the downlink physical control channel includes first carrier information, the first carrier information includes a carrier status of a carrier, and the carrier status is an activated state or a deactivated state; and performing, by the user equipment, communication on the carrier according to the first carrier information.

With reference to the third aspect, in a first possible implementation manner, the carrier status, included in the first carrier information, of the carrier includes: a carrier status of a carrier of the base station and/or a carrier status of a carrier of another base station.

With reference to the third aspect or the foregoing first possible implementation manner, in a second possible implementation manner, the receiving, by user equipment, a downlink physical control channel sent by a base station, where the downlink physical control channel includes first carrier information, includes:

descrambling, by the user equipment, a cyclic redundancy check CRC of the downlink physical control channel by using a carrier activation radio network temporary identifier RNTI, to identify the downlink physical control channel for carrying the first carrier information; and acquiring, by the user equipment, downlink control information carried by the identified downlink physical control channel, where the downlink control information includes the first carrier information, where the carrier activation RNTI is an RNTI that is used to identify the downlink physical control channel carrying the first carrier information and that is configured by the base station for the user equipment.

With reference to the third aspect or the foregoing first possible implementation manner, in a third possible implementation manner, the carrier is all carriers, whose carrier statuses can change, of the base station and/or the another base station; and before the receiving, by user equipment, a downlink physical control channel sent by a base station, the method further includes:

acquiring, by the user equipment, a carrier sequence number that is of each carrier in all the carriers and that is indicated by the base station to the user equipment by means of broadcasting;

or, receiving, by the user equipment, dedicated signaling sent by the base station, where the dedicated signaling carries a carrier sequence number of each carrier in all the carriers, where the carrier sequence number is a sequence number configured for each carrier, each carrier has a different carrier sequence number, and the carrier sequence number and the carrier identified by the carrier sequence number are uniform for all user equipments served by the base station.

With reference to the third aspect or any one of the foregoing possible implementation manners, in a fourth possible implementation manner, the carrier sequence number is identified according to a central frequency of the carrier corresponding to the carrier sequence number, and/or, the carrier sequence number is identified according to a physical identifier of the carrier corresponding to the carrier sequence number.

With reference to the third aspect or any one of the foregoing possible implementation manners, in a fifth possible implementation manner, the carrier status, included in the first carrier information, of the carrier is carrier statuses of all the carriers.

With reference to the third aspect or any one of the foregoing possible implementation manners, in a sixth possible implementation manner, the carrier status, included in the first carrier information, of the carrier is: carrier statuses of all carriers whose carrier statuses can change, which are directed against the user equipment and among all carriers whose carrier statuses can change.

With reference to the third aspect or any one of the foregoing possible implementation manners, in a seventh possible implementation manner, before the receiving, by user equipment, a downlink physical control channel sent by a base station, where the downlink physical control channel includes first carrier information, the method further includes:

receiving, by the user equipment, second signaling sent by the base station, where the second signaling carries a quantity of carriers whose carrier statuses have changed, where the carrier status, included in the first carrier information, of the carrier is the carrier statuses of the carriers whose carrier statuses have changed.

With reference to the third aspect or any one of the foregoing possible implementation manners, in an eighth possible implementation manner, the downlink control information is a downlink control information DCI format 3 or 3A; and a transmit power control TPC command in the DCI format 3 or 3A is also used for indicating the carrier status of the carrier.

With reference to the third aspect or any one of the foregoing possible implementation manners, in a ninth possible implementation manner, the receiving, by user equipment, a downlink physical control channel sent by a base station, where the downlink physical control channel includes first carrier information, includes:

receiving, by the user equipment, the downlink control information carried by the downlink physical control channel, and acquiring the TPC command in the downlink control information, where the TPC command is used for indicating the first carrier information of the carrier of the user equipment.

With reference to the third aspect or any one of the foregoing possible implementation manners, in a tenth possible implementation manner, before the receiving, by user equipment, a downlink physical control channel sent by a base station, where the downlink physical control channel includes first carrier information, the method further includes:

receiving, by the user equipment, first signaling sent by the base station, where the first signaling carries a carrier activation index; and determining, by the user equipment according to an indication of the carrier activation index, a location, in the downlink control information, of the first carrier information of the carrier of the user equipment.

With reference to the third aspect or any one of the foregoing possible implementation manners, in an eleventh possible implementation manner, after the receiving, by user equipment, a downlink physical control channel sent by a base station, where the downlink physical control channel includes first carrier information, the method further includes:

determining, by the user equipment, the carrier status of the carrier by means of a bitmap, where the carrier status of the carrier is identified by the base station by means of a bitmap;

or, determining, by the user equipment, the carrier status of the carrier in unified decoding mode, where the carrier status of the carrier is encoded by the base station in unified encoding mode corresponding to the unified decoding mode, where the carrier status is the activated state or the deactivated state.

With reference to the third aspect or any one of the foregoing possible implementation manners, in a twelfth possible implementation manner, before the receiving, by user equipment, a downlink physical control channel sent by a base station, the method further includes:

receiving, by the user equipment, instruction information that is sent by the base station by using higher layer signaling; and detecting, by the user equipment, downlink physical control channels according to the instruction information, to determine the downlink physical control channel for indicating the first carrier information, where the instruction information is used to instruct the user equipment to determine, by means of detection, the downlink physical control channel for indicating the first carrier information.

With reference to the third aspect or any one of the foregoing possible implementation manners, in a thirteenth possible implementation manner, the receiving, by user equipment, a downlink physical control channel sent by a base station includes:

receiving, by the user equipment, the downlink control information that is repeatedly encoded on the downlink physical control channel;

or, receiving, by the user equipment, the downlink control information that is encoded by using a first coding bit rate on the downlink physical control channel, where the first coding bit rate is lower than a second coding bit rate, and the second coding bit rate is a common coding bit rate;

or, receiving, by the user equipment from the base station, multiple pieces of the downlink control information that is encoded.

With reference to the third aspect or any one of the foregoing possible implementation manners, in a fourteenth possible implementation manner, the downlink physical control channel includes: a physical downlink control channel PDCCH or an enhanced physical downlink control channel E-PDCCH.

With reference to the third aspect or any one of the foregoing possible implementation manners, in a fifteenth possible implementation manner, the carrier status is the activated state or the deactivated state; and if the carrier status is the activated state, the performing, by the user equipment, communication on the carrier according to the first carrier information includes:

transmitting, by the user equipment, a sounding reference signal SRS on the carrier, where the SRS is used for channel state detection;

and/or, generating, by the user equipment, a channel state information CSI report on the carrier, where the CSI includes at least a channel quality indicator CQI, a precoding matrix indicator PMI, and a rank indication RI;

and/or, detecting, by the user equipment, a downlink physical control channel of the carrier, and/or, detecting, by the user equipment, a downlink physical control channel that indicates a scheduling result on the carrier.

With reference to the third aspect or any one of the foregoing possible implementation manners, in a sixteenth possible implementation manner, the carrier status is the activated state or the deactivated state; and if the carrier status is the deactivated state, the performing, by the user equipment, communication on the carrier according to the first carrier information includes:

stopping, by the user equipment, transmitting an SRS on the carrier;

and/or, stopping, by the user equipment, generating a CSI report on the carrier, where the CSI includes at least a CQI, a PMI, and an RI;

and/or, stopping, by the user equipment, detecting a downlink physical control channel of the carrier, and/or, stopping, by the user equipment, detecting a downlink physical control channel that indicates a scheduling result on the carrier;

and/or, stopping, by the user equipment, transmitting a random access channel RACH signal on the carrier, and/or, stopping, by the user equipment, transmitting an uplink shared channel on the carrier.

According to a fourth aspect, a carrier status indication method is further provided, including:

receiving, by user equipment, physical downlink shared channels, and determining the physical downlink shared channel for carrying first carrier information;

acquiring, by the user equipment, the first carrier information from the determined physical downlink shared channel, where the first carrier information includes the carrier status of the carrier, and the carrier status is an activated state or a deactivated state; and performing, by the user equipment, communication on the carrier according to the first carrier information.

With reference to the fourth aspect, in a first possible implementation manner, the carrier status, included in the first carrier information, of the carrier includes: a carrier status of a carrier of the base station and/or a carrier status of a carrier of another base station.

With reference to the fourth aspect or the foregoing first possible implementation manner, in a second possible implementation manner, the determining, by the user equipment, a physical downlink shared channel for carrying first carrier information includes:

descrambling, by the user equipment, a cyclic redundancy check CRC of a downlink physical control channel by using a carrier activation radio network temporary identifier RNTI, to identify the downlink physical control channel for carrying downlink control information; and acquiring, by the user equipment, the downlink control information carried by the identified downlink physical control channel, and determining, according to the downlink control information, the physical downlink shared channel for carrying the first carrier information, where the downlink control information is used to indicate the physical downlink shared channel for carrying the first carrier information.

With reference to the fourth aspect or any one of the foregoing possible implementation manners, in a third possible implementation manner, the determining, by the user equipment, a physical downlink shared channel for carrying first carrier information includes:

receiving, by the user equipment, a physical broadcast channel, and determining, according to the physical broadcast channel, the physical downlink shared channel for carrying the first carrier information, where the physical broadcast channel is used to indicate the physical downlink shared channel for carrying the first carrier information.

With reference to the fourth aspect or any one of the foregoing possible implementation manners, in a fourth possible implementation manner, the acquiring, by the user equipment, the first carrier information from the determined physical downlink shared channel includes:

descrambling, by the user equipment, the determined physical downlink shared channel by using the carrier activation RNTI, to acquire the first carrier information.

With reference to the first aspect or any one of the foregoing possible implementation manners, in a fifth possible implementation manner, the carrier is all carriers, whose carrier statuses can change, of the base station and/or the another base station; and before the performing, by the user equipment, communication on the carrier according to the first carrier information, the method further includes:

acquiring, by the user equipment, a carrier sequence number that is of each carrier in all the carriers and that is indicated by the base station to the user equipment by means of broadcasting;

or, receiving, by the user equipment, dedicated signaling sent by the base station, where the dedicated signaling carries a carrier sequence number of each carrier in all the carriers, where the carrier sequence number is a sequence number configured for each carrier, each carrier has a different carrier sequence number, and the carrier sequence number and the carrier identified by the carrier sequence number are uniform for all user equipments served by the base station.

With reference to the fourth aspect or any one of the foregoing possible implementation manners, in a sixth possible implementation manner, the carrier sequence number is identified according to a central frequency of the carrier corresponding to the carrier sequence number;

and/or, the carrier sequence number is identified according to a physical identifier of the carrier corresponding to the carrier sequence number.

With reference to the fourth aspect or any one of the foregoing possible implementation manners, in a seventh possible implementation manner, the carrier status, included in the first carrier information, of the carrier is carrier statuses of all the carriers.

With reference to the fourth aspect or any one of the foregoing possible implementation manners, in an eighth possible implementation manner, before the performing, by the user equipment, communication on the carrier according to the first carrier information, the method further includes:

receiving, by the user equipment, first signaling sent by the base station, where the first signaling carries a quantity of carriers whose carrier statuses have changed, where the carrier status, included in the first carrier information, of the carrier is the carrier statuses of the carriers whose carrier statuses have changed.

With reference to the fourth aspect or any one of the foregoing possible implementation manners, in a ninth possible implementation manner, before the determining, by the user equipment, the physical downlink shared channel for carrying first carrier information, the method further includes:

receiving, by the user equipment, instruction information that is sent by the base station by using higher layer signaling, where the instruction information is used to instruct the user equipment to detect the downlink physical control channel for indicating the physical downlink shared channel or the physical broadcast channel for indicating the physical downlink shared channel; and detecting the downlink physical control channel or the physical broadcast channel according to the instruction information, to determine the physical downlink shared channel for carrying the first carrier information.

With reference to the fourth aspect or any one of the foregoing possible implementation manners, in a tenth possible implementation manner, before the receiving, by user equipment, physical downlink shared channels, the method further includes:

receiving, by the user equipment, the downlink control information that is repeatedly encoded on the downlink physical control channel;

or, receiving, by the user equipment, the downlink control information that is encoded by using a first coding bit rate on the downlink physical control channel, where the first coding bit rate is lower than a second coding bit rate, and the second coding bit rate is a common coding bit rate;

or, receiving, by the user equipment from the base station, multiple pieces of the downlink control information that is encoded.

With reference to the fourth aspect or any one of the foregoing possible implementation manners, in an eleventh possible implementation manner, the downlink physical control channel includes: a physical downlink control channel PDCCH or an enhanced physical downlink control channel E-PDCCH.

With reference to the fourth aspect or any one of the foregoing possible implementation manners, in a twelfth possible implementation manner, the carrier status is the activated state or the deactivated state; and if the carrier status is the activated state, the performing, by the user equipment, communication on the carrier according to the first carrier information includes:

transmitting, by the user equipment, a sounding reference signal SRS on the carrier, where the SRS is used for channel state detection;

and/or, generating, by the user equipment, a channel state information CSI report on the carrier, where the CSI includes at least a channel quality indicator CQI, a precoding matrix indicator PMI, and a rank indication RI;

and/or, detecting, by the user equipment, a downlink physical control channel of the carrier;

and/or, detecting, by the user equipment, a downlink physical control channel that indicates a scheduling result on the carrier.

With reference to the fourth aspect or any one of the foregoing possible implementation manners, in a thirteenth possible implementation manner, the carrier status is the activated state or the deactivated state; and if the carrier status is the deactivated state, the performing, by the user equipment, communication on the carrier according to the first carrier information includes:

stopping, by the user equipment, transmitting an SRS on the carrier;

and/or, stopping, by the user equipment, generating a CSI report on the carrier, where the CSI includes at least a CQI, a PMI, and an RI;

and/or, stopping, by the user equipment, detecting a downlink physical control channel of the carrier;

and/or, stopping, by the user equipment, detecting a downlink physical control channel that indicates a scheduling result on the carrier;

and/or, stopping, by the user equipment, transmitting a random access channel RACH signal on the carrier, and/or, stopping, by the user equipment, transmitting an uplink shared channel on the carrier.

According to a fifth aspect, a base station is further provided, including:

a determining unit, configured to determine a carrier status of a carrier, where the carrier status is an activated state or a deactivated state; and a sending unit, configured to indicate first carrier information to user equipment by using a downlink physical control channel, where the first carrier information includes the carrier status, determined by the determining unit, of the carrier, and the first carrier information is used to enable the user equipment to perform communication on the carrier according to the carrier status.

With reference to the fifth aspect, in a first possible implementation manner, the carrier status, included in the first carrier information, of the carrier includes: a carrier status of a carrier of the base station and/or a carrier status of a carrier of another base station.

With reference to the fifth aspect or the foregoing first possible implementation manner, in a second possible implementation manner, the sending unit is further configured to indicate the first carrier information to the user equipment by using downlink control information carried by the downlink physical control channel, where the downlink control information is downlink control information that is obtained by scrambling a cyclic redundancy check CRC of the downlink physical control channel by using a carrier activation radio network temporary identifier RNTI, and the carrier activation RNTI is an RNTI that is used to identify the downlink physical control channel carrying the first carrier information and that is configured by the base station for the user equipment.

With reference to the fifth aspect or any one of the foregoing possible implementation manners, in a third possible implementation manner, the carrier sent by the sending unit is all carriers, whose carrier statuses can change, of the base station and/or the another base station; and the sending unit is further configured to: before indicating the first carrier information to the user equipment by using the downlink physical control channel, indicate a carrier sequence number of each carrier in all the carriers to the user equipment by means of broadcasting;

or, the sending unit is further configured to: before indicating the first carrier information to the user equipment by using the downlink physical control channel, send a carrier sequence number of each carrier in all the carriers to the user equipment by using dedicated signaling, where the carrier sequence number is a sequence number configured for each carrier, each carrier has a different carrier sequence number, and the carrier sequence number and the carrier identified by the carrier sequence number are uniform for all user equipments served by the base station.

With reference to the fifth aspect or any one of the foregoing possible implementation manners, in a fourth possible implementation manner, the carrier sequence number sent by the sending unit is identified according to a central frequency of the carrier corresponding to the carrier sequence number;

and/or, the carrier sequence number sent by the sending unit is identified according to a physical identifier of the carrier corresponding to the carrier sequence number.

With reference to the fifth aspect or any one of the foregoing possible implementation manners, in a fifth possible implementation manner, the carrier status, included in the first carrier information sent by the sending unit, of the carrier is carrier statuses of all the carriers.

With reference to the fifth aspect or any one of the foregoing possible implementation manners, in a sixth possible implementation manner, the user equipment is multiple user equipments, the carrier status, included in the first carrier information sent by the sending unit, of the carrier is carrier statuses of all carriers whose carrier statuses can change, where all the carriers whose carrier statuses can change are directed, in the base station, against each user equipment in the multiple user equipments.

With reference to the fifth aspect or any one of the foregoing possible implementation manners, in a seventh possible implementation manner, the sending unit is further configured to: before indicating the first carrier information to the user equipment by using the downlink physical control channel, indicate, to the user equipment by using second signaling, a quantity of carriers whose carrier statuses have changed, where the carrier status, included in the first carrier information, of the carrier is the carrier statuses of the carriers whose carrier statuses have changed.

With reference to the fifth aspect or any one of the foregoing possible implementation manners, in an eighth possible implementation manner, the downlink control information carried by the downlink physical control channel sent by the sending unit is a downlink control information DCI format 3 or 3A; and a transmit power control TPC command in the DCI format 3 or 3A is also used for indicating the carrier status of the carrier.

With reference to the fifth aspect or any one of the foregoing possible implementation manners, in a ninth possible implementation manner, the sending unit is further configured to indicate the first carrier information of the carrier of each user equipment in the multiple user equipments to the multiple user equipments by using multiple TPC commands in the downlink control information carried by the downlink physical control channel.

With reference to the fifth aspect or any one of the foregoing possible implementation manners, in a tenth possible implementation manner, the sending unit is further configured to: before indicating the first carrier information to the user equipment by using the downlink physical control channel, notify each user equipment of a carrier activation index by using first signaling, where the carrier activation index is used to indicate a location, in the downlink control information, of the first carrier information of the carrier of each user equipment.

With reference to the fifth aspect or any one of the foregoing possible implementation manners, in an eleventh possible implementation manner, the carrier status, sent by the sending unit, of the carrier is identified by means of a bitmap;

or, the carrier status, sent by the sending unit, of the carrier is encoded in unified encoding mode.

With reference to the fifth aspect or any one of the foregoing possible implementation manners, in a twelfth possible implementation manner, the sending unit is further configured to: before indicating the first carrier information to the user equipment by using the downlink physical control channel, send instruction information to the user equipment by using higher layer signaling, where the instruction information is used to instruct the user equipment to determine, by means of detection, the downlink physical control channel for indicating the first carrier information.

With reference to the fifth aspect or any one of the foregoing possible implementation manners, in a thirteenth possible implementation manner, the base station further includes:

an encoding unit, configured to: before the sending unit indicates the first carrier information to the user equipment by using the downlink physical control channel, encode the downlink control information, where the encoding unit is further configured to repeatedly encode the downlink control information;

or, the encoding unit is further configured to encode the downlink control information by using a first coding bit rate, where the first coding bit rate is lower than a second coding bit rate, and the second coding bit rate is a common coding bit rate;

or, the sending unit is further configured to repeatedly send the downlink control information encoded by the encoding unit to the user equipment.

With reference to the fifth aspect or any one of the foregoing possible implementation manners, in a fourteenth possible implementation manner, the downlink physical control channel includes: a physical downlink control channel PDCCH or an enhanced physical downlink control channel E-PDCCH.

According to a sixth aspect, a base station is further provided, including:

a determining unit, configured to determine a carrier status of a carrier, where the carrier status determined by the determining unit is an activated state or a deactivated state; and a sending unit, configured to indicate first carrier information to user equipment by using a physical downlink shared channel that is indicated by a physical broadcast channel or by downlink control information, where the first carrier information sent by the sending unit includes the carrier status, determined by the determining unit, of the carrier, and the first carrier information is used to enable the user equipment to perform communication on the carrier according to the carrier status, where the downlink control information is carried by a downlink physical control channel, the downlink control information sent by the sending unit is obtained by scrambling a cyclic redundancy check CRC of the downlink physical control channel by using a carrier activation radio network temporary identifier RNTI, and the first carrier information sent by the sending unit is obtained by means of scrambling using the carrier activation RNTI; the carrier activation RNTI is an RNTI that is used to identify the downlink physical control channel carrying the downlink control information and that is configured by the base station for the user equipment, and an RNTI that is used to identify the first carrier information on the physical downlink shared channel and that is configured by the base station for the user equipment.

With reference to the sixth aspect, in a first possible implementation manner, the carrier status, included in the first carrier information, of the carrier includes: a carrier status of a carrier of the base station and/or a carrier status of a carrier of another base station, where the carrier status of the carrier of the another base station is received by the base station from the another base station.

With reference to the sixth aspect or the foregoing first possible implementation manner, in a second possible implementation manner, the carrier is all carriers, whose carrier statuses can change, of the base station and/or the another base station; and the sending unit is further configured to: before indicating the first carrier information to the user equipment by using the physical downlink shared channel that is indicated by the physical broadcast channel or by the downlink control information, indicate a carrier sequence number of each carrier in all the carriers to the user equipment by means of broadcasting;

or, the sending unit is further configured to: before indicating the first carrier information to the user equipment by using the physical downlink shared channel that is indicated by the physical broadcast channel or by the downlink control information, send a carrier sequence number of each carrier in all the carriers to the user equipment by using dedicated signaling, where the carrier sequence number is a sequence number configured for each carrier, each carrier has a different carrier sequence number, and the carrier sequence number and the carrier identified by the carrier sequence number are uniform for all user equipments served by the base station.

With reference to the sixth aspect or any one of the foregoing possible implementation manners, in a third possible implementation manner, the carrier sequence number sent by the sending unit is identified according to a central frequency of the carrier corresponding to the carrier sequence number;

and/or, the carrier sequence number sent by the sending unit is identified according to a physical identifier of the carrier corresponding to the carrier sequence number.

With reference to the sixth aspect or any one of the foregoing possible implementation manners, in a fourth possible implementation manner, the carrier status, included in the first carrier information sent by the sending unit, of the carrier is carrier statuses of all the carriers.

With reference to the sixth aspect or any one of the foregoing possible implementation manners, in a fifth possible implementation manner, the sending unit is further configured to: before the sending unit indicates the first carrier information to the user equipment by using the physical downlink shared channel that is indicated by the physical broadcast channel or by the downlink control information, indicate, to the user equipment by using first signaling, a quantity of carriers whose carrier statuses have changed, where the carrier status, included in the first carrier information, of the carrier is the carrier statuses of the carriers whose carrier statuses have changed.

With reference to the sixth aspect or any one of the foregoing possible implementation manners, in a sixth possible implementation manner, the sending unit is further configured to: before the sending unit indicates the first carrier information to the user equipment by using the physical downlink shared channel that is indicated by the physical broadcast channel or by the downlink control information, send instruction information to the user equipment by using higher layer signaling, where the instruction information is used to instruct the user equipment to determine, by means of detection, the physical downlink shared channel for indicating the first carrier information.

With reference to the sixth aspect or any one of the foregoing possible implementation manners, in a seventh possible implementation manner, the base station further includes:

an encoding unit, configured to: before the sending unit indicates the first carrier information to the user equipment by using the physical downlink shared channel that is indicated by the downlink control information, encode the downlink control information, where the encoding unit is further configured to repeatedly encode the downlink control information;

or, the encoding unit is further configured to encode the downlink control information by using a first coding bit rate, where the first coding bit rate is lower than a second coding bit rate, and the second coding bit rate is a common coding bit rate;

or, the sending unit is further configured to repeatedly send the downlink control information encoded by the encoding unit to the user equipment.

With reference to the sixth aspect or any one of the foregoing possible implementation manners, in an eighth possible implementation manner, the downlink physical control channel includes: a physical downlink control channel PDCCH or an enhanced physical downlink control channel E-PDCCH.

According to a seventh aspect, user equipment is further provided, including:

a receiving unit, configured to receive a downlink physical control channel sent by a base station, where the downlink physical control channel received by the receiving unit includes first carrier information, the first carrier information includes a carrier status of a carrier, and the carrier status is an activated state or a deactivated state; and a communications unit, configured to perform communication on the carrier according to the first carrier information received by the receiving unit.

With reference to the seventh aspect, in a first possible implementation manner, the carrier status, included in the first carrier information, of the carrier includes: a carrier status of a carrier of the base station and/or a carrier status of a carrier of another base station.

With reference to the seventh aspect or the first possible implementation manner of the seventh aspect, in a second possible implementation manner, the receiving unit includes:

an identification module, configured to descramble a cyclic redundancy check CRC of the downlink physical control channel by using a carrier activation radio network temporary identifier RNTI, to identify the downlink physical control channel for carrying the first carrier information; and an acquiring module, configured to acquire downlink control information carried by the downlink physical control channel identified by the identification module, where the downlink control information includes the first carrier information, where the carrier activation RNTI is an RNTI that is used to identify the downlink physical control channel carrying the first carrier information and that is configured by the base station for the user equipment.

With reference to the seventh aspect or the foregoing first possible implementation manner, in a third possible implementation manner, the carrier received by the receiving unit is all carriers, whose carrier statuses can change, of the base station and/or the another base station; and the receiving unit is further configured to: before receiving the downlink physical control channel sent by the base station, acquire a carrier sequence number that is of each carrier in all the carriers and that is indicated by the base station to the user equipment by means of broadcasting;

or, receive dedicated signaling sent by the base station, where the dedicated signaling carries a carrier sequence number of each carrier in all the carriers, where the carrier sequence number is a sequence number configured for each carrier, each carrier has a different carrier sequence number, and the carrier sequence number and the carrier identified by the carrier sequence number are uniform for all user equipments served by the base station.

With reference to the seventh aspect or any one of the foregoing possible implementation manners, in a fourth possible implementation manner, the carrier sequence number received by the receiving unit is identified according to a central frequency of the carrier corresponding to the carrier sequence number, and/or, the carrier sequence number received by the receiving unit is identified according to a physical identifier of the carrier corresponding to the carrier sequence number.

With reference to the seventh aspect or any one of the foregoing possible implementation manners, in a fifth possible implementation manner, the carrier status, included in the first carrier information, of the carrier is carrier statuses of all the carriers.

With reference to the seventh aspect or any one of the foregoing possible implementation manners, in a sixth possible implementation manner, the carrier status, included in the first carrier information received by the receiving unit, of the carrier is: carrier statuses of all carriers whose carrier statuses can change, which are directed against the user equipment and among all carriers whose carrier statuses can change.

With reference to the seventh aspect or any one of the foregoing possible implementation manners, in a seventh possible implementation manner, the receiving unit is further configured to: before receiving the downlink physical control channel sent by the base station, where the downlink physical control channel includes the first carrier information, receive second signaling sent by the base station, where the second signaling carries a quantity of carriers whose carrier statuses have changed, where the carrier status, included in the first carrier information, of the carrier, is the carrier statuses of the carriers whose carrier statuses have changed.

With reference to the seventh aspect or any one of the foregoing possible implementation manners, in an eighth possible implementation manner, the downlink control information carried by the downlink physical control channel received by the receiving unit is a downlink control information DCI format 3 or 3A; and a transmit power control TPC command in the DCI format 3 or 3A is also used for indicating the carrier status of the carrier.

With reference to the seventh aspect or any one of the foregoing possible implementation manners, in a ninth possible implementation manner, the receiving unit is further configured to: receive the downlink control information carried by the downlink physical control channel, and acquire the TPC command in the downlink control information, where the TPC command is used to indicate the first carrier information of the carrier of the user equipment.

With reference to the seventh aspect or any one of the foregoing possible implementation manners, in a tenth possible implementation manner, the receiving unit is further configured to: before receiving the downlink physical control channel sent by the base station, where the downlink physical control channel includes the first carrier information, receive first signaling sent by the base station, where the first signaling carries a carrier activation index; and the user equipment further includes:

a determining unit, configured to determine a location, in the downlink control information, of the first carrier information of the carrier of the user equipment according to an indication of the carrier activation index received by the receiving unit.

With reference to the seventh aspect or any one of the foregoing possible implementation manners, in an eleventh possible implementation manner, the determining unit is further configured to: after the receiving unit receives the downlink physical control channel sent by the base station, where the downlink physical control channel includes the first carrier information, determine the carrier status of the carrier by means of a bitmap, where the carrier status of the carrier is identified by the base station by means of a bitmap; or, determine the carrier status of the carrier in unified decoding mode, where the carrier status of the carrier is encoded by the base station in unified encoding mode corresponding to the unified decoding mode, where the carrier status received by the receiving unit is the activated state or the deactivated state.

With reference to the seventh aspect or any one of the foregoing possible implementation manners, in a twelfth possible implementation manner, the receiving unit is further configured to: before receiving the downlink physical control channel sent by the base station, receive instruction information that is sent by the base station by using higher layer signaling; and the determining unit is further configured to detect downlink physical control channels according to the instruction information received by the receiving unit, to determine the downlink physical control channel for indicating the first carrier information, where the instruction information received by the receiving unit is used to instruct the user equipment to determine, by means of detection, the downlink physical control channel for indicating the first carrier information.

With reference to the seventh aspect or any one of the foregoing possible implementation manners, in a thirteenth possible implementation manner, the receiving unit is further configured to receive the downlink control information that is repeatedly encoded on the downlink physical control channel;

or, receive the downlink control information that is encoded by using a first coding bit rate on the downlink physical control channel, where the first coding bit rate is lower than a second coding bit rate, and the second coding bit rate is a common coding bit rate;

or, receive, from the base station, multiple pieces of the downlink control information that is encoded.

With reference to the seventh aspect or any one of the foregoing possible implementation manners, in a fourteenth possible implementation manner, the downlink physical control channel includes: a physical downlink control channel PDCCH or an enhanced physical downlink control channel E-PDCCH.

With reference to the seventh aspect or any one of the foregoing possible implementation manners, in a fifteenth possible implementation manner, the carrier status received by the receiving unit is the activated state or the deactivated state; and the communications unit is further configured to: if the carrier status is the activated state, transmit a sounding reference signal SRS on the carrier, where the SRS is used for channel state detection; and/or, generate a channel state information CSI report on the carrier, where the CSI includes at least a channel quality indicator CQI, a precoding matrix indicator PMI, and a rank indication RI; and/or, detect a downlink physical control channel of the carrier; and/or, detect a downlink physical control channel that indicates a scheduling result on the carrier.

With reference to the seventh aspect or any one of the foregoing possible implementation manners, in a sixteenth possible implementation manner, the carrier status received by the receiving unit is the activated state or the deactivated state; and the communications unit is configured to: if the carrier status is the deactivated state, stop transmitting an SRS on the carrier, and/or, stop generating a CSI report on the carrier, where the CSI includes at least a CQI, a PMI, and an RI; and/or, stop detecting a downlink physical control channel of the carrier, and/or, stop detecting a downlink physical control channel that indicates a scheduling result on the carrier, and/or, stop transmitting a random access channel RACH signal on the carrier; and/or, stop transmitting an uplink shared channel on the carrier.

According to an eighth aspect, user equipment is further provided, including:

a receiving unit, configured to receive physical downlink shared channels;

a determining unit, configured to determine, in the physical downlink shared channels received by the receiving unit, a physical downlink shared channel for carrying first carrier information; and an acquiring unit, configured to acquire the first carrier information from the physical downlink shared channel determined by the determining unit, where the first carrier information acquired by the acquiring unit includes the carrier status of the carrier, and the carrier status is an activated state or a deactivated state; and a communications unit, configured to perform communication on the carrier according to the first carrier information acquired by the acquiring unit.

With reference to the eighth aspect, in a first possible implementation manner, the carrier status, included in the first carrier information, of the carrier includes: a carrier status of a carrier of the base station and/or a carrier status of a carrier of another base station.

With reference to the eighth aspect or the first possible implementation manner of the eighth aspect, in a second possible implementation manner, the determining unit includes:

an identification module, configured to descramble a cyclic redundancy check CRC of a downlink physical control channel by using a carrier activation radio network temporary identifier RNTI, to identify the downlink physical control channel for carrying downlink control information; and an acquiring module, configured to: acquire the downlink control information carried by the downlink physical control channel identified by the identification module, and determine, according to the downlink control information, the physical downlink shared channel for carrying the first carrier information, where the downlink control information acquired by the acquiring module is used to indicate the physical downlink shared channel for carrying the first carrier information.

With reference to the eighth aspect or any one of the foregoing possible implementation manners, in a third possible implementation manner, the determining unit includes:

a receiving module, configured to receive a physical broadcast channel; and a determining module, configured to determine, according to the physical broadcast channel received by the receiving module, the physical downlink shared channel for carrying the first carrier information, where the physical broadcast channel received by the receiving module is used to indicate the physical downlink shared channel for carrying the first carrier information.

With reference to the eighth aspect or any one of the foregoing possible implementation manners, in a fourth possible implementation manner, the acquiring unit is further configured to descramble the determined physical downlink shared channel by using the carrier activation RNTI, to acquire the first carrier information.

With reference to the eighth aspect or any one of the foregoing possible implementation manners, in a fifth possible implementation manner, the carrier acquired by the acquiring unit is all carriers, whose carrier statuses can change, of the base station and/or the another base station; and the receiving unit is further configured to: before the communications unit performs communication on the carrier according to the first carrier information, acquire a carrier sequence number that is of each carrier in all the carriers and that is indicated by the base station to the user equipment by means of broadcasting;

or, receive dedicated signaling sent by the base station, where the dedicated signaling carries a carrier sequence number of each carrier in all the carriers, where the carrier sequence number received by the receiving unit is a sequence number configured for each carrier, each carrier has a different carrier sequence number, and the carrier sequence number and the carrier identified by the carrier sequence number are uniform for all user equipments served by the base station.

With reference to the eighth aspect or any one of the foregoing possible implementation manners, in a sixth possible implementation manner, the carrier sequence number received by the receiving unit is identified by according to a central frequency of the carrier corresponding to the carrier sequence number;

and/or, the carrier sequence number received by the receiving unit is identified according to a physical identifier of the carrier corresponding to the carrier sequence number.

With reference to the eighth aspect or any one of the foregoing possible implementation manners, in a seventh possible implementation manner, the carrier status, included in the first carrier information received by the receiving unit, of the carrier is carrier statuses of all the carriers.

With reference to the eighth aspect or any one of the foregoing possible implementation manners, in an eighth possible implementation manner, the receiving unit is further configured to: before the communications unit performs communication on the carrier according to the first carrier information, receive first signaling sent by the base station, where the first signaling carries a quantity of carriers whose carrier statuses have changed, where the carrier status, included in the first carrier information acquired by the acquiring unit, of the carrier is the carrier statuses of the carriers whose carrier statuses have changed.

With reference to the eighth aspect or any one of the foregoing possible implementation manners, in a ninth possible implementation manner, the receiving unit is further configured to: before the determining unit determines the physical downlink shared channel for carrying the first carrier information, receive instruction information that is sent by the base station by using higher layer signaling, where the instruction information received by the receiving unit is used to instruct the user equipment to detect the downlink physical control channel for indicating the physical downlink shared channel or the physical broadcast channel for indicating the physical downlink shared channel; and the determining unit is further configured to detect the downlink physical control channel or the physical broadcast channel according to the instruction information received by the receiving unit, to determine the physical downlink shared channel for carrying the first carrier information.

With reference to the eighth aspect or any one of the foregoing possible implementation manners, in a tenth possible implementation manner, the receiving unit is further configured to: before receiving the physical downlink shared channel, receive the downlink control information that is repeatedly encoded on the downlink physical control channel;

or, receive the downlink control information that is encoded by using a first coding bit rate on the downlink physical control channel, where the first coding bit rate is lower than a second coding bit rate, and the second coding bit rate is a common coding bit rate;

or, receive, from the base station, multiple pieces of the downlink control information that is encoded.

With reference to the eighth aspect or any one of the foregoing possible implementation manners, in an eleventh possible implementation manner, the downlink physical control channel includes: a physical downlink control channel PDCCH or an enhanced physical downlink control channel E-PDCCH.

With reference to the eighth aspect or any one of the foregoing possible implementation manners, in a twelfth possible implementation manner, the carrier status acquired by the acquiring unit is the activated state or the deactivated state; and the communications unit is further configured to: if the carrier status is the activated state, transmit a sounding reference signal SRS on the carrier, where the SRS is used for channel state detection; and/or, generate a channel state information CSI report on the carrier, where the CSI includes at least a channel quality indicator CQI, a precoding matrix indicator PMI, and a rank indication RI; and/or, detect a downlink physical control channel of the carrier, and/or, detect a downlink physical control channel that indicates a scheduling result on the carrier.

With reference to the eighth aspect or any one of the foregoing possible implementation manners, in a thirteenth possible implementation manner, the carrier status acquired by the acquiring unit is the activated state or the deactivated state; and the communications unit is further configured to: if the carrier status is the deactivated state, stop transmitting an SRS on the carrier; and/or, stop generating a CSI report on the carrier, where the CSI includes at least a CQI, a PMI, and an RI; and/or, stop detecting a downlink physical control channel of the carrier, and/or, stop detecting a downlink physical control channel that indicates a scheduling result on the carrier; and/or, stop transmitting a random access channel RACH signal on the carrier; and/or, stop transmitting an uplink shared channel on the carrier.

According to a ninth aspect, a base station is further provided, including:

a processor, configured to determine a carrier status of a carrier, where the carrier status determined by the processor is an activated state or a deactivated state; and a transmitter, configured to indicate first carrier information to user equipment by using a downlink physical control channel, where the first carrier information includes the carrier status, determined by the processor, of the carrier, and the first carrier information is used to enable the user equipment to perform communication on the carrier according to the carrier status.

With reference to the ninth aspect, in a first possible implementation manner, the carrier status, included in the first carrier information, of the carrier includes: a carrier status of a carrier of the base station and/or a carrier status of a carrier of another base station.

With reference to the ninth aspect or the foregoing first possible implementation manner of the ninth aspect, in a second possible implementation manner, the transmitter is further configured to indicate the first carrier information to the user equipment by using downlink control information carried by the downlink physical control channel, where the downlink control information sent by the transmitter is downlink control information that is obtained by scrambling a cyclic redundancy check CRC of the downlink physical control channel by using a carrier activation radio network temporary identifier RNTI, and the carrier activation RNTI is an RNTI that is used to identify the downlink physical control channel carrying the first carrier information and that is configured by the base station for the user equipment.

With reference to the ninth aspect or any one of the foregoing possible implementation manners, in a third possible implementation manner, the carrier sent by the transmitter is all carriers, whose carrier statuses can change, of the base station and/or the another base station; and the transmitter is further configured to: before indicating the first carrier information to the user equipment by using the downlink physical control channel, indicate a carrier sequence number of each carrier in all the carriers to the user equipment by means of broadcasting;

or, send a carrier sequence number of each carrier in all the carriers to the user equipment by using dedicated signaling, where the carrier sequence number is a sequence number configured for each carrier, each carrier has a different carrier sequence number, and the carrier sequence number and the carrier identified by the carrier sequence number are uniform for all user equipments served by the base station.

With reference to the ninth aspect or any one of the foregoing possible implementation manners, in a fourth possible implementation manner, the carrier sequence number sent by the transmitter is identified according to a central frequency of the carrier corresponding to the carrier sequence number;

and/or, the carrier sequence number sent by the transmitter is identified according to a physical identifier of the carrier corresponding to the carrier sequence number.

With reference to the ninth aspect or any one of the foregoing possible implementation manners, in a fifth possible implementation manner, the carrier status, included in the first carrier information sent by the transmitter, of the carrier is carrier statuses of all the carriers.

With reference to the ninth aspect or any one of the foregoing possible implementation manners, in a sixth possible implementation manner, the user equipment is multiple user equipments, the carrier status, included in the first carrier information, of the carrier is carrier statuses of all carriers whose carrier statuses can change, where all the carriers whose carrier statuses can change are directed, in the base station, against each user equipment in the multiple user equipments.

With reference to the ninth aspect or any one of the foregoing possible implementation manners, in a seventh possible implementation manner, the transmitter is further configured to: before indicating the first carrier information to the user equipment by using the downlink physical control channel, indicate, to the user equipment by using second signaling, a quantity of carriers whose carrier statuses have changed, where the carrier status, included in the first carrier information, of the carrier is the carrier statuses of the carriers whose carrier statuses have changed.

With reference to the ninth aspect or any one of the foregoing possible implementation manners, in an eighth possible implementation manner, the downlink control information carried by the downlink physical control channel sent by the transmitter is a downlink control information DCI format 3 or 3A; and a transmit power control TPC command in the DCI format 3 or 3A is also used for indicating the carrier status of the carrier.

With reference to the ninth aspect or any one of the foregoing possible implementation manners, in a ninth possible implementation manner, the transmitter is further configured to indicate the first carrier information of the carrier of each user equipment in the multiple user equipments to the multiple user equipments by using multiple TPC commands in the downlink control information carried by the downlink physical control channel.

With reference to the ninth aspect or any one of the foregoing possible implementation manners, in a tenth possible implementation manner, the transmitter is further configured to: before indicating the first carrier information to the user equipment by using the downlink physical control channel, notify each user equipment of a carrier activation index by using first signaling, where the carrier activation index is used to indicate a location, in the downlink control information, of the first carrier information of the carrier of each user equipment.

With reference to the ninth aspect or any one of the foregoing possible implementation manners, in an eleventh possible implementation manner, the carrier status, included in the first carrier information sent by the transmitter, of the carrier is identified by means of a bitmap;

or, the carrier status, sent by the transmitter, of the carrier is encoded in unified encoding mode.

With reference to the ninth aspect or any one of the foregoing possible implementation manners, in a twelfth possible implementation manner, the transmitter is further configured to: before indicating the first carrier information to the user equipment by using the downlink physical control channel, send instruction information to the user equipment by using higher layer signaling, where the instruction information sent by the transmitter is used to instruct the user equipment to determine, by means of detection, the downlink physical control channel for indicating the first carrier information.

With reference to the ninth aspect or any one of the foregoing possible implementation manners, in a thirteenth possible implementation manner, the processor is further configured to: before the transmitter indicates the first carrier information to the user equipment by using the downlink physical control channel, encode the downlink control information, where the processor is further configured to repeatedly encode the downlink control information;

or, the processor is further configured to encode the downlink control information by using a first coding bit rate, where the first coding bit rate is lower than a second coding bit rate, and the second coding bit rate is a common coding bit rate;

or, the transmitter is further configured to repeatedly send the downlink control information encoded by the processor to the user equipment.

With reference to the ninth aspect or any one of the foregoing possible implementation manners, in a fourteenth possible implementation manner, the downlink physical control channel includes: a physical downlink control channel PDCCH or an enhanced physical downlink control channel E-PDCCH.

According to a tenth aspect, a base station is further provided, including:

a processor, configured to determine a carrier status of a carrier, where the carrier status determined by the processor is an activated state or a deactivated state; and a transmitter, configured to indicate first carrier information to user equipment by using a physical downlink shared channel that is indicated by a physical broadcast channel or by downlink control information, where the first carrier information sent by the transmitter includes the carrier status, determined by the processor, of the carrier, and the first carrier information is used to enable the user equipment to perform communication on the carrier according to the carrier status, where the downlink control information sent by the transmitter is carried by a downlink physical control channel, the downlink control information is obtained by scrambling a cyclic redundancy check CRC of the downlink physical control channel by using a carrier activation radio network temporary identifier RNTI, and the first carrier information is obtained by means of scrambling using the carrier activation RNTI; the carrier activation RNTI is an RNTI that is used to identify the downlink physical control channel carrying the downlink control information and that is configured by the base station for the user equipment, and an RNTI that is used to identify the first carrier information on the physical downlink shared channel and that is configured by the base station for the user equipment.

With reference to the tenth aspect, in a first possible implementation manner, the carrier status, included in the first carrier information, of the carrier includes: a carrier status of a carrier of the base station and/or a carrier status of a carrier of another base station.

With reference to the tenth aspect or any one of the foregoing possible implementation manners, in a second possible implementation manner, the carrier is all carriers, whose carrier statuses can change, of the base station and/or the another base station; and the transmitter is further configured to: before indicating the first carrier information to the user equipment by using the physical downlink shared channel that is indicated by the physical broadcast channel or by the downlink control information, indicate a carrier sequence number of each carrier in all the carriers to the user equipment by means of broadcasting;

or, send a carrier sequence number of each carrier in all the carriers to the user equipment by using dedicated signaling, where the carrier sequence number is a sequence number configured for each carrier, each carrier has a different carrier sequence number, and the carrier sequence number and the carrier identified by the carrier sequence number are uniform for all user equipments served by the base station.

With reference to the tenth aspect or any one of the foregoing possible implementation manners, in a third possible implementation manner, the carrier sequence number sent by the transmitter is identified according to a central frequency of the carrier corresponding to the carrier sequence number;

and/or, the carrier sequence number sent by the transmitter is identified according to a physical identifier of the carrier corresponding to the carrier sequence number.

With reference to the tenth aspect or any one of the foregoing possible implementation manners, in a fourth possible implementation manner, the carrier status, included in the first carrier information sent by the transmitter, of the carrier is carrier statuses of all the carriers.

With reference to the tenth aspect or any one of the foregoing possible implementation manners, in a fifth possible implementation manner, the transmitter is further configured to: before indicating the first carrier information to the user equipment by using the physical downlink shared channel that is indicated by the physical broadcast channel or by the downlink control information, indicate, to the user equipment by using first signaling, a quantity of carriers whose carrier statuses have changed, where the carrier status, included in the first carrier information sent by the transmitter, of the carrier is the carrier statuses of the carriers whose carrier statuses have changed.

With reference to the tenth aspect or any one of the foregoing possible implementation manners, in a sixth possible implementation manner, the transmitter is further configured to: before indicating the first carrier information to the user equipment by using the physical downlink shared channel that is indicated by the physical broadcast channel or by the downlink control information, send instruction information to the user equipment by using higher layer signaling, where the instruction information is used to instruct the user equipment to determine, by means of detection, the physical downlink shared channel for indicating the first carrier information.

With reference to the tenth aspect or any one of the foregoing possible implementation manners, in a seventh possible implementation manner, the processor is further configured to: before the transmitter indicates the first carrier information to the user equipment by using the physical downlink shared channel that is indicated by the downlink control information, encode the downlink control information, where the processor is further configured to repeatedly encode the downlink control information;

or, the processor is further configured to encode the downlink control information by using a first coding bit rate, where the first coding bit rate is lower than a second coding bit rate, and the second coding bit rate is a common coding bit rate;

or, the transmitter is further configured to repeatedly send the downlink control information encoded by the processor to the user equipment.

With reference to the tenth aspect or any one of the foregoing possible implementation manners, in an eighth possible implementation manner, the downlink physical control channel includes: a physical downlink control channel PDCCH or an enhanced physical downlink control channel E-PDCCH.

According to an eleventh aspect, user equipment is further provided, including:

a receiver, configured to receive a downlink physical control channel sent by a base station, where the downlink physical control channel received by the receiver includes first carrier information, the first carrier information includes a carrier status of a carrier, and the carrier status is an activated state or a deactivated state; and a processor, configured to perform communication on the carrier according to the first carrier information received by the receiver.

With reference to the eleventh aspect, in a first possible implementation manner, the carrier status, included in the first carrier information, of the carrier includes: a carrier status of a carrier of the base station and/or a carrier status of a carrier of another base station.

With reference to the eleventh aspect or any one of the foregoing possible implementation manners, in a second possible implementation manner, the processor is further configured to descramble a cyclic redundancy check CRC of the downlink physical control channel by using a carrier activation radio network temporary identifier RNTI, to identify the downlink physical control channel for carrying the first carrier information; and acquire the downlink control information carried by the identified downlink physical control channel, where the downlink control information includes the first carrier information, where the carrier activation RNTI is an RNTI that is used to identify the downlink physical control channel carrying the first carrier information and that is configured by the base station for the user equipment.

With reference to the eleventh aspect or any one of the foregoing possible implementation manners, in a third possible implementation manner, the carrier received by the receiver is all carriers, whose carrier statuses can change, of the base station and/or the another base station; and the receiver is further configured to: before receiving the downlink physical control channel sent by the base station, acquire a carrier sequence number that is of each carrier in all the carriers and that is indicated by the base station to the user equipment by means of broadcasting;

or, receive dedicated signaling sent by the base station, where the dedicated signaling carries a carrier sequence number of each carrier in all the carriers, where the carrier sequence number received by the receiver is a sequence number configured for each carrier, each carrier has a different carrier sequence number, and the carrier sequence number and the carrier identified by the carrier sequence number are uniform for all user equipments served by the base station.

With reference to the eleventh aspect or any one of the foregoing possible implementation manners, in a fourth possible implementation manner, the carrier sequence number received by the receiver is identified according to a central frequency of the carrier corresponding to the carrier sequence number;

and/or, the carrier sequence number received by the receiver is identified according to a physical identifier of the carrier corresponding to the carrier sequence number.

With reference to the eleventh aspect or any one of the foregoing possible implementation manners, in a fifth possible implementation manner, the carrier status, included in the first carrier information received by the receiver, of the carrier is carrier statuses of all the carriers.

With reference to the eleventh aspect or any one of the foregoing possible implementation manners, in a sixth possible implementation manner, the carrier status, included in the first carrier information received by the receiver, of the carrier is: carrier statuses of all carriers whose carrier statuses can change, which are directed against the user equipment and among all carriers whose carrier statuses can change.

With reference to the eleventh aspect or any one of the foregoing possible implementation manners, in a seventh possible implementation manner, the receiver is further configured to: before receiving the downlink physical control channel sent by the base station, where the downlink physical control channel includes the first carrier information, receive second signaling sent by the base station, where the second signaling carries a quantity of carriers whose carrier statuses have changed, where the carrier status, included in the first carrier information received by the receiver, of the carrier is the carrier statuses of the carriers whose carrier statuses have changed.

With reference to the eleventh aspect or any one of the foregoing possible implementation manners, in an eighth possible implementation manner, the downlink control information received by the receiver is a downlink control information DCI format 3 or 3A; and a transmit power control TPC command in the DCI format 3 or 3A is also used for indicating the carrier status of the carrier.

With reference to the eleventh aspect or any one of the foregoing possible implementation manners, in a ninth possible implementation manner, the receiver is further configured to: receive the downlink control information carried by the downlink physical control channel, and acquire the TPC command in the downlink control information, where the TPC command is used to indicate the first carrier information of the carrier of the user equipment.

With reference to the eleventh aspect or any one of the foregoing possible implementation manners, in a tenth possible implementation manner, the receiver is further configured to: before receiving the downlink physical control channel sent by the base station, where the downlink physical control channel includes the first carrier information, receive first signaling sent by the base station, where the first signaling carries a carrier activation index; and the processor is further configured to determine a location, in the downlink control information, of the first carrier information of the carrier of the user equipment according to an indication of the carrier activation index received by the receiver.

With reference to the eleventh aspect or any one of the foregoing possible implementation manners, in an eleventh possible implementation manner, the processor is further configured to: after the receiver receives the downlink physical control channel sent by the base station, where the downlink physical control channel includes the first carrier information, determine the carrier status of the carrier by means of a bitmap, where the carrier status of the carrier is identified by the base station by means of a bitmap;

or, determine the carrier status of the carrier in unified decoding mode, where the carrier status of the carrier is encoded by the base station in unified encoding mode corresponding to the unified decoding mode, where the carrier status is the activated state or the deactivated state.

With reference to the eleventh aspect or any one of the foregoing possible implementation manners, in a twelfth possible implementation manner, the receiver is further configured to: before receiving the downlink physical control channel sent by the base station, receive instruction information that is sent by the base station by using higher layer signaling; and the processor is further configured to detect downlink physical control channels according to the instruction information received by the receiver, to determine the downlink physical control channel for indicating the first carrier information, where the instruction information is used to instruct the user equipment to determine, by means of detection, the downlink physical control channel for indicating the first carrier information.

With reference to the eleventh aspect or any one of the foregoing possible implementation manners, in a thirteenth possible implementation manner, the receiver is further configured to receive the downlink control information that is repeatedly encoded on the downlink physical control channel;

or, receive the downlink control information that is encoded by using a first coding bit rate on the downlink physical control channel, where the first coding bit rate is lower than a second coding bit rate, and the second coding bit rate is a common coding bit rate;

or, receive, from the base station, multiple pieces of the downlink control information that is encoded.

With reference to the eleventh aspect or any one of the foregoing possible implementation manners, in a fourteenth possible implementation manner, the downlink physical control channel includes: a physical downlink control channel PDCCH or an enhanced physical downlink control channel E-PDCCH.

With reference to the eleventh aspect or any one of the foregoing possible implementation manners, in a fifteenth possible implementation manner, the carrier status received by the receiver is the activated state or the deactivated state; and the processor is further configured to: if the carrier status is the activated state, transmit a sounding reference signal SRS on the carrier, where the SRS is used for channel state detection; and/or, generate a channel state information CSI report on the carrier, where the CSI includes at least a channel quality indicator CQI, a precoding matrix indicator PMI, and a rank indication RI; and/or, detect a downlink physical control channel of the carrier, and/or, detect a downlink physical control channel that indicates a scheduling result on the carrier.

With reference to the eleventh aspect or any one of the foregoing possible implementation manners, in a sixteenth possible implementation manner, the carrier status received by the receiver is the activated state or the deactivated state; and the processor is further configured to: if the carrier status is the deactivated state, stop transmitting an SRS on the carrier; and/or, stop generating a CSI report on the carrier, where the CSI includes at least a CQI, a PMI, and an RI; and/or, stop detecting a downlink physical control channel of the carrier, and/or, stop detecting a downlink physical control channel that indicates a scheduling result on the carrier; and/or, stop transmitting a random access channel RACH signal on the carrier, and/or, stop transmitting an uplink shared channel on the carrier.

According to a twelfth aspect, user equipment is further provided, including:

a receiver, configured to receive physical downlink shared channels; and a processor, configured to determine, in the physical downlink shared channels received by the receiver, a physical downlink shared channel for carrying first carrier information; acquire the first carrier information from the determined physical downlink shared channel, where the first carrier information acquired by the processor includes the carrier status of the carrier, and the carrier status is an activated state or a deactivated state; and perform communication on the carrier according to the first carrier information.

With reference to the twelfth aspect, in a first possible implementation manner, the carrier status, included in the first carrier information, of the carrier includes: a carrier status of a carrier of the base station and/or a carrier status of a carrier of another base station.

With reference to the twelfth aspect or any one of the foregoing possible implementation manners, in a second possible implementation manner, the processor is further configured to: descramble a cyclic redundancy check CRC of a downlink physical control channel by using a carrier activation radio network temporary identifier RNTI, to identify the downlink physical control channel for carrying downlink control information; and acquire the downlink control information carried by the identified downlink physical control channel, and determine, according to the downlink control information, the physical downlink shared channel for carrying the first carrier information, where the downlink control information acquired by the processor is used to indicate the physical downlink shared channel for carrying the first carrier information.

With reference to the twelfth aspect or any one of the foregoing possible implementation manners, in a third possible implementation manner, the receiver is further configured to receive a physical broadcast channel; and the processor is further configured to determine, according to the physical broadcast channel received by the receiver, the physical downlink shared channel for carrying the first carrier information, where the physical broadcast channel received by the receiver is used to indicate the physical downlink shared channel for carrying the first carrier information.

With reference to the twelfth aspect or any one of the foregoing possible implementation manners, in a fourth possible implementation manner, the processor is further configured to descramble the determined physical downlink shared channel by using the carrier activation RNTI, to acquire the first carrier information.

With reference to the twelfth aspect or any one of the foregoing possible implementation manners, in a fifth possible implementation manner, the carrier received by the receiver is all carriers, whose carrier statuses can change, of the base station and/or the another base station; and the receiver is further configured to: before the processor performs communication on the carrier according to the first carrier information, acquire a carrier sequence number that is of each carrier in all the carriers and that is indicated by the base station to the user equipment by means of broadcasting;

or, receive dedicated signaling sent by the base station, where the dedicated signaling carries a carrier sequence number of each carrier in all the carriers, where the carrier sequence number received by the receiver is a sequence number configured for each carrier, each carrier has a different carrier sequence number, and the carrier sequence number and the carrier identified by the carrier sequence number are uniform for all user equipments served by the base station.

With reference to the twelfth aspect or any one of the foregoing possible implementation manners, in a sixth possible implementation manner, the carrier sequence number received by the receiver is identified according to a central frequency of the carrier corresponding to the carrier sequence number;

and/or, the carrier sequence number received by the receiver is identified according to a physical identifier of the carrier corresponding to the carrier sequence number.

With reference to the twelfth aspect or any one of the foregoing possible implementation manners, in a seventh possible implementation manner, the carrier status, included in the first carrier information acquired by the processor, of the carrier is carrier statuses of all the carriers.

With reference to the twelfth aspect or any one of the foregoing possible implementation manners, in an eighth possible implementation manner, the receiver is further configured to: before the processor performs communication on the carrier according to the first carrier information, receive first signaling sent by the base station, where the first signaling carries a quantity of carriers whose carrier statuses have changed, where the carrier status, included in the first carrier information acquired by the processor, of the carrier is the carrier statuses of the carriers whose carrier statuses have changed.

With reference to the twelfth aspect or any one of the foregoing possible implementation manners, in a ninth possible implementation manner, the receiver is further configured to: before the processor determines the physical downlink shared channel for carrying the first carrier information, receive instruction information that is sent by the base station by using higher layer signaling, where the instruction information received by the receiver is used to instruct the user equipment to detect the downlink physical control channel for indicating the physical downlink shared channel or the physical broadcast channel for indicating the physical downlink shared channel; and the processor is further configured to detect the downlink physical control channel or the physical broadcast channel according to the instruction information received by the receiver, to determine the physical downlink shared channel for carrying the first carrier information.

With reference to the twelfth aspect or any one of the foregoing possible implementation manners, in a tenth possible implementation manner, the receiver is further configured to: before receiving the physical downlink shared channel, receive the downlink control information that is repeatedly encoded on the downlink physical control channel;

or, receive the downlink control information that is encoded by using a first coding bit rate on the downlink physical control channel, where the first coding bit rate is lower than a second coding bit rate, and the second coding bit rate is a common coding bit rate;

or, receive, from the base station, multiple pieces of the downlink control information that is encoded.

With reference to the twelfth aspect or any one of the foregoing possible implementation manners, in an eleventh possible implementation manner, the downlink physical control channel includes: a physical downlink control channel PDCCH or an enhanced physical downlink control channel E-PDCCH.

With reference to the twelfth aspect or any one of the foregoing possible implementation manners, in a twelfth possible implementation manner, the carrier status acquired by the processor is the activated state or the deactivated state; and the processor is further configured to: if the carrier status is the activated state, transmit a sounding reference signal SRS on the carrier, where the SRS is used for channel state detection; and/or, generate a channel state information CSI report on the carrier, where the CSI includes at least a channel quality indicator CQI, a precoding matrix indicator PMI, and a rank indication RI; and/or, detect a downlink physical control channel of the carrier; and/or, detect a downlink physical control channel that indicates a scheduling result on the carrier.

With reference to the twelfth aspect or any one of the foregoing possible implementation manners, in a thirteenth possible implementation manner, the carrier status acquired by the processor is the activated state or the deactivated state; and the processor is further configured to: if the carrier status is the deactivated state, stop transmitting an SRS on the carrier; and/or, stop generating a CSI report on the carrier, where the CSI includes at least a CQI, a PMI, and an RI; and/or, stop detecting a downlink physical control channel of the carrier, and/or, stop detecting a downlink physical control channel that indicates a scheduling result on the carrier, and/or, stop transmitting a random access channel RACH signal on the carrier; and/or, stop transmitting an uplink shared channel on the carrier.

By using the foregoing solution, a base station can indicate first carrier information to user equipment by using a downlink physical control channel, a physical downlink shared channel, or a physical broadcast channel, where the first carrier information includes a carrier status of the carrier, so that the user equipment performs communication on the carrier according to the carrier status of the carrier. Compared with the prior art in which an activated state or a deactivated state of the carrier is indicated to the user equipment by using a MAC CE, in the solution, the carrier status is broadcast to the user equipment by using the downlink physical control channel, the physical downlink shared channel, or the physical broadcast channel, which has a smaller delay and lower network load. Therefore, a delay of indicating the activated state or deactivated state of the carrier can be reduced, and efficiency of indicating the activated state or deactivated state of the carrier can be improved.

BRIEF DESCRIPTION OF DRAWINGS

To describe the technical solutions in the embodiments of the present invention or in the prior art more clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DETAILED DESCRIPTION

The following clearly and completely describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

In addition, the terms "system" and "network" may be used interchangeably in this specification. The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

Embodiment 1

Figure 1:
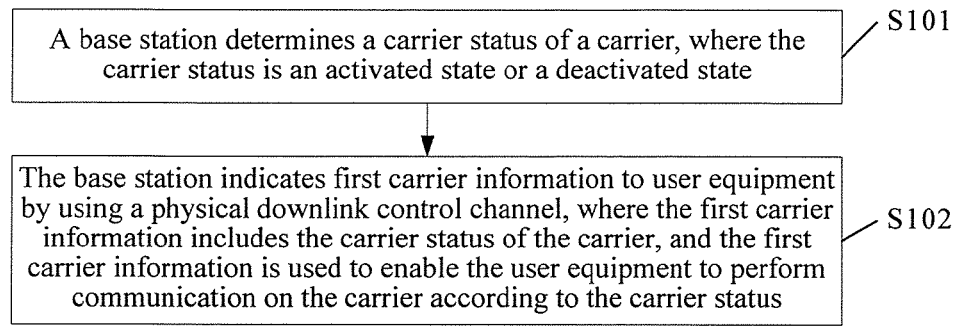
FIG. 1 is a flowchart of a carrier status indication method in Embodiment 1 of the present invention.

This embodiment of the present invention provides a carrier status indication method, which may be applied to a base station. As shown in FIG. 1, the carrier status indication method includes:

S101: A base station determines a carrier status of a carrier, where the carrier status is an activated state or a deactivated state.

Specifically, the base station may determine a carrier status of at least one carrier according to channel state information (Channel State Information, CSI) of user equipment, a load status of a cell, an indication of another base station, and the like. The CSI may include at least a channel quality indicator (Channel Quality Indicator, CQI), a precoding matrix indicator (Precoding Matrix Indicator, PMI), and a rank indication RI.

It should be noted that, the method for determining, by the base station, a carrier status of at least one carrier includes, but is not limited to, the method described in this embodiment of the present invention. Further, it should be noted that, when the base station determines the carrier status of the carrier, the carrier status of the carrier may be a carrier status of a carrier of the local base station and/or a carrier status of a carrier of another base station.

S102: The base station indicates first carrier information to user equipment by using a downlink physical control channel, where the first carrier information includes the carrier status of the carrier, and the first carrier information is used to enable the user equipment to perform communication on the carrier according to the carrier status.

The downlink physical control channel may include: a downlink physical control channel (Downlink physical control channel, PDCCH) or an enhanced downlink physical control channel (E-Downlink physical control channel, E-PDCCH).

Specifically, the base station may indicate the first carrier information to the user equipment by using downlink control information carried by the downlink physical control channel, that is, the base station may add the first carrier information to the downlink control information carried by the downlink physical control channel, so that when the user equipment demodulates the downlink physical control channel, the user equipment can acquire the first carrier information from the downlink control information. The downlink control information may be downlink control information (Downlink Control Information, DCI) designed in advance in the present invention, for example, a DCI format X, a DCI format Y, or a DCI format 3/3A.

The carrier status, included in the first carrier information, of the carrier includes: the carrier status of the carrier of the base station and/or the carrier status of the carrier of another base station.

The other base station may be: base stations of small cells (Small cell), that is, access points (Access point, AP) of Small Cells, densely deployed in a hotspot area of a macro cell (indoor or outdoor) on the basis of a conventional macro base station cellular network to meet a rapidly growing traffic requirement.

It should be noted that, because a small cell has a small coverage area, and services of user equipment served by the small cell have great dynamic changes, an AP of the small cell may be turned on or turned off in real time based on a service load status of the current small cell. That is, if the user equipment currently served by the small cell does not have service data that needs to be transmitted, the AP of the small cell may temporarily deactivate a carrier of the small cell, and indicate a carrier status of the carrier of the small cell to a macro base station in which the small cell is located. The AP of the small cell may indicate the carrier status of the carrier of the small cell to the macro base station by means of an ideal backhaul or a non-ideal backhaul.

The downlink control information is downlink control information (DCI) that is obtained by scrambling a cyclic redundancy check (Cyclic Redundancy Check, CRC) of the downlink physical control channel by using a carrier activation radio network temporary identifier (Radio Network Temporary Identity, RNTI).

It should be noted that, in the prior art, downlink control information (DCI) having different functions may be scrambled by using different RNTIs, for example, DCI during random access may be scrambled by using a random access RNTI (Random Access RNTI, RA-RNTI), and a system message may be scrambled by using a system information RNTI (System Information RNTI, SI-RNTI). The carrier activation RNTI introduced in the present invention is an RNTI that is used to identify the downlink physical control channel carrying the first carrier information and that is configured by the base station for the user equipment.

By using the foregoing solution, a base station may indicate first carrier information to user equipment by using a downlink physical control channel, where the first carrier information includes a carrier status of a carrier, so that the user equipment performs communication on the carrier according to the carrier status of the carrier. Compared with the prior art in which an activated state or a deactivated state of the carrier is indicated to the user equipment by using a MAC CE, in the solution, the carrier status is broadcast to the user equipment by using the downlink physical control channel, which has a smaller delay and lower network load. Therefore, a delay of indicating the activated state or deactivated state of the carrier can be reduced, and efficiency of indicating the activated state or deactivated state of the carrier can be improved.

Embodiment 2

Figure 2:
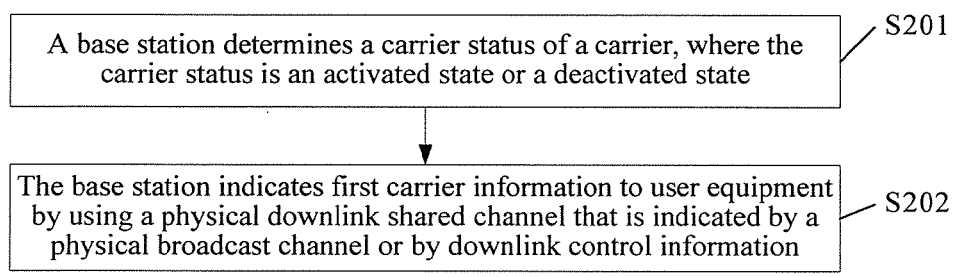
FIG. 2 is a flowchart of a carrier status indication method in Embodiment 2 of the present invention.

This embodiment of the present invention provides a carrier status indication method, which may be applied to a base station. As shown in FIG. 2, the carrier status indication method includes:

S201: A base station determines a carrier status of a carrier, where the carrier status is an activated state or a deactivated state.

It should be noted that, a specific method for determining, by the base station, the carrier status of the carrier is similar to the method for determining, by the base station, the carrier status of the carrier in Embodiment 1, and is not described herein again in this embodiment.

S202: The base station indicates first carrier information to user equipment by using a physical downlink shared channel that is indicated by a physical broadcast channel or by downlink control information.

The first carrier information includes the carrier status of the carrier, and the first carrier information is used to enable the user equipment to perform communication on the carrier according to the carrier status. The carrier status, included in the first carrier information, of the carrier includes: a carrier status of a carrier of the base station and/or a carrier status of a carrier of another base station.

For the another base station in this embodiment of the present invention, reference may be made to the related descriptions in Embodiment 1 of the present invention, and details are not described herein again in this embodiment of the present invention.

In an application scenario of this embodiment, the base station may indicate the first carrier information to the user equipment by using the physical downlink shared channel that is indicated by the physical broadcast channel.

In another application scenario of this embodiment, the base station may indicate the first carrier information to the user equipment by using the physical downlink shared channel that is indicated by the downlink control information, where the downlink control information is carried by a downlink physical control channel.

In this application scenario, the downlink control information is obtained after a CRC of the downlink physical control channel is scrambled by using an RNTI, where a carrier activation RNTI is an RNTI that is used to identify the downlink physical control channel carrying the downlink control information and that is configured by the base station for the user equipment.

It should be noted that, in the foregoing two application scenarios, the first carrier information is obtained by means of scrambling using a carrier activation RNTI, where the carrier activation RNTI is an RNTI that is used to identify the first carrier information on the physical downlink shared channel and that is configured by the base station for the user equipment.

The downlink physical control channel may include: a PDCCH or an E-PDCCH; and the physical downlink shared channel may be specifically a (Physical Downlink Shared Channel, PDSCH).

Specifically, the base station may indicate, to the user equipment by using the physical broadcast channel or the downlink control information carried by the downlink physical control channel, the physical downlink shared channel for carrying the first carrier information, so that the user equipment can acquire the first carrier information by demodulating the physical downlink shared channel. The downlink control information may be any downlink control information (DCI) in the prior art.

By using the foregoing solution, a base station can indicate first carrier information to user equipment by using a downlink physical control channel that is indicated by a physical broadcast channel or by downlink control information, where the first carrier information includes a carrier status of a carrier, so that the user equipment performs communication on the carrier according to the carrier status of the carrier. Compared with the prior art in which an activated state or a deactivated state of the carrier is indicated to the user equipment by using a MAC CE, in the solution, the carrier status is broadcast to the user equipment by using the physical downlink shared channel, which has a smaller delay and lower network load. Therefore, a delay of indicating the activated state or deactivated state of the carrier can be reduced, and efficiency of indicating the activated state or deactivated state of the carrier can be improved.

Embodiment 3

Figure 3:
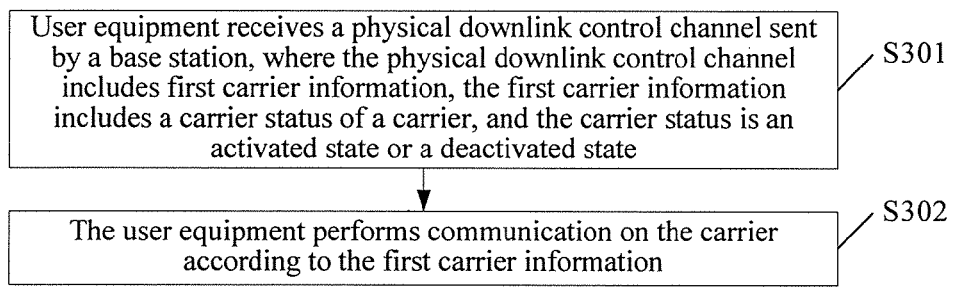
FIG. 3 is a flowchart of a carrier status indication method in Embodiment 3 of the present invention.

This embodiment of the present invention further provides a carrier status indication method, which may be applied to user equipment. As shown in FIG. 3, the carrier status indication method includes:

S301: User equipment receives a downlink physical control channel sent by a base station, where the downlink physical control channel includes first carrier information, the first carrier information includes a carrier status of a carrier, and the carrier status is an activated state or a deactivated state.

It should be noted that, the carrier status, included in the first carrier information, of the carrier includes: a carrier status of a carrier of the base station and/or a carrier status of a carrier of another base station.

For the another base station in this embodiment of the present invention, reference may be made to the related descriptions in Embodiment 1 of the present invention, and details are not described herein again in this embodiment of the present invention.

That user equipment receives a downlink physical control channel sent by a base station, where the downlink physical control channel includes first carrier information may specifically include: the user equipment descrambles a CRC of the downlink physical control channel by using a carrier activation RNTI, to identify the downlink physical control channel for carrying the first carrier information, and then acquires downlink control information carried by the identified downlink physical control channel, where the downlink control information includes the first carrier information.

The carrier activation RNTI is an RNTI that is used to identify the downlink physical control channel carrying the first carrier information and that is configured by the base station for the user equipment.

S302: The user equipment performs communication on the carrier according to the first carrier information.

Exemplarily, if the carrier status of the carrier is the activated state, that the user equipment performs communication on the carrier according to state information of the carrier may include: the user equipment transmits a sounding reference signal (Sounding Reference Signal, SRS) on the carrier, where the SRS is used for channel state detection; and/or, the user equipment generates a channel state information (Channel State Information, CSI) report on the carrier, where CSI may include at least a channel quality indicator (Channel Quality Indicator, CQI), a precoding matrix indicator (Precoding Matrix Indicator, PMI), and a rank indication RI; and/or, the user equipment detects a downlink physical control channel on the carrier; and/or, the user equipment detects a downlink physical control channel used to indicate a scheduling result carried on the carrier.

If the carrier status of the carrier is switched from the activated state to the deactivated state, that the user equipment performs communication on the carrier according to state information of the carrier may include: the user equipment stops transmitting an SRS on the carrier, and/or, the user equipment stops generating a CSI report on the carrier, where CSI includes at least a CQI, a PMI, and an RI; and/or, the user equipment detects a downlink physical control channel on the carrier; and/or, the user equipment detects a downlink physical control channel that indicates a scheduling result on the carrier; and/or, the user equipment stops transmitting a random access channel (Random Access Channel, RACH) signal on the carrier; and/or, the user equipment stops transmitting an uplink shared channel on the carrier.

It should be noted that, in this embodiment of the present invention, a specific method for performing communication on the carrier by the user equipment according to the state information of the carrier includes, but is not limited to, the method described in this embodiment of the present invention, and other methods for performing communication on the carrier by the user equipment are not described herein again in this embodiment of the present invention.

By using the foregoing solution, user equipment may acquire first carrier information from a downlink physical control channel, and perform communication on a carrier according to the first carrier information. Compared with the prior art in which an activated state or a deactivated state of the carrier is indicated to the user equipment by using a MAC CE, in the solution, the carrier status is acquired by the user equipment by using the downlink physical control channel, which has a smaller delay and lower network load. Therefore, a delay of indicating the activated state or deactivated state of the carrier can be reduced, and efficiency of indicating the activated state or deactivated state of the carrier can be improved.

Embodiment 4

Figure 4:
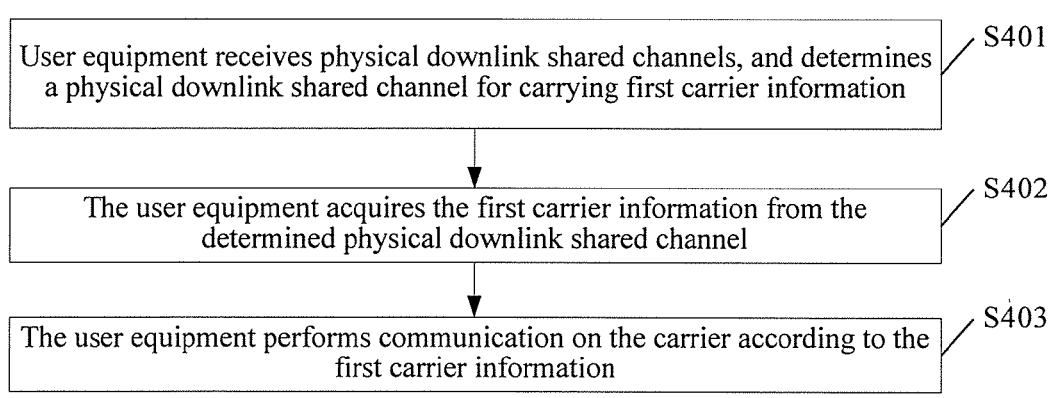
FIG. 4 is a flowchart of a carrier status indication method in Embodiment 4 of the present invention.

This embodiment of the present invention further provides a carrier status indication method, which may be applied to user equipment. As shown in FIG. 4, the carrier status indication method includes:

S401: User equipment receives physical downlink shared channels, and determines a physical downlink shared channel for carrying first carrier information.

In an application scenario of this embodiment, that the user equipment determines a physical downlink shared channel for carrying first carrier information may specifically include: the user equipment descrambles a CRC of a downlink physical control channel by using a carrier activation RNTI, to identify the downlink physical control channel for carrying downlink control information, then acquires the downlink control information carried by the identified downlink physical control channel, and determines, according to the downlink control information, the physical downlink shared channel for carrying the first carrier information. The downlink control information is used to indicate the physical downlink shared channel for carrying the first carrier information.

It should be noted that, the carrier status, included in the first carrier information, of the carrier includes: a carrier status of a carrier of a base station and/or a carrier status of a carrier of another base station.

For the another base station in this embodiment of the present invention, reference may be made to the related descriptions in Embodiment 1 of the present invention, and details are not described herein again in this embodiment of the present invention.

In another application scenario of this embodiment of the present invention, that the user equipment determines a physical downlink shared channel for carrying first carrier information may specifically include: the user equipment receives a physical broadcast channel, and determines, according to the physical broadcast channel, the physical downlink shared channel for carrying the first carrier information, where the physical broadcast channel is used to indicate the physical downlink shared channel for carrying the first carrier information.

S402: The user equipment acquires the first carrier information from the determined physical downlink shared channel.

The first carrier information includes the carrier status of the carrier, and the carrier status is an activated state or a deactivated state.

Specifically, the user equipment may descramble the determined physical downlink shared channel by using the carrier activation RNTI, to acquire the first carrier information.

S403: The user equipment performs communication on the carrier according to the first carrier information.

For a specific method for performing communication on the carrier by the user equipment according to the first carrier information, reference may be made to the specific description in other embodiments of the present invention, and details are not described herein again in this embodiment.

By using the foregoing solution, user equipment may acquire first carrier information from a physical downlink shared channel, and perform communication on a carrier according to the first carrier information. Compared with the prior art in which an activated state or a deactivated state of the carrier is indicated to the user equipment by using a MAC CE, in the solution, the carrier status is acquired by the user equipment by using the physical downlink shared channel, which has a smaller delay and lower network load. Therefore, a delay of indicating the activated state or deactivated state of the carrier can be reduced, and efficiency of indicating the activated state or deactivated state of the carrier can be improved.

Embodiment 5

Figure 5:
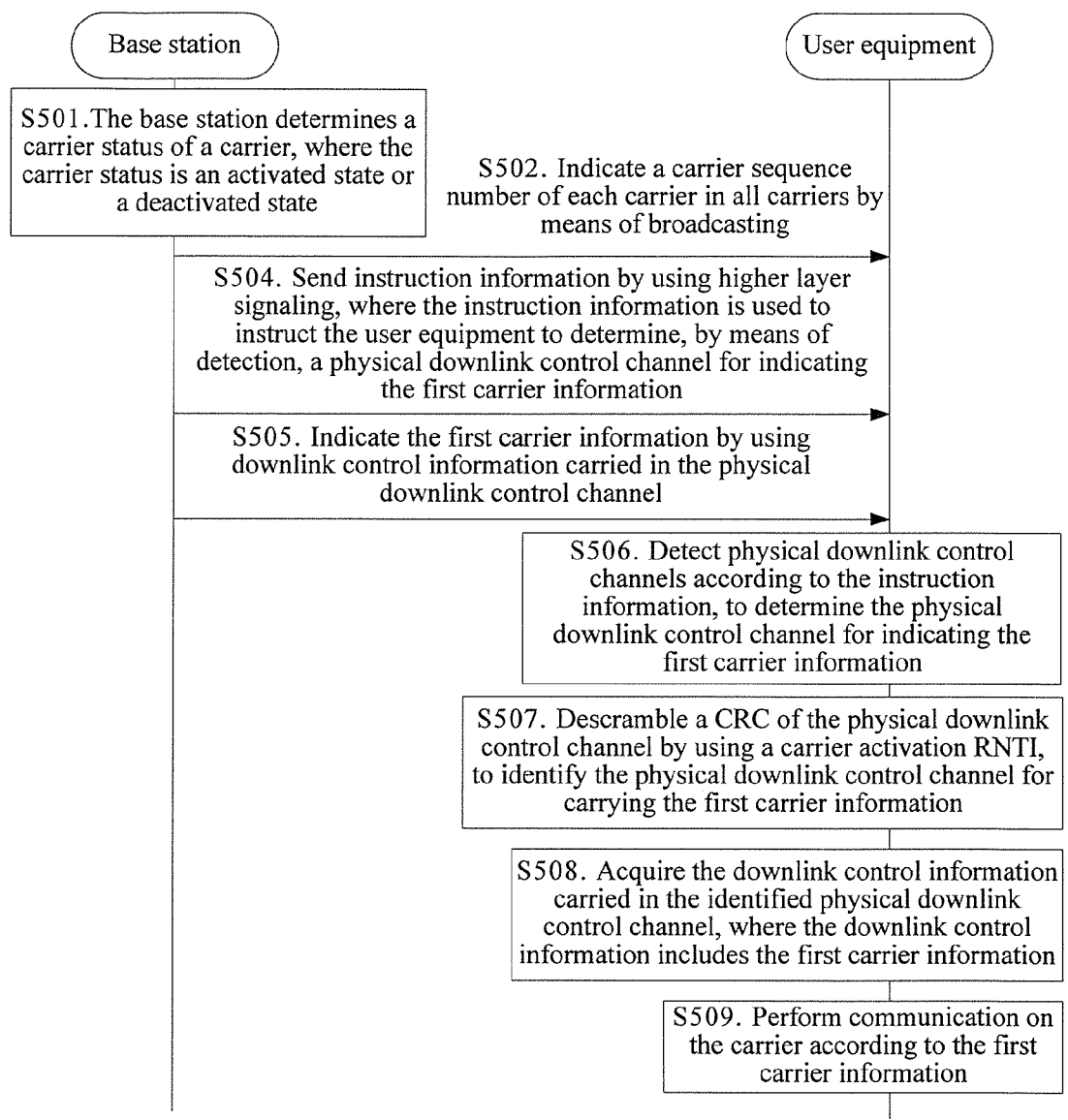
FIG. 5 is a flowchart of a carrier status indication method in Embodiment 5 of the present invention.
Figure 6:
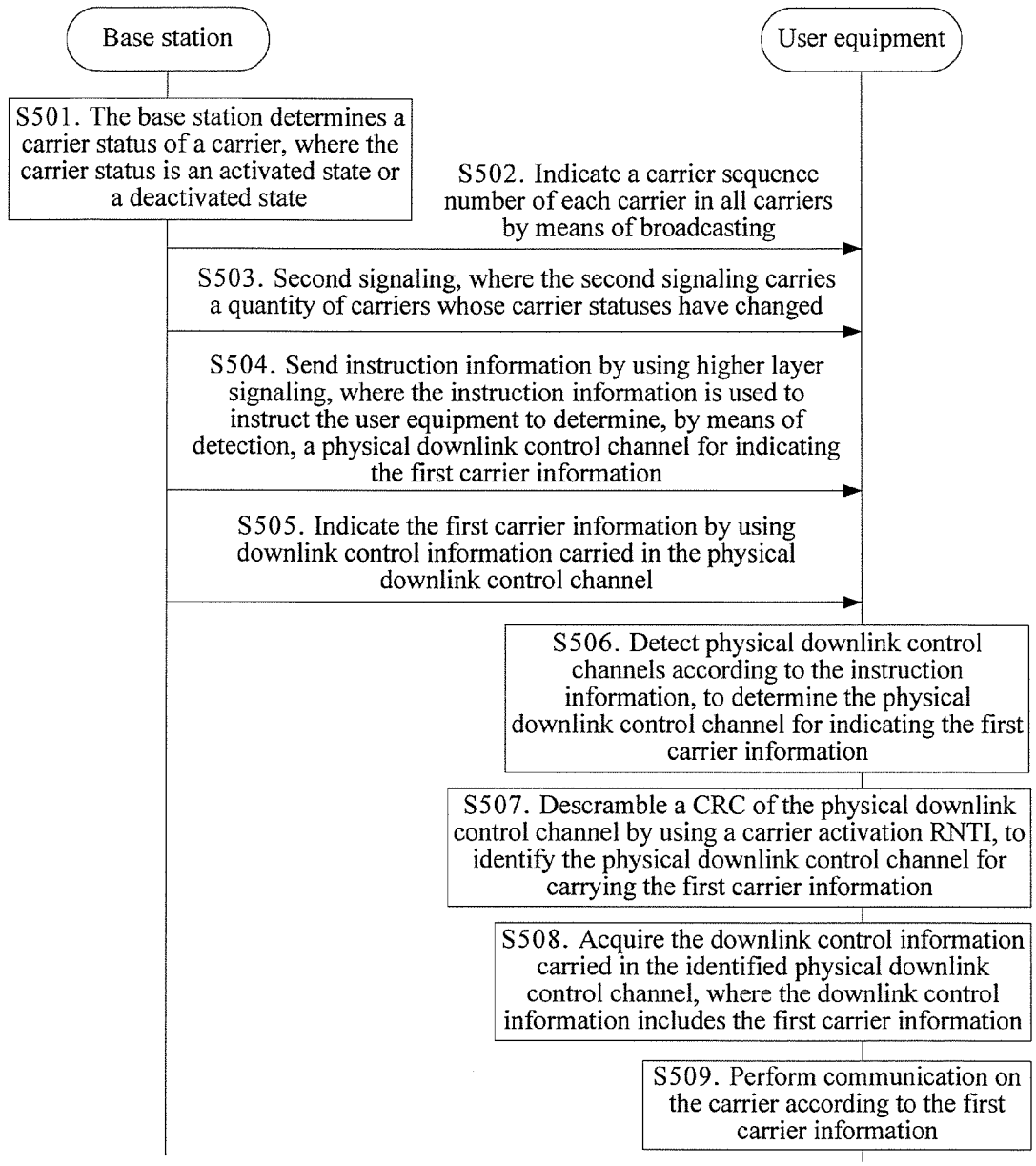
FIG. 6 is a flowchart of another carrier status indication method in Embodiment 5 of the present invention.

This embodiment of the present invention further provides a carrier status indication method, which may be applied in a process during which a base station indicates a carrier status to user equipment by using downlink control information (such as DCI format X). As shown in FIG. 5 or FIG. 6, the carrier status indication method may include:

S501: A base station determines a carrier status of a carrier, where the carrier status is an activated state or a deactivated state.

Specifically, the base station may determine a carrier status of at least one carrier according to CSI of user equipment, a load status of a cell, and the like. The CSI may include at least a channel quality indicator CQI, a PMI, a rank indication RI, and an indication of another base station. The method for determining, by the base station, the carrier status of the carrier includes, but is not limited to, the method described in this embodiment of the present invention.

It should be noted that, the carrier in this embodiment of the present invention is all carriers, whose carrier statuses can change, of the base station. For example, the base station may include five carriers, and carrier statuses of three carriers among the five carriers can change; in this case, the carrier in this embodiment of the present invention is the three carriers whose carrier statuses can change.

It should be noted that, the carrier status, included in the first carrier information, of the carrier includes: a carrier status of a carrier of the base station and/or a carrier status of a carrier of another base station.

For the another base station in this embodiment of the present invention, reference may be made to the related descriptions in Embodiment 1 of the present invention, and details are not described herein again in this embodiment of the present invention.

Further optionally, in a first application scenario of this embodiment of the present invention, the carrier status indication method may further include: the base station may broadcast a carrier sequence number to user equipment.

In this step, the base station may configure a carrier sequence number for each carrier according to at least one of a physical identifier (Identifier, ID) of at least one carrier, a frequency band of the at least one carrier, and bandwidth of the at least one carrier, separately identify each carrier by using the carrier sequence number configured for each carrier, and broadcast the carrier sequence number to the user equipment, so that the user equipment can perform communication on the carrier according to the carrier sequence number and the carrier status of the carrier.

In the first application scenario of this embodiment of the present invention, in the prior art, in different user equipments, carrier sequence numbers preconfigured for a same carrier are different. For example, in a case of two carriers, which are carrier A and carrier B; in the prior art, in user equipment 1, preconfigured carrier No. 1 is carrier A, and preconfigured carrier No. 2 is carrier B; and in user equipment 2, preconfigured carrier No. 1 is carrier B. Therefore, in this embodiment of the present invention, the base station may configure, in all user equipments, a same carrier sequence number for a same carrier. The carrier status indication method may further include S502:

S502: The base station indicates a carrier sequence number of each carrier in all carriers to the user equipment by means of broadcasting.

The carrier sequence number is a sequence number configured for each carrier, each carrier has a different carrier sequence number, and the carrier sequence number and the carrier identified by the carrier sequence number are uniform for all user equipments served by the base station.

It should be noted that, compared with indicating, by the base station to different user equipments, the carrier status and carrier sequence numbers applicable to the user equipments, combining a uniform carrier sequence number configuration and an indication of the carrier status to each user equipment in broadcast form can reduce a waste of channel resources and reduce network load, and can implement a fast indication of the carrier status, thereby improving efficiency of indicating the carrier status.

Further optionally, S502 may be replaced with S502': The base station sends a carrier sequence number of each carrier in all carriers to the user equipment by using dedicated signaling.

The dedicated signaling may be radio resource control (Radio Resource Control, RRC) signaling, Media Access Control (Media Access Control, MAC) signaling, or the like.

It should be noted that, in this embodiment, the carrier sequence number is identified according to a central frequency of the carrier corresponding to the carrier sequence number; and/or, the carrier sequence number is identified according to a physical identifier of the carrier corresponding to the carrier sequence number.

Specifically, because each carrier has a different central frequency, the base station may use the central frequency of the carrier to identify the carrier sequence number of the carrier. For example, if the base station includes five carriers, of which central frequencies are: central frequency a, central frequency b, central frequency c, central frequency d, and central frequency e, the base station may configure the carrier corresponding to central frequency a as carrier 1, configure the carrier corresponding to central frequency b as carrier 2, configure the carrier corresponding to central frequency c as carrier 3, configure the carrier corresponding to central frequency d as carrier 4, and configure the carrier corresponding to central frequency e as carrier 5.

Similarly, because each carrier has a different physical identifier, the base station may use the physical identifier of the carrier to identify the carrier sequence number of the carrier. For example, if the base station includes five carriers, of which carrier physical identifiers are: physical identifier a, physical identifier b, physical identifier c, physical identifier d, and physical identifier e, the base station may configure the carrier corresponding to physical identifier a as carrier 1, configure the carrier corresponding to physical identifier b as carrier 2, configure the carrier corresponding to physical identifier c as carrier 3, configure the carrier corresponding to physical identifier d as carrier 4, and configure the carrier corresponding to physical identifier e as carrier 5.

In the first application scenario of this embodiment, the carrier status, included in the first carrier information, of the carrier is carrier statuses of all the carriers, that is, the base station may indicate, to the user equipment, the carrier statuses of all the carriers, whose carrier statuses can change, of the base station.

In a second application scenario of this embodiment, the carrier status, included in the first carrier information, of the carrier is carrier statuses of carriers whose carrier statuses have changed, that is, the base station may indicate, to the user equipment, carrier statuses of carriers which are among all the carriers whose carrier statuses can change and of which the carrier statuses have changed in the base station.

In the second application scenario, as shown in FIG. 6, the method of this embodiment of the present invention may further include:

S503: The base station indicates, to the user equipment by using second signaling, a quantity of carriers whose carrier statuses have changed.

The second signaling may be one piece of signaling: higher layer signaling, RRC signaling, and MAC signaling.

S504: The base station sends instruction information to the user equipment by using higher layer signaling, where the instruction information is used to instruct the user equipment to determine, by means of detection, a downlink physical control channel for indicating the first carrier information.

The instruction information is further used to indicate a format of downlink control information, an RNTI for scrambling a CRC, and search space for downlink physical control channel detection, where the downlink physical control channel may be transmitted in common search space.

It should be noted that, the base station indicates, to the user equipment by sending the instruction information, a downlink physical control channel detection manner, and the user equipment detects downlink physical control channels in the common search space according to the detection manner indicated by the base station; in this way, a quantity of detections performed by the user equipment can be reduced, thereby avoiding extending an activation time or a deactivation time caused by multiple times of blind detection that needs to be performed by the user equipment.

The base station may indicate the first carrier information to the user equipment by using the downlink physical control channel, where the first carrier information includes the carrier status of the carrier, and the first carrier information is used to enable the user equipment to perform communication on the carrier according to the carrier status. Specifically, as shown in FIG. 5 or FIG. 6, the method of this embodiment of the present invention includes S505:

S505: The base station indicates the first carrier information to the user equipment by using downlink control information carried by the downlink physical control channel.

The downlink control information is downlink control information obtained by scrambling a CRC by using a carrier activation RNTI. The downlink control information in this embodiment is a downlink control information DCI format X designed in advance in the present invention.

Exemplarily, in this embodiment, specific content of the first carrier information may be:

Cell Activated State1—1 bits, carrier activated state of CellIndex-1;
Cell Activated State2—1 bits, carrier activated state of CellIndex-2; . . .
Cell Activated StateN—1 bits, carrier activated state of CellIndex-N.

CellIndex-1, CellIndex-2, and CellIndex-N may be a carrier sequence number of carrier 1, a carrier sequence number of carrier 2, and a carrier sequence number of carrier N, respectively; Cell Activated State1 is a carrier status of carrier 1; Activated State State2 is a carrier status of carrier 2; and Cell Activated State N is a carrier status of carrier N.

Carrier status information of the carrier is 1 bits, where specifically, "1" may represent the activated state, and "0" may represent the deactivated state.

Further optionally, the base station may further identify the carrier status of the carrier by means of a bitmap; or the base station may further encode the carrier status of the carrier in unified encoding mode, and indicate, to the user equipment, whether the carrier status of each carrier is the activated state or the deactivated state.

For a specific method for identifying the carrier status of the carrier by means of a bitmap, or encoding the carrier status of the carrier in unified encoding mode, reference may be made to subsequent related descriptions in other embodiments of the present invention, and details are not described herein again in this embodiment.

It should be noted that, the carrier status, included in the first carrier information indicated by the base station to the user equipment, of the carrier may include a carrier status of a carrier that has been configured by the base station for the user equipment, and may also include a carrier status of a carrier that has never been configured by the base station for the user equipment. That is, a quantity of carrier statuses of carriers that are indicated by the base station to the user equipment may be greater than a quantity of carriers that can be supported by the user equipment (that is, carriers that have been configured by the base station for the user equipment). The carrier statuses of all the carriers or the carrier statuses of the carriers whose carrier statuses have changed.

When the first carrier information indicated by the base station to the user equipment includes a carrier status of a carrier that has never been configured by the base station for the user equipment, the user equipment may perform communication on the carrier only according to the carrier status of the carrier that has been configured for the user equipment, and ignore the carrier status, included in the first carrier information, of the carrier that has never been configured by the base station for the user equipment.

Further, the base station may also perform, according to the carrier status, included in the first carrier information, of the carrier that has never been configured by the base station for the user equipment, communication on the carrier that has never been configured. Because the quantity of the carrier statuses of the carriers indicated by the base station to the user equipment is greater than the quantity of carriers that can be supported by the user equipment, it indicates that the user equipment can switch a communication state among multiple carriers that are beyond a carrier aggregation capability of the user equipment.

Further optionally, before S505, to ensure that the user equipment can receive the first carrier information correctly and in real time, the base station may repeatedly encode the downlink control information for indicating the first carrier information, or encode the downlink control information by using a coding bit rate that is lower than a common coding bit rate, or repeatedly send the downlink control information that is encoded.

Repeated encoding refers to that the base station may encode, repeatedly by using a given channel encoding format, the downlink control information that needs to be transmitted and that is used for indicating the first carrier information, which can improve security of information transmission.

Specifically, the method of this embodiment of the present invention may further include: the base station repeatedly encodes the downlink control information; or the base station encodes the downlink control information by using a first coding bit rate, where the first coding bit rate is lower than a second coding bit rate, and the second coding bit rate is a common coding bit rate; or the base station repeatedly sends, to at least one user equipment, the downlink control information that is encoded.

S506: The user equipment detects downlink physical control channels according to the instruction information, to determine the downlink physical control channel for indicating the first carrier information.

The instruction information is used to instruct the user equipment to determine, by means of detection, the downlink physical control channel for indicating the first carrier information.

S507: The user equipment descrambles a CRC of the downlink physical control channel by using a carrier activation RNTI, to identify the downlink physical control channel for carrying the first carrier information.

The carrier activation RNTI is an RNTI that is used to identify the downlink physical control channel carrying the first carrier information and that is configured by the base station for the user equipment.

Specifically, the user equipment may descramble, in the common search space of downlink physical control channels, the CRC of the downlink physical control channel according to the RNTI (where the base station uses the carrier activation RNTI to scramble the CRC), to determine the downlink physical control channel for transmitting the first carrier information.

It should be noted that, in this embodiment, S505 may be performed first, and then S506 to S507 are performed; or, S506 to S507 may be performed first, and then S505 is performed; or, S505 and S506 to S507 may be performed at the same time. A sequence of performing S505 and S506 to S507 is not limited in this embodiment.

S508: The user equipment acquires the downlink control information carried by the identified downlink physical control channel, where the downlink control information includes the first carrier information.

The user equipment may demodulate the identified downlink physical control channel, to acquire the downlink control information carried by the downlink physical control channel, so as to acquire the first carrier information.

S509: The user equipment performs communication on the carrier according to the first carrier information.

The carrier sequence number is identified according to a central frequency of the carrier corresponding to the carrier sequence number; and/or, the carrier sequence number is identified according to a physical identifier of the carrier corresponding to the carrier sequence number. Therefore, the user equipment may determine, among carrier statuses, the carrier status of each carrier of the user equipment according to an identifier (the central frequency of the carrier and/or the physical identifier of the carrier) of the carrier sequence number of each carrier, and perform communication on the carrier according to an indication of the carrier status.

Further optionally, the first carrier information includes the carrier status of the carrier, the carrier status is the activated state or the deactivated state, and the base station identifies the carrier status of the carrier by means of a bitmap or the base station encodes the carrier status of the carrier in unified encoding mode. Therefore, after acquiring the first carrier information, the user equipment may determine the carrier status of the carrier by means of a bitmap correspondingly; or the user equipment may determine the carrier status of the carrier in unified decoding mode; the carrier status of the carrier is encoded by the base station in unified encoding mode corresponding to the unified decoding mode, where the carrier status is the activated state or the deactivated state.

Specifically, for a specific method for determining, by the user equipment, the carrier status of the carrier by means of a bitmap, or determining, by the user equipment, the carrier status of the carrier in unified decoding mode, reference may be made to subsequent related descriptions in other embodiments of the present invention, and details are not described herein again in this embodiment.

It should be noted that, for a specific method for performing communication on the carrier by the user equipment according to state information of the carrier, reference may be made to related descriptions in Embodiment 1, and details are not described herein again in this embodiment.

By using the foregoing solution, a base station may indicate first carrier information to user equipment by using a downlink physical control channel, where the first carrier information includes a carrier status of a carrier, so that the user equipment performs communication on the carrier according to the carrier status of the carrier. Compared with the prior art in which an activated state or a deactivated state of the carrier is indicated to the user equipment by using a MAC CE, in the solution, the carrier status is broadcast to the user equipment by using the downlink physical control channel, which has a smaller delay and lower network load. Therefore, a delay of indicating the activated state or deactivated state of the carrier can be reduced, and efficiency of indicating the activated state or deactivated state of the carrier can be improved.

Further, because a quantity of carrier statuses of carriers indicated by the base station to the user equipment is greater than a quantity of carriers that can be supported by the user equipment, the user equipment can switch a communication state among multiple carriers that are beyond a carrier aggregation capability of the user equipment.

Embodiment 6

Figure 7:
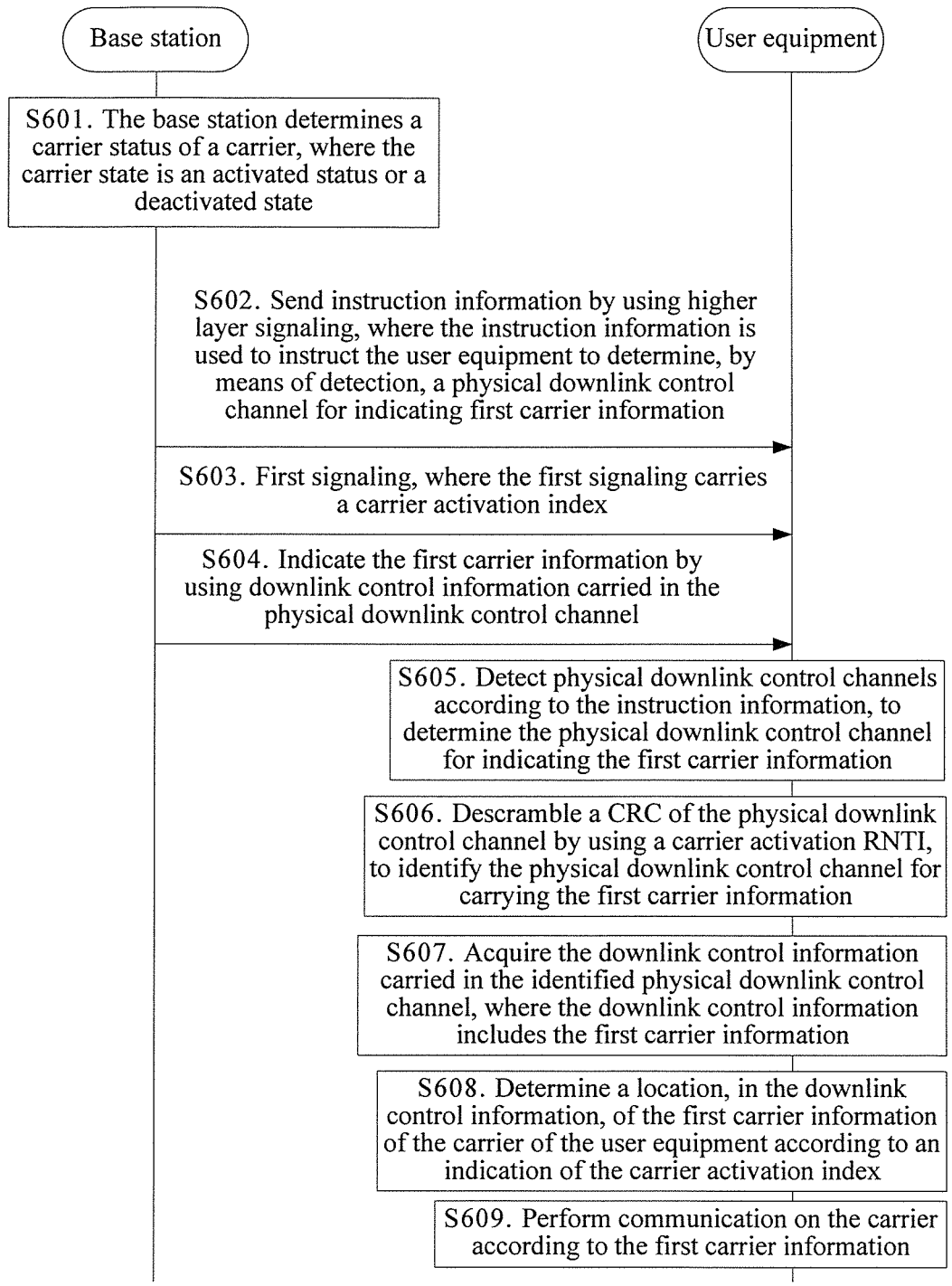
FIG. 7 is a flowchart of a carrier status indication method in Embodiment 6 of the present invention.

This embodiment of the present invention further provides a carrier status indication method, which may be applied in a process during which a base station indicates a carrier status to user equipment by using downlink control information (such as DCI format Y). As shown in FIG. 7, the carrier status indication method may include:

S601: A base station determines a carrier status of a carrier, where the carrier status is an activated state or a deactivated state.

For a specific method for determining, by the base station, the carrier status of the carrier, reference may be made to related descriptions for the determining, by the base station, the carrier status of the carrier in other method embodiments of the present invention, and details are not described herein again in this embodiment.

It should be noted that, the carrier in this embodiment of the present invention is all carriers, whose carrier statuses can change, of the base station. For example, the base station may include five carriers, and carrier statuses of three carriers among the five carriers can change; in this case, the carrier in this embodiment of the present invention is the three carriers whose carrier statuses can change.

In this embodiment, the carrier status, included in the first carrier information, of the carrier is carrier statuses of all carriers whose carrier statuses can change, where all the carriers whose carrier statuses can change are directed against each user equipment of multiple user equipments served by the base station.

It should be noted that, the carrier status, included in the first carrier information, of the carrier includes: a carrier status of a carrier of the base station and/or a carrier status of a carrier of another base station.

For the another base station in this embodiment of the present invention, reference may be made to the related descriptions in Embodiment 1 of the present invention, and details are not described herein again in this embodiment of the present invention.

Specifically, for different user equipments, carrier sequence numbers of carriers whose carrier statuses can change are different. In this embodiment, the base station does not need to uniformly configure a carrier sequence number for each carrier of the base station.

S602: The base station sends instruction information to the user equipment by using higher layer signaling, where the instruction information is used to instruct the user equipment to determine, by means of detection, a downlink physical control channel for indicating first carrier information.

The instruction information is further used to indicate a format of downlink control information, an RNTI for scrambling a CRC, and search space for downlink physical control channel detection, where the downlink physical control channel is transmitted in common search space.

It should be noted that, the base station indicates, to the user equipment by sending the instruction information, a downlink physical control channel detection manner, and the user equipment detects downlink physical control channels in the common search space according to the detection manner indicated by the base station; in this way, a quantity of detections performed by the user equipment can be reduced, thereby avoiding extending an activation time or a deactivation time caused by multiple times of blind detection that needs to be performed by the user equipment.

S603: The base station notifies each user equipment of a carrier activation index by using first signaling.

The carrier activation index is used to indicate a location, in the downlink control information, of the first carrier information of the carrier of each user equipment.

The first signaling may be one piece of signaling: higher layer signaling, RRC signaling, and MAC signaling.

The user equipment may rapidly acquire, according to information about the carrier activation index and from the downlink control information carried by the downlink physical control channel, the first carrier information applicable to the user equipment, which can improve efficiency of indicating the carrier status.

It should be noted that, in this embodiment, S602 may be performed first, and then S603 is performed; or, S603 may be performed first, and then S602 is performed; or, S602 and S603 may be performed at the same time. A sequence of performing S602 and S603 is not limited in this embodiment.

S604: The base station indicates the first carrier information to the user equipment by using downlink control information carried by the downlink physical control channel.

The downlink control information is downlink control information obtained by scrambling a CRC of the downlink physical control channel by using a carrier activation RNTI. The downlink control information in this embodiment is a downlink control information DCI format Y designed in advance in the present invention.

Specifically, the base station may further identify the carrier status of the carrier by means of a bitmap; or the base station may further encode the carrier status of the carrier in unified encoding mode, and indicate, to the user equipment, whether the carrier status of each carrier is the activated state or the deactivated state.

It should be noted that, the carrier status, included in the first carrier information indicated by the base station to the user equipment, of the carrier may include a carrier status of a carrier that has been configured by the base station for the user equipment, and may also include a carrier status of a carrier that has never been configured by the base station for the user equipment. That is, a quantity of carrier statuses of carriers that are indicated by the base station to the user equipment may be greater than a quantity of carriers that can be supported by the user equipment (that is, carriers that have been configured by the base station for the user equipment). The carrier statuses of all the carriers or the carrier statuses of the carriers whose carrier statuses have changed.

When the first carrier information indicated by the base station to the user equipment includes a carrier status of a carrier that has never been configured by the base station for the user equipment, the user equipment may perform communication on the carrier only according to the carrier status of the carrier that has been configured for the user equipment, and ignore the carrier status, included in the first carrier information, of the carrier that has never been configured by the base station for the user equipment.

Further, the base station may also perform, according to the carrier status, included in the first carrier information, of the carrier that has never been configured by the base station for the user equipment, communication on the carrier that has never been configured. Because the quantity of the carrier statuses of the carriers indicated by the base station to the user equipment is greater than the quantity of carriers that can be supported by the user equipment, it indicates that the user equipment can switch a communication state among multiple carriers that are beyond a carrier aggregation capability of the user equipment.

S605: The user equipment detects downlink physical control channels according to the instruction information, to determine the downlink physical control channel for indicating the first carrier information.

The instruction information is used to instruct the user equipment to determine, by means of detection, the downlink physical control channel for indicating the first carrier information.

S606: The user equipment descrambles a CRC of the downlink physical control channel by using a carrier activation RNTI, to identify the downlink physical control channel for carrying the first carrier information.

The carrier activation RNTI is an RNTI that is used to identify the downlink physical control channel carrying the first carrier information and that is configured by the base station for the user equipment.

It should be noted that, for a specific method for descrambling, by the user equipment, the CRC of the downlink physical control channel by using the carrier activation RNTI, to identify the downlink physical control channel for carrying the first carrier information, reference may be made to related descriptions of S507 in Embodiment 5 of the present invention, and details are not described herein again in this embodiment.

S607: The user equipment acquires the downlink control information carried by the identified downlink physical control channel, where the downlink control information includes the first carrier information.

The user equipment may demodulate the identified downlink physical control channel, to acquire the downlink control information carried by the downlink physical control channel, so as to acquire the first carrier information.

S608: The user equipment determines a location, in the downlink control information, of the first carrier information of the carrier of the user equipment according to an indication of the carrier activation index.

The user equipment may determine the location, in the downlink control information, of the first carrier information of the carrier of the user equipment according to the indication of the carrier activation index, to acquire the first carrier information rapidly, thereby improving efficiency of indicating the carrier status.

S609: The user equipment performs communication on the carrier according to the first carrier information.

The first carrier information includes the carrier status of the carrier, the carrier status is the activated state or the deactivated state, and the base station identifies the carrier status of the carrier by means of a bitmap or the base station encodes the carrier status of the carrier in unified encoding mode. Therefore, after acquiring the first carrier information, the user equipment may determine the carrier status of the carrier by means of a bitmap correspondingly; or the user equipment may determine the carrier status of the carrier in unified decoding mode; the carrier status of the carrier is encoded by the base station in unified encoding mode corresponding to the unified decoding mode, where the carrier status is the activated state or the deactivated state.

Exemplarily, if there are two carriers configured for the user equipment, that is, carrier A and carrier B, the base station may identify carrier A and carrier B by means of a bitmap, so as to indicate state information of carrier A and carrier B to the user equipment. Specifically, the base station may use two bits of information to respectively identify activated/deactivated states of carrier A and carrier B, for example, a higher order identifies an activated/deactivated state of carrier A, and a lower order identifies an activated/deactivated state of carrier B. Meanwhile, an identifier "0" corresponds to carrier deactivation, and an identifier "1" corresponds to carrier activation. In this case, 00 represents that carrier A is deactivated, and carrier B is deactivated; 01 represents that carrier A is deactivated, and carrier B is activated; 10 represents that carrier A is activated, and carrier B is deactivated; and 11 represents that carrier A is activated, and carrier B is activated.

Correspondingly, the user equipment may perform decoding according to a bitmap received from the base station, that is, "0" represents deactivation, "1" represents activation, and a sequence of "0" and "1" is the same as that of carrier sequence numbers preconfigured by the user equipment.

It should be noted that, the quantity of carriers configured for the user equipment is not limited to the quantity listed in the example of this embodiment, and the method for identifying the carrier status by the base station by means of a bitmap includes, but is not limited to, the method described in this embodiment of the present invention; other methods for identifying the carrier status by the base station by means of a bitmap are not described herein again in this embodiment.

Exemplarily, if there are two carriers configured for the user equipment, that is, carrier A and carrier B, the base station may encode carrier statuses of carrier A and carrier B in unified encoding mode. Specifically, the base station may select four different digits, four different letters, or four different other identifiers to encode the carrier statuses of carrier A and carrier B.

For example, the base station may select four letters, that is, a, b, c, and d, to indicate the carrier statuses of carrier A and carrier B to the user equipment.

Specifically, the base station may use a to represent that the carrier statuses of carrier A and carrier B are both deactivated states; use b to represent that the carrier status of carrier A is a deactivated state and the carrier status of carrier B is an activated state; use c to represent that the carrier status of carrier A is an activated state and the carrier status of carrier B is a deactivated state; and use d to represent that the carrier status of carrier A is an activated state and the carrier status of carrier B is an activated state.

After receiving the carrier statuses encoded by using a, the user equipment may stop transmitting an SRS on carrier A and carrier B, and/or, stop generating a CSI report on carrier A and carrier B, and/or, stop detecting downlink physical control channels of carrier A and carrier B, and/or, stop performing cross-carrier detection on downlink physical control channels of carrier A and carrier B, and/or, stop transmitting a RACH signal on carrier A and carrier B, and/or, stop transmitting an uplink shared channel on the carriers. After receiving the carrier statuses encoded by using b, the user equipment may stop transmitting an SRS on carrier A, and/or, stop generating a CSI report on carrier A, and/or, stop detecting a downlink physical control channel of carrier A, and/or, stop performing cross-carrier detection on a downlink physical control channel of carrier A, and/or, stop transmitting a RACH signal on carrier A, and/or, stop transmitting an uplink shared channel on the carrier, and continue transmitting an SRS on carrier B, and/or continue generating a CSI report on carrier B, and/or, continue detecting a downlink physical control channel of carrier B, and/or continue performing cross-carrier detection on a downlink physical control channel of carrier B. After receiving the carrier statuses encoded by using c, the user equipment may stop transmitting an SRS on carrier B, and/or, stop generating a CSI report on carrier B, and/or, stop detecting a downlink physical control channel of carrier B, and/or, stop performing cross-carrier detection on a downlink physical control channel of carrier B, and/or, stop transmitting a RACH signal on carrier B, and/or, stop transmitting an uplink shared channel on carrier B; and continue transmitting an SRS on carrier A, and/or continue generating a CSI report on carrier A, and/or, continue detecting a downlink physical control channel of carrier A, and/or continue performing cross-carrier detection on a downlink physical control channel of carrier A. After receiving the carrier statuses encoded by using d, the user equipment may stop transmitting an SRS on carrier A, and/or, stop generating a CSI report on carrier A, and/or, stop detecting a downlink physical control channel of carrier A, and/or, stop performing cross-carrier detection on a downlink physical control channel of carrier A, and/or, stop transmitting a RACH signal on carrier A, and/or, stop transmitting an uplink shared channel on carrier A; and stop transmitting an SRS on carrier B, and/or, stop generating a CSI report on carrier B, and/or, stop detecting a downlink physical control channel of carrier B, and/or, stop performing cross-carrier detection on a downlink physical control channel of carrier B, and/or, stop transmitting a RACH signal on carrier B, and/or, stop transmitting an uplink shared channel on carrier B.

It should be noted that, the user equipment has stored a preset bitmap decoding mode and a preset decoding mode that is corresponding to the unified encoding mode. After receiving the carrier status identified by means of a bitmap, the user equipment may use the preset bitmap decoding mode to decode the carrier status; after receiving the carrier status encoded by using the unified encoding mode, the user equipment may use the preset decoding mode corresponding to the unified encoding mode to decode the carrier status.

It should be noted that, the quantity of carriers configured for the user equipment is not limited to the quantity listed in the example of this embodiment, and the method for encoding the carrier status by the base station in unified encoding mode includes, but is not limited to, the method described in this embodiment of the present invention; other methods for encoding the carrier status by the base station in unified encoding mode are not described herein again in this embodiment.

It should be noted that, in the prior art, different carriers are configured for different user equipments, and in different user equipments, carrier sequence numbers preconfigured for a same carrier are different (for example, there are three carriers on a base station side, which are carrier A, carrier B, and carrier C; carriers configured for user equipment 1 include: carrier A and carrier B, and in the user equipment 1, preconfigured carrier No. 1 is carrier A, and preconfigured carrier No. 2 is carrier B; carriers configured for user equipment 2 include: carrier B and carrier C, and in the user equipment 2, preconfigured carrier No. 1 is carrier B, and preconfigured carrier No. 2 is carrier C); in this embodiment, carriers are not uniformly identified (or sorted). Therefore, in this embodiment, the first carrier information indicated by the base station to the user equipments is different. In the foregoing example, the base station may indicate only the carrier statuses of carrier A and carrier B to the user equipment 1, and indicates the carrier statuses of carrier C and carrier B to the user equipment 2.

Further, it can be learned from the foregoing that if the quantity of the carrier statuses of the carriers indicated by the base station to the user equipment is greater than the quantity of carriers that can be supported by the user equipment, it indicates that the user equipment can switch a communication state among multiple carriers that are beyond a carrier aggregation capability of the user equipment.

Further optionally, before S604, to ensure that the user equipment can receive the first carrier information correctly and in real time, the base station may repeatedly encode the downlink control information for indicating the first carrier information, or encode the downlink control information by using a coding bit rate that is lower than a common coding bit rate, or repeatedly send the downlink control information that is encoded.

For a specific method for repeatedly encoding the downlink control information by the base station, reference may be made to the related descriptions in Embodiment 5 of the present invention, and details are not described herein again in this embodiment.

The downlink physical control channel in this embodiment may include: a PDCCH or an E-PDCCH.

By using the foregoing solution, a base station may indicate first carrier information to user equipment by using a downlink physical control channel, where the first carrier information includes a carrier status of a carrier, so that the user equipment performs communication on the carrier according to the carrier status of the carrier. Compared with the prior art in which an activated state or a deactivated state of the carrier is indicated to the user equipment by using a MAC CE, in the solution, the carrier status is broadcast to the user equipment by using the downlink physical control channel, which has a smaller delay and lower network load. Therefore, a delay of indicating the activated state or deactivated state of the carrier can be reduced, and efficiency of indicating the activated state or deactivated state of the carrier can be improved.

Embodiment 7

Figure 8:
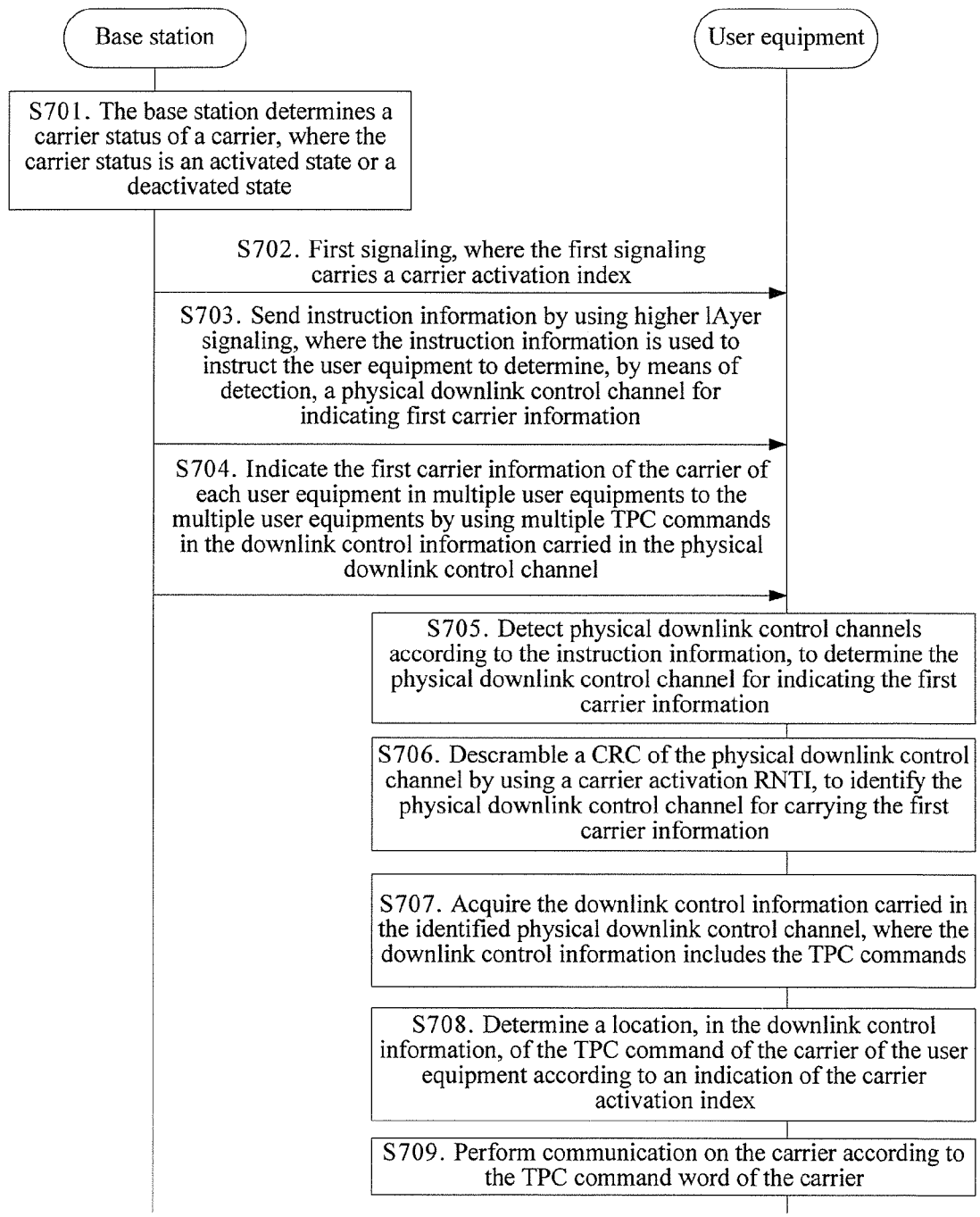
FIG. 8 is a flowchart of a carrier status indication method in Embodiment 7 of the present invention.

This embodiment of the present invention further provides a carrier status indication method, which may be applied in a process during which a base station indicates a carrier status to user equipment by using downlink control information (such as DCI format 3 or 3A). As shown in FIG. 8, the carrier status indication method may include:

S701: A base station determines a carrier status of a carrier, where the carrier status is an activated state or a deactivated state.

For a specific method for determining the carrier status of the carrier by the base station, reference may be made to related descriptions in other method embodiments of the present invention, and details are not described herein again in this embodiment of the present invention.

It should be noted that, the carrier status, included in the first carrier information, of the carrier includes: a carrier status of a carrier of the base station and/or a carrier status of a carrier of another base station.

For the another base station in this embodiment of the present invention, reference may be made to the related descriptions in Embodiment 1 of the present invention, and details are not described herein again in this embodiment of the present invention.

S702: The base station notifies each user equipment of a carrier activation index by using first signaling.

The carrier activation index is used to indicate a location, in downlink control information, of the first carrier information of the carrier of each user equipment. For the first signaling, reference may be made to related descriptions in other embodiments of the present invention, and details are not described herein again in this embodiment.

It should be noted that, in this embodiment, the carrier activation index is specifically used to indicate a location, in the downlink control information, of a TPC command for indicating a carrier for each user equipment.

S703: The base station sends instruction information to the user equipment by using higher layer signaling, where the instruction information is used to instruct the user equipment to determine, by means of detection, a downlink physical control channel for indicating first carrier information.

The instruction information is further used to indicate a format of downlink control information, an RNTI for scrambling a CRC, and search space for downlink physical control channel detection, where the downlink physical control channel is transmitted in common search space.

It should be noted that, the base station indicates, to the user equipment by sending the instruction information, a downlink physical control channel detection manner, and the user equipment detects downlink physical control channels in the common search space according to the detection manner indicated by the base station; in this way, a quantity of detections performed by the user equipment can be reduced, thereby avoiding extending an activation time or a deactivation time caused by multiple times of blind detection that needs to be performed by the user equipment.

In this embodiment, S702 may be performed first, and then S703 is performed; or S703 is performed first, and then S702 is performed; or further, S702 and S703 may be performed at the same time. A sequence of performing S702 and S703 is not limited in this embodiment.

S704: The base station indicates the first carrier information of the carrier of each user equipment in multiple user equipments to the multiple user equipments by using multiple TPC commands in the downlink control information carried by the downlink physical control channel.

The downlink control information is downlink control information obtained by scrambling a CRC of the downlink physical control channel by using a carrier activation radio network temporary identifier RNTI.

Exemplarily, each TPC command may have one bit, and may indicate a carrier status of one carrier, or each TPC command may have two bits of information, and may indicate carrier statuses of two carriers. For example, in the TPC command, "1" may be used to represent an activated state, and "0" may be used to represent a deactivated state.

In this embodiment, the downlink control information is a DCI format 3 or 3A; and the TPC command in the DCI format 3 or 3A is also used to indicate the carrier status of the carrier.

Further optionally, before S704, to ensure that the user equipment can receive the first carrier information correctly and in real time, the base station may repeatedly encode the downlink control information (downlink control information) for indicating the first carrier information, or encode the downlink control information by using a coding bit rate that is lower than a common coding bit rate, or repeatedly send the downlink control information that is encoded.

Specifically, the method of this embodiment of the present invention may further include: the base station repeatedly encodes the downlink control information; or the base station encodes the downlink control information by using a first coding bit rate, where the first coding bit rate is lower than a second coding bit rate, and the second coding bit rate is a common coding bit rate; or the base station repeatedly sends, to at least one user equipment, the downlink control information that is encoded.

S705: The user equipment detects downlink physical control channels according to the instruction information, to determine the downlink physical control channel for indicating the first carrier information.

The instruction information is used to instruct the user equipment to determine, by means of detection, the downlink physical control channel for indicating the first carrier information.

S706: The user equipment descrambles a CRC of the downlink physical control channel by using a carrier activation RNTI, to identify the downlink physical control channel for carrying the first carrier information.

The carrier activation RNTI is an RNTI that is used to identify the downlink physical control channel carrying the first carrier information and that is configured by the base station for the user equipment.

It should be noted that, for a specific method for descrambling, by the user equipment, the CRC of the downlink physical control channel by using the carrier activation RNTI, to identify the downlink physical control channel for carrying the first carrier information, reference may be made to related descriptions of S507 in Embodiment 5 of the present invention, and details are not described herein again in this embodiment.

S707: The user equipment acquires the downlink control information carried by the identified downlink physical control channel, where the downlink control information includes the TPC command.

The user equipment may demodulate the identified downlink physical control channel to acquire the downlink control information carried by the downlink physical control channel, and acquire the TPC command in the downlink control information, where the TPC command is used to indicate the first carrier information of the carrier of the user equipment.

S708: The user equipment determines a location, in the downlink control information, of the TPC command of the carrier of the user equipment according to an indication of the carrier activation index.

The user equipment may determine the location, in the downlink control information, of the first carrier information (that is, the TPC command of the carrier) of the carrier of the user equipment according to the indication of the carrier activation index, to acquire the first carrier information (that is, the TPC command of the carrier) rapidly, thereby improving efficiency of indicating the carrier status.

S709: The user equipment performs communication on the carrier according to the TPC command of the carrier.

The downlink physical control channel in this embodiment may include: a PDCCH or an E-PDCCH.

For a specific method for performing communication on the carrier by the user equipment, reference may be made to related descriptions in other embodiments of the present invention, and details are not described herein again herein in this embodiment.

By using the foregoing solution, a base station may indicate first carrier information to user equipment by using a downlink physical control channel, where the first carrier information includes a carrier status of a carrier, so that the user equipment performs communication on the carrier according to the carrier status of the carrier. Compared with the prior art in which an activated state or a deactivated state of the carrier is indicated to the user equipment by using a MAC CE, in the solution, the carrier status is broadcast to the user equipment by using the downlink physical control channel, which has a smaller delay and lower network load. Therefore, a delay of indicating the activated state or deactivated state of the carrier can be reduced, and efficiency of indicating the activated state or deactivated state of the carrier can be improved.

Embodiment 8

Figure 9:
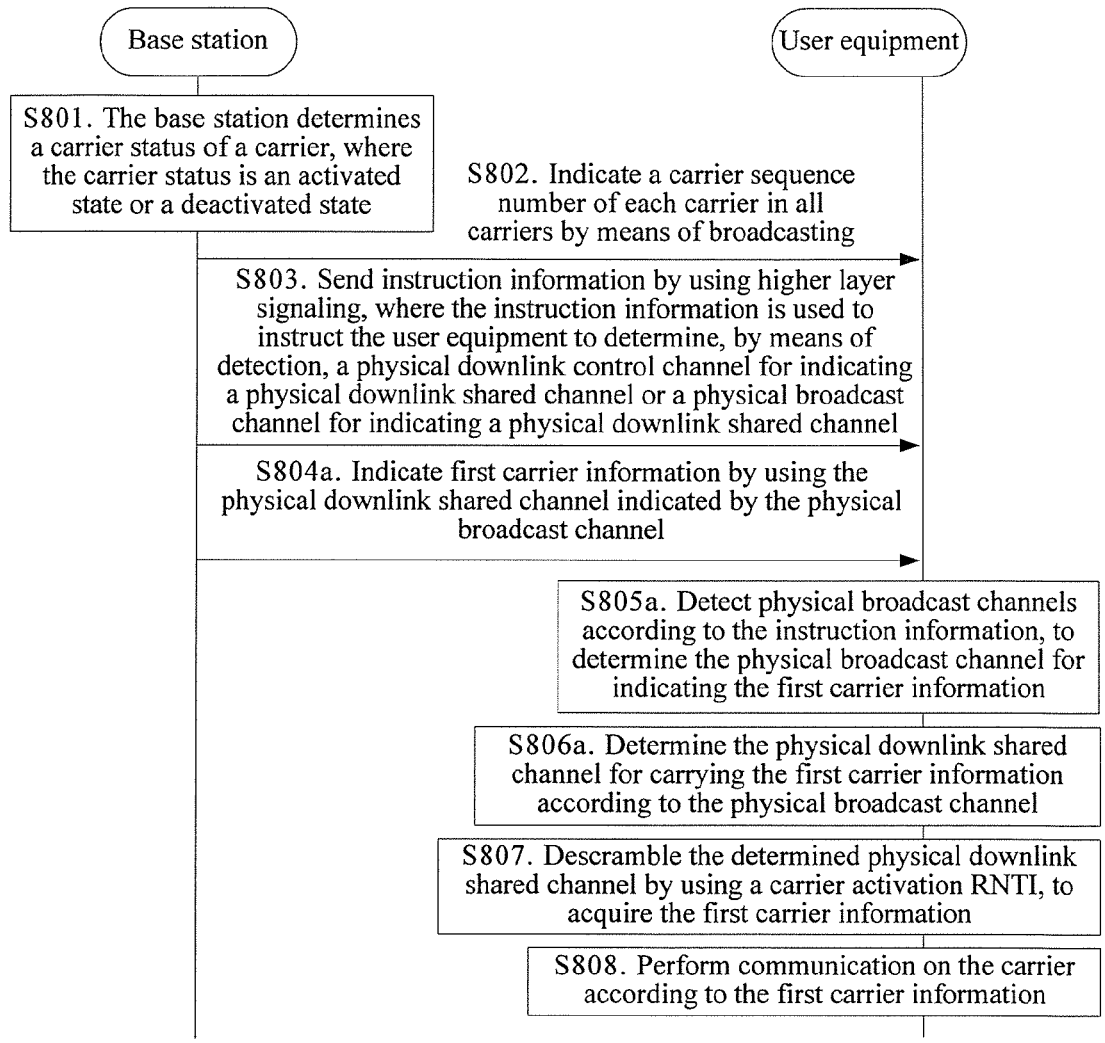
FIG. 9 is a flowchart of a carrier status indication method in Embodiment 8 of the present invention.
Figure 10:
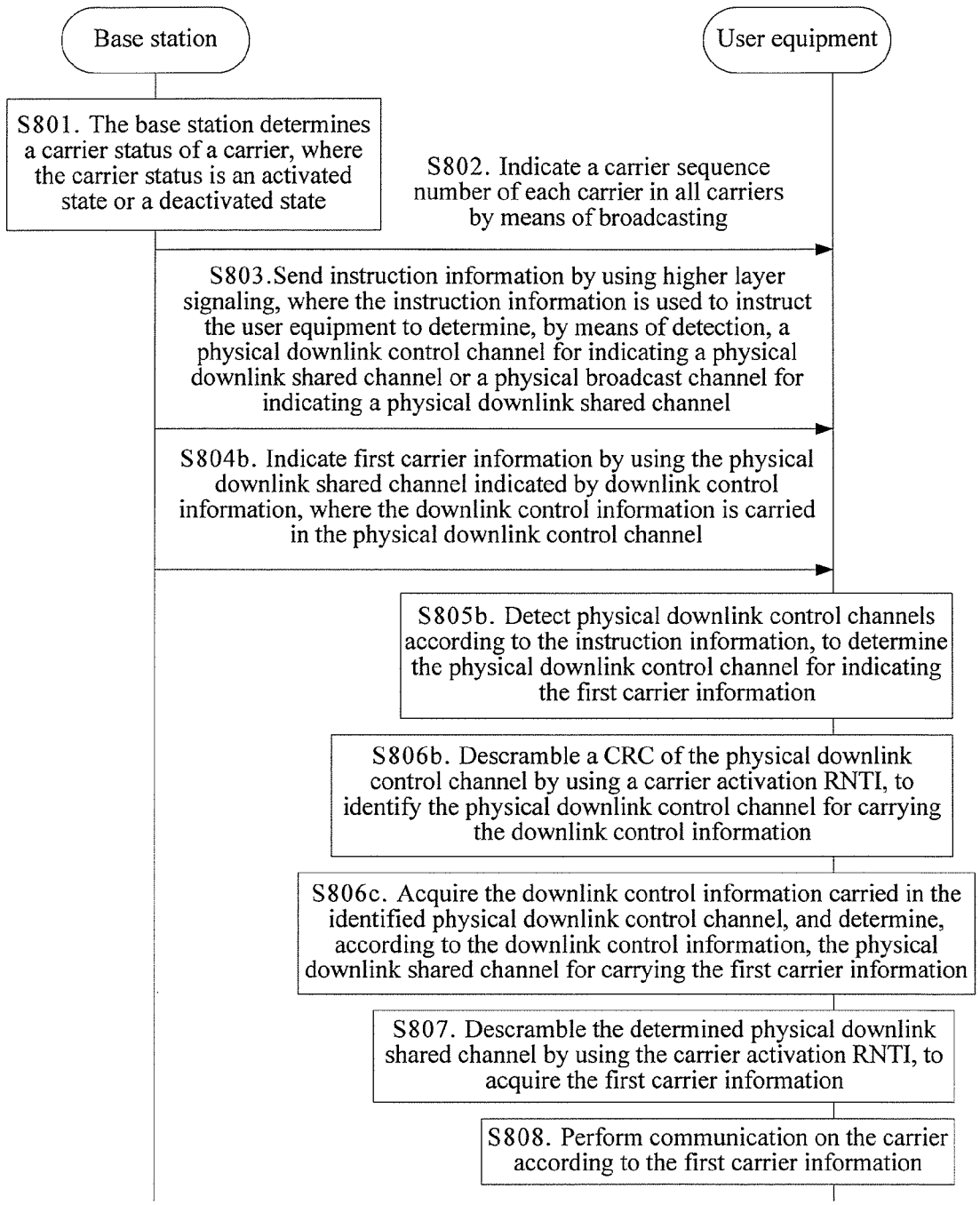
FIG. 10 is a flowchart of another carrier status indication method in Embodiment 8 of the present invention.

This embodiment of the present invention further provides a carrier status indication method, which may be applied in a process during which a base station indicates a carrier status to user equipment by using a physical downlink shared channel. As shown in FIG. 9 or FIG. 10, the carrier status indication method may include:

S801: A base station determines a carrier status of a carrier, where the carrier status is an activated state or a deactivated state.

It should be noted that, for a specific method for determining, by the base station, the carrier status of the carrier, reference may be made to related descriptions for the determining, by the base station, the carrier status of the carrier in other method embodiments of the present invention, and details are not described herein again in this embodiment.

It should be noted that, the carrier status, included in first carrier information, of the carrier includes: a carrier status of a carrier of the base station and/or a carrier status of a carrier of another base station.

For the another base station in this embodiment of the present invention, reference may be made to the related descriptions in Embodiment 1 of the present invention, and details are not described herein again in this embodiment of the present invention.

It should be noted that, the carrier in this embodiment of the present invention is all carriers, whose carrier statuses can change, of the base station. For example, the base station may include five carriers, and carrier statuses of three carriers among the five carriers can change; in this case, the carrier in this embodiment of the present invention is the three carriers whose carrier statuses can change.

Further, in this embodiment of the present invention, the carrier status indication method may further include: the base station may broadcast a carrier sequence number to user equipment.

In this step, the base station may configure a carrier sequence number for each carrier according to at least one of a physical identifier (Identifier, ID) of at least one carrier, a frequency band of the at least one carrier, and bandwidth of the at least one carrier, separately identify each carrier by using the carrier sequence number configured for each carrier, and broadcast the carrier sequence number to the user equipment, so that the user equipment can perform communication on the carrier according to the carrier sequence number and the carrier status of the carrier.

In this embodiment of the present invention, in the prior art, in different user equipments, carrier sequence numbers preconfigured for a same carrier are different. For example, in a case of two carriers, which are carrier A and carrier B; in the prior art, in user equipment 1, preconfigured carrier No. 1 is carrier A, and preconfigured carrier No. 2 is carrier B; and in user equipment 2, preconfigured carrier No. 1 is carrier B. Therefore, in this embodiment of the present invention, the base station may configure, in all user equipments, a same carrier sequence number for a same carrier. The carrier status indication method may further include S802:

S802: The base station indicates a carrier sequence number of each carrier in all carriers to the user equipment by means of broadcasting.

The carrier sequence number is a sequence number configured for each carrier, each carrier has a different carrier sequence number, and the carrier sequence number and the carrier identified by the carrier sequence number are uniform for all user equipments served by the base station.

It should be noted that, compared with indicating, by the base station to different user equipments, the carrier status and carrier sequence numbers applicable to the user equipments, combining a uniform carrier sequence number configuration and an indication of the carrier status to each user equipment in broadcast form can reduce a waste of channel resources and reduce network load, and can implement a fast indication of the carrier status, thereby improving efficiency of indicating the carrier status.

Further optionally, S802 may be replaced with S802': The base station sends a carrier sequence number of each carrier in all carriers to the user equipment by using dedicated signaling.

The dedicated signaling may be RRC signaling, MAC signaling, or the like.

It should be noted that, in this embodiment, the carrier sequence number is identified according to a central frequency of the carrier corresponding to the carrier sequence number, and/or, the carrier sequence number is identified according to a physical identifier of the carrier corresponding to the carrier sequence number.

For a method for identifying, by the base station, the carrier sequence number by using a central frequency of the carrier corresponding to the carrier sequence number or by using a physical identifier of the carrier corresponding to the carrier sequence number, reference may be made to specific content of other method embodiments, and details are not described herein again in this embodiment.

In a first application scenario of this embodiment, the carrier status, included in the first carrier information, of the carrier is carrier statuses of all the carriers, that is, the base station may indicate, to the user equipment, the carrier statuses of all the carriers, whose carrier statuses can change, of the base station.

In a second application scenario of this embodiment, the carrier status, included in the first carrier information, of the carrier is carrier statuses of carriers whose carrier statuses have changed, that is, the base station may indicate, to the user equipment, carrier statuses of carriers which are among all the carriers whose carrier statuses can change and of which the carrier statuses have changed in the base station.

In the second application scenario, the method of this embodiment of the present invention may further include: The base station indicates, to the user equipment by using second signaling, a quantity of carriers whose carrier statuses have changed.

For the second signaling, reference may be made to related descriptions in other embodiments of the present invention, and details are not described herein again in this embodiment.

S803: The base station sends instruction information to the user equipment by using higher layer signaling, where the instruction information is used to instruct the user equipment to detect a downlink physical control channel for indicating a physical downlink shared channel or a physical broadcast channel for indicating a physical downlink shared channel.

In this embodiment, the instruction information is further used to indicate, to the user equipment, a format of the physical downlink shared channel and search space for physical downlink shared channel detection, where the physical downlink shared channel may be transmitted in common search space. The first carrier information includes the carrier status of the carrier, and the first carrier information is used to enable the user equipment to perform communication on the carrier according to the carrier status.

The base station instructs, by sending the instruction information, the user equipment to determine, by means of detection, the physical downlink shared channel for indicating the first carrier information, so that a quantity of detections performed by the user equipment can be reduced, thereby avoiding extending an activation time or a deactivation time caused by multiple times of blind detection that needs to be performed by the user equipment.

In the first application scenario of this embodiment, as shown in FIG. 9, the method of this embodiment of the present invention further includes S804a:

S804a: The base station indicates first carrier information to the user equipment by using the physical downlink shared channel that is indicated by the physical broadcast channel.

In the second application scenario of this embodiment, as shown in FIG. 10, the method of this embodiment of the present invention further includes S804b:

S804b: The base station indicates first carrier information to the user equipment by using the physical downlink shared channel that is indicated by downlink control information, where the downlink control information is carried by the downlink physical control channel.

In the second application scenario, the downlink control information is obtained by scrambling a CRC of the downlink physical control channel by using a carrier activation RNTI, and the first carrier information is obtained by means of scrambling using the carrier activation RNTI; the carrier activation RNTI is an RNTI that is used to identify the downlink physical control channel carrying the downlink control information and that is configured by the base station for the user equipment, and an RNTI that is used to identify the first carrier information on the physical downlink shared channel and that is configured by the base station for the user equipment. The downlink control information in this embodiment may be any downlink control information (DCI) in the prior art.

It should be noted that, for specific content of the first carrier information in this embodiment, reference may be made to related descriptions in Embodiment 5 of the present invention, and details are not described herein again in this embodiment.

It should be noted that, the carrier status, included in the first carrier information indicated by the base station to the user equipment, of the carrier may include a carrier status of a carrier that has been configured by the base station for the user equipment, and may also include a carrier status of a carrier that has never been configured by the base station for the user equipment. That is, a quantity of carrier statuses of carriers that are indicated by the base station to the user equipment may be greater than a quantity of carriers that can be supported by the user equipment (that is, carriers that have been configured by the base station for the user equipment). The carrier statuses of all the carriers or the carrier statuses of the carriers whose carrier statuses have changed.

When the first carrier information indicated by the base station to the user equipment includes a carrier status of a carrier that has never been configured by the base station for the user equipment, the user equipment may perform communication on the carrier only according to the carrier status of the carrier that has been configured for the user equipment, and ignore the carrier status, included in the first carrier information, of the carrier that has never been configured by the base station for the user equipment.

Further, the base station may also perform, according to the carrier status, included in the first carrier information, of the carrier that has never been configured by the base station for the user equipment, communication on the carrier that has never been configured. Because the quantity of the carrier statuses of the carriers indicated by the base station to the user equipment is greater than the quantity of carriers that can be supported by the user equipment, it indicates that the user equipment can switch a communication state among multiple carriers that are beyond a carrier aggregation capability of the user equipment.

Further optionally, before S804, to ensure that the user equipment can receive the first carrier information correctly and in real time, the base station may repeatedly encode the downlink control information for indicating the first carrier information, or encode the downlink control information by using a coding bit rate that is lower than a common coding bit rate, or repeatedly send the downlink control information that is encoded.

Repeated encoding refers to that the base station may encode, repeatedly by using a given channel encoding format, the downlink control information that needs to be transmitted and that is used for indicating the first carrier information, which can improve security of information transmission.

The user equipment may determine, according to the instruction information in the higher layer signaling, the downlink physical control channel for indicating the physical downlink shared channel or the physical broadcast channel for indicating the physical downlink shared channel.

Specifically, in the first application scenario, as shown in FIG. 9, the method of this embodiment further includes S805*a*; and in the second application scenario, as shown in FIG. 10, the method of this embodiment further includes S805*b*.

S805*a*: The user equipment detects physical broadcast channels according to the instruction information, to determine the physical broadcast channel for indicating the first carrier information.

The instruction information is used to instruct the user equipment to determine, by means of detection, the physical broadcast channel for indicating the physical downlink shared channel.

The instruction information is specifically used to indicate a format of the physical broadcast channel and search space for physical broadcast channel detection, and the physical broadcast channel may be transmitted in common search space.

It should be noted that, the base station indicates, to the user equipment by sending the instruction information, a physical broadcast channel detection manner, and the user equipment detects physical broadcast channels in the common search space according to the detection manner indicated by the base station; in this way, a quantity of detections performed by the user equipment can be reduced, thereby avoiding extending an activation time or a deactivation time caused by multiple times of blind detection that needs to be performed by the user equipment.

S805*b*: The user equipment detects downlink physical control channels according to the instruction information, to determine the downlink physical control channel for indicating the first carrier information.

The instruction information is used to instruct the user equipment to determine, by means of detection, the downlink physical control channel for indicating the physical downlink shared channel.

Further, the user equipment may determine the physical downlink shared channel for carrying the first carrier information or the physical broadcast channel for carrying the first carrier information.

The instruction information is specifically used to indicate a format of the downlink physical control channel, an RNTI for scrambling a CRC, and search space for downlink physical control channel detection, where the downlink physical control channel may be transmitted in common search space.

It should be noted that, the base station indicates, to the user equipment by sending the instruction information, a downlink physical control channel detection manner, and the user equipment detects downlink physical control channels in the common search space according to the detection manner indicated by the base station; in this way, a quantity of detections performed by the user equipment can be reduced, thereby avoiding extending an activation time or a deactivation time caused by multiple times of blind detection that needs to be performed by the user equipment.

Specifically, in the first application scenario of this embodiment, as shown in FIG. 9, the method of this embodiment further includes: S806*a*; and in the second application scenario of this embodiment, as shown in FIG. 10, the method of this embodiment further includes: S806*b* to S806*c*.

S806*a*: The user equipment determines the physical downlink shared channel for carrying the first carrier information according to the physical broadcast channel.

The physical broadcast channel is used to indicate, to the user equipment, the physical downlink shared channel for carrying the first carrier information.

S806*b*: The user equipment descrambles a CRC of the downlink physical control channel by using a carrier activation RNTI, to identify the downlink physical control channel for carrying the downlink control information.

Because the base station uses the carrier activation RNTI to scramble the CRC of the downlink physical control channel for carrying the downlink control information, correspondingly, the user equipment may use the carrier activation RNTI to descramble the CRC of the downlink physical control channel, and the downlink physical control channel for carrying the downlink control information can be identified.

S806*c*: The user equipment acquires the downlink control information carried by the identified downlink physical control channel, and determines, according to the downlink control information, the physical downlink shared channel for carrying the first carrier information.

The downlink control information is used to indicate the physical downlink shared channel carrying the first carrier information.

Because the first carrier information is scrambled by the base station by using the carrier activation RNTI, as shown in FIG. 9 or FIG. 10, the method of this embodiment may further include S807.

S807: The user equipment descrambles the determined physical downlink shared channel by using the carrier activation RNTI, to acquire the first carrier information.

The physical downlink shared channel may include a large amount of information, and the first carrier information is scrambled by the base station by using the carrier activation RNTI; therefore, the user equipment may use the carrier activation RNTI to descramble the determined physical downlink shared channel, to acquire the first carrier information.

S808: The user equipment performs communication on the carrier according to the first carrier information.

The carrier sequence number is identified according to a central frequency of the carrier corresponding to the carrier sequence number; and/or, the carrier sequence number is identified according to a physical identifier of the carrier corresponding to the carrier sequence number. Therefore, the user equipment may determine, among carrier statuses, the carrier status of each carrier of the user equipment according to an identifier (the central frequency of the carrier and/or the physical identifier of the carrier) of the carrier sequence number of each carrier, and perform communication on the carrier according to an indication of the carrier status.

It should be noted that, for a specific method for performing communication on the carrier by the user equipment according to state information of the carrier, reference may be made to related descriptions in Embodiment 1, and details are not described herein again in this embodiment.

By using the foregoing solution, a base station may indicate first carrier information to user equipment by using a physical downlink shared channel, where the first carrier information includes a carrier status of a carrier, so that the user equipment performs communication on the carrier according to the carrier status of the carrier. Compared with the prior art in which an activated state or a deactivated state of the carrier is indicated to the user equipment by using a MAC CE, in the solution, the carrier status is broadcast to the user equipment by using the physical downlink shared channel, which has a smaller delay and lower network load. Therefore, a delay of indicating the activated state or deactivated state of the carrier can be reduced, and efficiency of indicating the activated state or deactivated state of the carrier can be improved.

Further, because a quantity of carrier statuses of carriers indicated by the base station to the user equipment is greater than a quantity of carriers that can be supported by the user equipment, the user equipment can switch a communication state among multiple carriers that are beyond a carrier aggregation capability of the user equipment.

Embodiment 9

Figure 11:
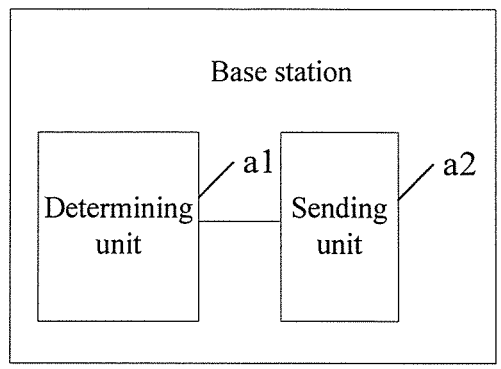
FIG. 11 is a schematic composition diagram of a base station in Embodiment 9 of the present invention.

This embodiment of the present invention further provides a base station. As shown in FIG. 11, the base station includes a determining unit a1 and a sending unit a2.

The determining unit a1 is configured to determine a carrier status of a carrier, where the carrier status is an activated state or a deactivated state.

Further, the carrier status, included in the first carrier information, of the carrier includes: a carrier status of a carrier of the base station and/or a carrier status of a carrier of another base station.

The sending unit a2 is configured to indicate first carrier information to user equipment by using a downlink physical control channel, where the first carrier information includes the carrier status, determined by the determining unit a1, of the carrier, and the first carrier information is used to enable the user equipment to perform communication on the carrier according to the carrier status.

Further, the sending unit a2 is further configured to indicate the first carrier information to the user equipment by using downlink control information carried by the downlink physical control channel.

The downlink control information sent by the sending unit a2 is downlink control information that is obtained by scrambling a cyclic redundancy check CRC of the downlink physical control channel by using a carrier activation radio network temporary identifier RNTI, and the carrier activation RNTI is an RNTI that is used to identify the downlink physical control channel carrying the first carrier information and that is configured by the base station for the user equipment.

Further, the carrier sent by the sending unit a2 is all carriers, whose carrier statuses can change, of the base station and/or the other base station.

Further, the sending unit a2 is configured to: before indicating the first carrier information to the user equipment by using the downlink physical control channel, indicate a carrier sequence number of each carrier in all the carriers to the user equipment by means of broadcasting.

Alternatively, the sending unit a2 is configured to: before indicating the first carrier information to the user equipment by using the downlink physical control channel, send a carrier sequence number of each carrier in all the carriers to the user equipment by using dedicated signaling.

The carrier sequence number sent by the sending unit a2 is a sequence number configured for each carrier, each carrier has a different carrier sequence number, and the carrier sequence number sent by the sending unit a2 and the carrier identified by the carrier sequence number are uniform for all user equipments served by the base station.

Further, the carrier sequence number sent by the sending unit a2 is identified according to a central frequency of the carrier corresponding to the carrier sequence number, and/or, the carrier sequence number sent by the sending unit a2 is identified according to a physical identifier of the carrier corresponding to the carrier sequence number.

Further, the carrier status, included in the first carrier information sent by the sending unit a2, of the carrier is carrier statuses of all the carriers.

Further, the user equipment is multiple user equipments, the carrier status, included in the first carrier information sent by the sending unit a2, of the carrier is carrier statuses of all carriers whose carrier statuses can change, where all the carriers whose carrier statuses can change are directed, in the base station, against each user equipment in the multiple user equipments.

Further, the sending unit a2 is further configured to: before indicating the first carrier information to the user equipment by using the downlink physical control channel, indicate, to the user equipment by using second signaling, a quantity of carriers whose carrier statuses have changed, where the carrier status, included in the first carrier information, of the carrier is the carrier statuses of the carriers whose carrier statuses have changed.

Further, the downlink control information sent by the sending unit a2 is a downlink control information DCI format 3 or 3A; and a transmit power control TPC command in the DCI format 3 or 3A is also used for indicating the carrier status of the carrier.

Further, the sending unit a2 is further configured to indicate the first carrier information of the carrier of each user equipment in the multiple user equipments to the multiple user equipments by using multiple TPC commands in the downlink control information carried by the downlink physical control channel.

Further, the sending unit a2 is further configured to: before indicating the first carrier information to the user equipment by using the downlink physical control channel, notify each user equipment of a carrier activation index by using first signaling, where the carrier activation index is used to indicate a location, in the downlink control information, of the first carrier information of the carrier of each user equipment.

Further, the carrier status of the carrier sent by the sending unit a2 is identified by means of a bitmap; or the carrier status of the carrier sent by the sending unit a2 is encoded in unified encoding mode.

Further, the sending unit a2 is further configured to: before indicating the first carrier information to the user equipment by using the downlink physical control channel, send instruction information to the user equipment by using higher layer signaling, where the instruction information is used to instruct the user equipment to determine, by means of detection, the downlink physical control channel for indicating the first carrier information.

Figure 12:
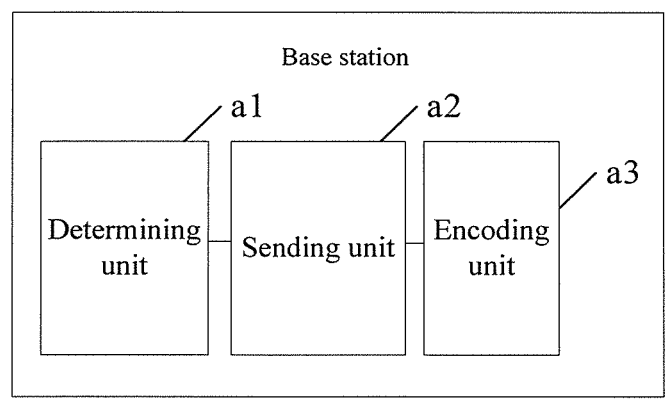
FIG. 12 is a schematic composition diagram of another base station in Embodiment 9 of the present invention.

Further, as shown in FIG. 12, the base station may further include: an encoding unit a3.

The encoding unit a3 is configured to: before the sending unit a2 indicates the first carrier information to the user equipment by using the downlink physical control channel, encode the downlink control information.

The encoding unit a3 is further configured to repeatedly encode the downlink control information.

Alternatively, the encoding unit a3 is further configured to encode the downlink control information by using a first coding bit rate, where the first coding bit rate is lower than a second coding bit rate, and the second coding bit rate is a common coding bit rate.

Alternatively, the sending unit a2 is further configured to repeatedly send the downlink control information encoded by the encoding unit a3 to the user equipment.

Further, the downlink physical control channel includes: a physical downlink control channel PDCCH or an enhanced physical downlink control channel E-PDCCH.

The base station in the foregoing solution may indicate first carrier information to user equipment by using a downlink physical control channel, where the first carrier information includes a carrier status of the carrier, so that the user equipment performs communication on the carrier according to the carrier status of the carrier. Compared with the prior art in which an activated state or a deactivated state of the carrier is indicated to the user equipment by using a MAC CE, in the solution, the carrier status is broadcast to the user equipment by using the downlink physical control channel, which has a smaller delay and lower network load. Therefore, a delay of indicating the activated state or deactivated state of the carrier can be reduced, and efficiency of indicating the activated state or deactivated state of the carrier can be improved.

Embodiment 10

Figure 13:
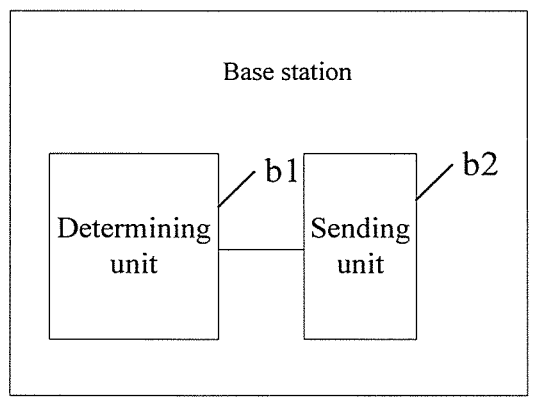
FIG. 13 is a schematic composition diagram of a base station in Embodiment 10 of the present invention.

This embodiment of the present invention further provides a base station. As shown in FIG. 13, the base station includes a determining unit b1 and a sending unit b2.

The determining unit b1 is configured to determine a carrier status of a carrier, where the carrier status is an activated state or a deactivated state.

Further, the carrier status, included in the first carrier information, of the carrier includes: a carrier status of a carrier of the base station and/or a carrier status of a carrier of another base station.

The sending unit b2 is configured to indicate first carrier information to user equipment by using a physical downlink shared channel that is indicated by a physical broadcast channel or by downlink control information, where the downlink control information sent by the sending unit b2 is carried by a downlink physical control channel.

The first carrier information sent by the sending unit b2 includes the carrier status, determined by the determining unit b1, of the carrier; the first carrier information sent by the sending unit b2 is used to enable the user equipment to perform communication on the carrier according to the carrier status, the downlink control information sent by the sending unit b2 is obtained by scrambling a cyclic redundancy check CRC of the downlink physical control channel by using a carrier activation radio network temporary identifier RNTI; the first carrier information is obtained by means of scrambling using the carrier activation RNTI; and the carrier activation RNTI is an RNTI that is used to identify the downlink physical control channel carrying the downlink control information and that is configured by the base station for the user equipment, and an RNTI that is used to identify the first carrier information on the physical downlink shared channel and that is configured by the base station for the user equipment.

Further, the carrier sent by the sending unit a2 is all carriers, whose carrier statuses can change, of the base station and/or the other base station.

The sending unit b2 is configured to: before indicating the first carrier information to the user equipment by using the physical downlink shared channel that is indicated by the physical broadcast channel or by the downlink control information, indicate a carrier sequence number of each carrier in all the carriers to the user equipment by means of broadcasting.

Alternatively, the sending unit b2 is configured to: before indicating the first carrier information to the user equipment by using the physical downlink shared channel that is indicated by the physical broadcast channel or by the downlink control information, send a carrier sequence number of each carrier in all the carriers to the user equipment by using dedicated signaling.

The carrier sequence number sent by the sending unit b2 is a sequence number configured for each carrier, each carrier has a different carrier sequence number, and the carrier sequence number and the carrier identified by the carrier sequence number are uniform for all user equipments served by the base station.

Further, the carrier sequence number sent by the sending unit b2 is identified according to a central frequency of the carrier corresponding to the carrier sequence number; and/or, the carrier sequence number sent by the sending unit b2 is identified according to a physical identifier of the carrier corresponding to the carrier sequence number.

Further, the carrier status, included in the first carrier information sent by the sending unit b2, of the carrier is carrier statuses of all the carriers.

Further, the sending unit b2 is further configured to: before indicating the first carrier information to the user equipment by using the physical downlink shared channel that is indicated by the physical broadcast channel or by the downlink control information, indicate, to the user equipment by using first signaling, a quantity of carriers whose carrier statuses have changed.

The carrier status, included in the first carrier information sent by the sending unit b2, of the carrier is the carrier statuses of the carriers whose carrier statuses have changed.

Further, the sending unit b2 is further configured to: before indicating the first carrier information to the user equipment by using the physical downlink shared channel that is indicated by the physical broadcast channel or by the downlink control information, send instruction information to the user equipment by using higher layer signaling, where the instruction information sent by the sending unit b2 is used to instruct the user equipment to detect the physical downlink shared channel for indicating the first carrier information.

Figure 14:
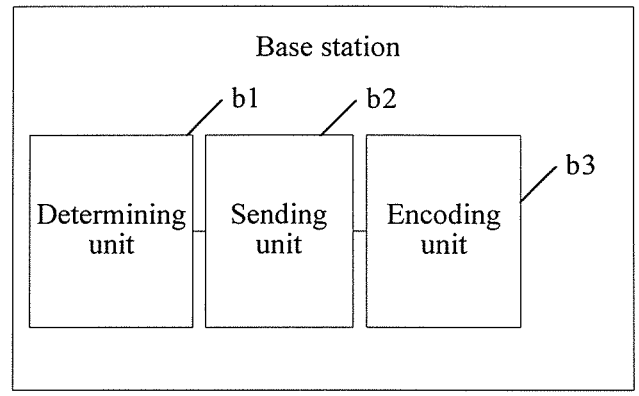
FIG. 14 is a schematic composition diagram of another base station in Embodiment 10 of the present invention.

Further, as shown in FIG. 14, the base station may further include: an encoding unit b3.

The encoding unit b3 is configured to: before the sending unit b2 indicates the first carrier information to the user equipment by using the physical downlink shared channel that is indicated by the downlink control information, encode the downlink control information.

The encoding unit b3 is further configured to repeatedly encode the downlink control information.

Alternatively, the encoding unit b3 is further configured to encode the downlink control information by using a first coding bit rate, where the first coding bit rate is lower than a second coding bit rate, and the second coding bit rate is a common coding bit rate.

Alternatively, the sending unit b2 is further configured to repeatedly send the downlink control information encoded by the encoding unit b3 to the user equipment.

Further, the downlink physical control channel includes: a physical downlink control channel PDCCH or an enhanced physical downlink control channel E-PDCCH.

In the foregoing solution, a base station may indicate first carrier information to user equipment by using a physical downlink shared channel, where the first carrier information includes a carrier status of the carrier, so that the user equipment performs communication on the carrier according to the carrier status of the carrier. Compared with the prior art in which an activated state or a deactivated state of the carrier is indicated to the user equipment by using a MAC CE, in the solution, the carrier status is broadcast to the user equipment by using the physical downlink shared channel, which has a smaller delay and lower network load. Therefore, a delay of indicating the activated state or deactivated state of the carrier can be reduced, and efficiency of indicating the activated state or deactivated state of the carrier can be improved.

Embodiment 11

Figure 15:
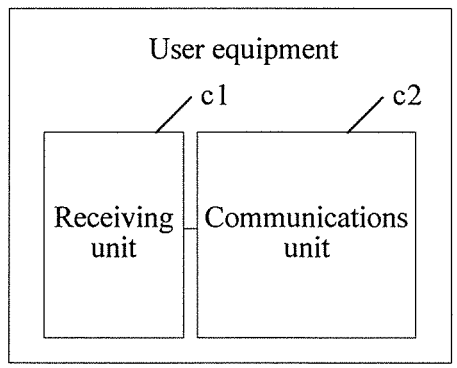
FIG. 15 is a schematic composition diagram of user equipment in Embodiment 11 of the present invention.

This embodiment of the present invention further provides user equipment. As shown in FIG. 15, the user equipment includes a receiving unit c1, and a communications unit c2.

The receiving unit c1 is configured to receive a downlink physical control channel sent by a base station, where the downlink physical control channel received by the receiving unit c1 includes first carrier information, the first carrier information includes a carrier status of a carrier, and the carrier status is an activated state or a deactivated state.

The communications unit c2 is configured to perform communication on the carrier according to the first carrier information received by the receiving unit c1.

Further, the carrier status, included in the first carrier information, of the carrier includes: a carrier status of a carrier of the base station and/or a carrier status of a carrier of another base station.

Figure 16:
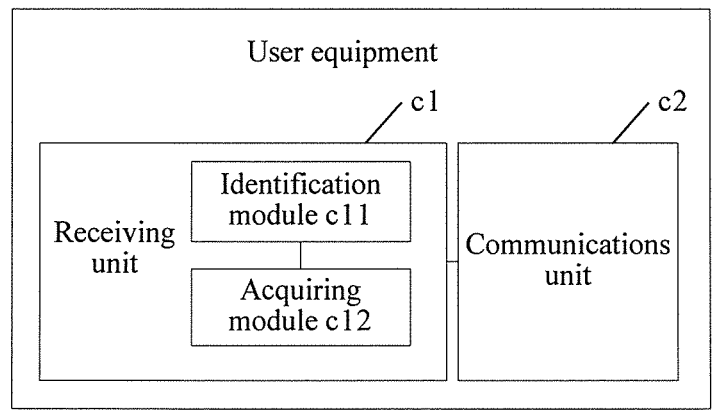
FIG. 16 is a schematic composition diagram of another user equipment in Embodiment 11 of the present invention.

Further, as shown in FIG. 16, the receiving unit c1 may include: an identification module c11 and an acquiring module c12.

The identification module c11 is configured to descramble a cyclic redundancy check CRC of the downlink physical control channel by using a carrier activation radio network temporary identifier RNTI, to identify the downlink physical control channel for carrying the first carrier information.

The acquiring module c12 is configured to acquire the downlink control information carried by the downlink physical control channel identified by the identification module c11, where the downlink control information includes the first carrier information.

The carrier activation RNTI is an RNTI that is used to identify the downlink physical control channel carrying the first carrier information and that is configured by the base station for the user equipment.

Further, the carrier received by the receiving unit c1 is all carriers, whose carrier statuses can change, of the base station and/or the other base station.

The receiving unit c1 is further configured to: before receiving the downlink physical control channel sent by the base station, acquire a carrier sequence number that is of each carrier in all the carriers and that is indicated by the base station to the user equipment by means of broadcasting;

or receive dedicated signaling sent by the base station, where the dedicated signaling carries a carrier sequence number of each carrier in all the carriers.

The carrier sequence number received by the receiving unit c1 is a sequence number configured for each carrier, each carrier has a different carrier sequence number, and the carrier sequence number and the carrier identified by the carrier sequence number are uniform for all user equipments served by the base station.

Further, the carrier sequence number received by the receiving unit c1 is identified according to a central frequency of the carrier corresponding to the carrier sequence number, and/or, the carrier sequence number received by the receiving unit c1 is identified according to a physical identifier of the carrier corresponding to the carrier sequence number.

Further, the carrier status, included in the first carrier information received by the receiving unit c1, of the carrier is carrier statuses of all the carriers.

Further, the carrier status, included in the first carrier information received by the receiving unit c1, of the carrier is: carrier statuses of all carriers whose carrier statuses can change, which are directed against the user equipment and among all carriers whose carrier statuses can change.

Further, the receiving unit c1 is further configured to: before receiving the downlink physical control channel sent by the base station, where the downlink physical control channel includes the first carrier information, receive second signaling sent by the base station, where the second signaling carries a quantity of carriers whose carrier statuses have changed.

The carrier status, included in the first carrier information received by the receiving unit c1, of the carrier is the carrier statuses of the carriers whose carrier statuses have changed.

Further, the downlink control information received by the receiving unit c1 is a downlink control information DCI format 3 or 3A; and a transmit power control TPC command in the DCI format 3 or 3A is also used for indicating the carrier status of the carrier.

Further, the receiving unit c1 is further configured to: receive the downlink control information carried by the downlink physical control channel, and acquire the TPC command in the downlink control information, where the TPC command is used for indicating the first carrier information of the carrier of the user equipment.

Further, the receiving unit c1 is further configured to: before receiving the downlink physical control channel sent by the base station, where the downlink physical control channel includes the first carrier information, receive first signaling sent by the base station, where the first signaling carries a carrier activation index.

Figure 17:
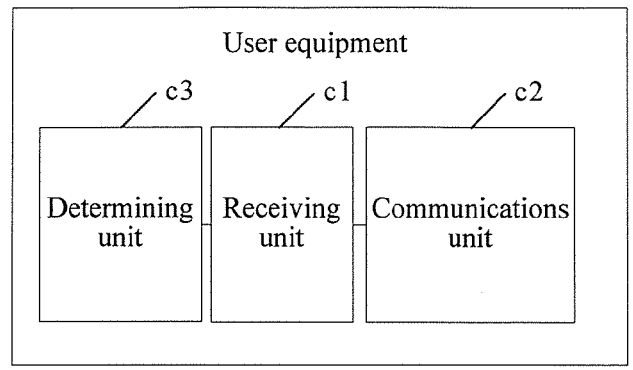
FIG. 17 is a schematic composition diagram of another user equipment in Embodiment 11 of the present invention.

Further, as shown in FIG. 17, the user equipment may further include: a determining unit c3.

The determining unit c3 is configured to determine a location, in the downlink control information, of the first carrier information of the carrier of the user equipment according to an indication of the carrier activation index received by the receiving unit c1.

Further, the determining unit c3 is further configured to: after the receiving unit c1 receives the downlink physical control channel sent by the base station, where the downlink physical control channel includes the first carrier information, determine the carrier status of the carrier by means of a bitmap, where the carrier status of the carrier is identified by the base station by means of a bitmap;

or determine the carrier status of the carrier in unified decoding mode, where the carrier status of the carrier is encoded by the base station in unified encoding mode corresponding to the unified decoding mode.

The carrier status received by the receiving unit c1 is the activated state or the deactivated state.

Further, the receiving unit c1 is further configured to: before receiving the downlink physical control channel sent by the base station, receive instruction information that is sent by the base station by using higher layer signaling.

The determining unit c3 is further configured to detect downlink physical control channels according to the instruction information received by the receiving unit c1, to determine the downlink physical control channel for indicating the first carrier information.

The instruction information received by the receiving unit c1 is used to instruct the user equipment to detect the downlink physical control channel for indicating the first carrier information.

Further, the receiving unit c1 is further configured to receive the downlink control information that is repeatedly encoded on the downlink physical control channel;

or receive the downlink control information that is encoded by using a first coding bit rate on the downlink physical control channel, where the first coding bit rate is lower than a second coding bit rate, and the second coding bit rate is a common coding bit rate;

or receive, from the base station, multiple pieces of the downlink control information that is encoded.

Further, the downlink physical control channel includes: a physical downlink control channel PDCCH or an enhanced physical downlink control channel E-PDCCH.

Further, the carrier status received by the receiving unit c1 is the activated state or the deactivated state.

The communications unit c2 is further configured to: if the carrier status is the activated state, transmit a sounding reference signal SRS on the carrier, where the SRS is used for channel state detection; and/or, generate a channel state information CSI report on the carrier, where the CSI includes at least a channel quality indicator CQI, a precoding matrix indicator PMI, and a rank indication RI; and/or, detect a downlink physical control channel of the carrier, and/or, detect a downlink physical control channel that indicates a scheduling result on the carrier.

Further, the communications unit c2 is configured to: if the carrier status is the deactivated state, stop transmitting an SRS on the carrier, and/or, stop generating a CSI report on the carrier, where the CSI includes at least a CQI, a PMI, and an RI; and/or, stop detecting a downlink physical control channel of the carrier; and/or, stop detecting a downlink physical control channel that indicates a scheduling result on the carrier, and/or, stop transmitting a random access channel RACH signal on the carrier; and/or, stop transmitting an uplink shared channel on the carrier.

In the foregoing solution, user equipment may acquire first carrier information from a downlink physical control channel, and perform communication on the carrier according to the first carrier information. Compared with the prior art in which an activated state or a deactivated state of the carrier is indicated to the user equipment by using a MAC CE, in the solution, the carrier status is acquired by the user equipment by using the downlink physical control channel, which has a smaller delay and lower network load. Therefore, a delay of indicating the activated state or deactivated state of the carrier can be reduced, and efficiency of indicating the activated state or deactivated state of the carrier can be improved.

Embodiment 12

Figure 18:
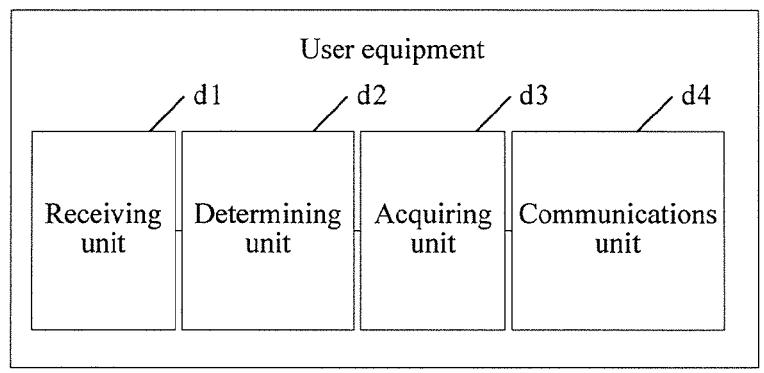
FIG. 18 is a schematic composition diagram of user equipment in Embodiment 12 of the present invention.

This embodiment of the present invention further provides user equipment. As shown in FIG. 18, the user equipment includes a receiving unit d1, a determining unit d2, an acquiring unit d3, and a communications unit d4.

The receiving unit d1 is configured to receive physical downlink shared channels.

The determining unit d2 is configured to determine, in the physical downlink shared channels received by the receiving unit d1, a physical downlink shared channel for carrying first carrier information.

The acquiring unit d3 is configured to acquire the first carrier information from the physical downlink shared channel determined by the determining unit d2, where the first carrier information includes the carrier status of the carrier, and the carrier status is an activated state or a deactivated state.

The communications unit d4 is configured to perform communication on the carrier according to the first carrier information acquired by the acquiring unit d3.

Further, the carrier status, included in the first carrier information, of the carrier includes: a carrier status of a carrier of the base station and/or a carrier status of a carrier of another base station.

Figure 19:
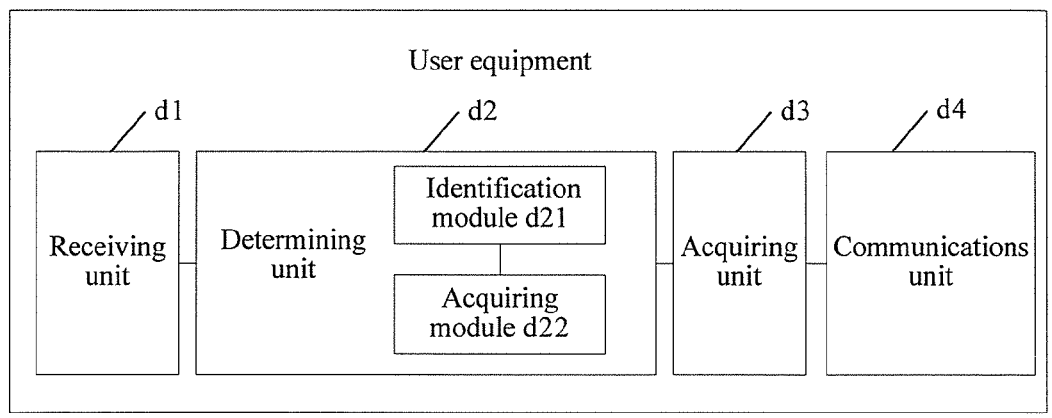
FIG. 19 is a schematic composition diagram of another user equipment in Embodiment 12 of the present invention.

Further, as shown in FIG. 19, the determining unit d2 may include: an identification module d21 and an acquiring module d22.

The identification module d21 is configured to descramble a cyclic redundancy check CRC of a downlink physical control channel by using a carrier activation radio network temporary identifier RNTI, to identify the downlink physical control channel for carrying downlink control information.

The acquiring module d22 is configured to: acquire the downlink control information carried by the downlink physical control channel identified by the identification module d21, and determine, according to the downlink control information, the physical downlink shared channel for carrying the first carrier information.

The downlink control information acquired by the acquiring module d22 is used to indicate the physical downlink shared channel for carrying the first carrier information.

Figure 20:
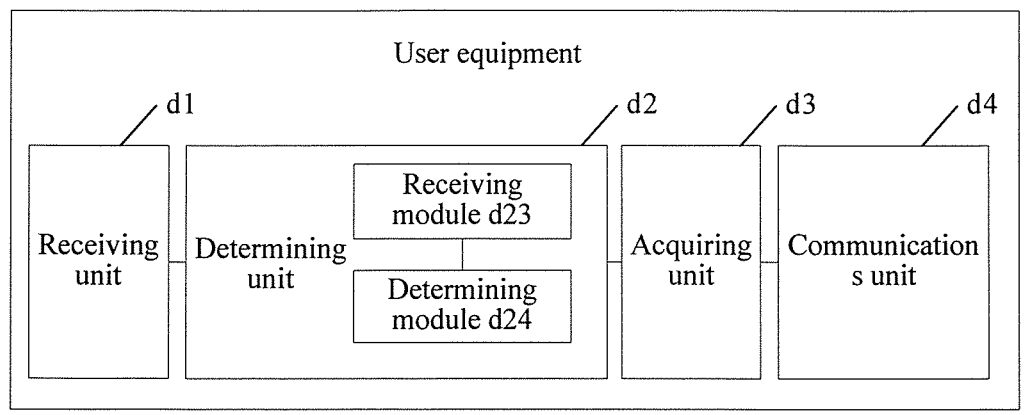
FIG. 20 is a schematic composition diagram of another user equipment in Embodiment 12 of the present invention.

Further, as shown in FIG. 20, the determining unit d2 may include: a receiving module d23 and a determining module d24.

The receiving module d23 is configured to receive a physical broadcast channel.

The determining module d24 is configured to determine, according to the physical broadcast channel received by the receiving module, the physical downlink shared channel for carrying the first carrier information.

The physical broadcast channel received by the receiving module d23 is used to indicate the physical downlink shared channel for carrying the first carrier information.

Further, the acquiring unit d3 is further configured to descramble the determined physical downlink shared channel by using the carrier activation RNTI, to acquire the first carrier information.

Further, the carrier acquired by the acquiring unit d3 is all carriers, whose carrier statuses can change, of the base station and/or the other base station.

The receiving unit d1 is further configured to: before the communications unit d4 performs communication on the carrier according to the first carrier information, acquire a carrier sequence number that is of each carrier in all the carriers and that is indicated by the base station to the user equipment by means of broadcasting.

Alternatively, the receiving unit d1 is further configured to: before the communications unit d4 performs communication on the carrier according to the first carrier information, receive dedicated signaling sent by the base station, where the dedicated signaling carries a carrier sequence number of each carrier in all the carriers.

The carrier sequence number received by the receiving unit d1 is a sequence number configured for each carrier, each carrier has a different carrier sequence number, and the carrier sequence number and the carrier identified by the carrier sequence number are uniform for all user equipments served by the base station.

Further, the carrier sequence number received by the receiving unit d1 is identified according to a central frequency of the carrier corresponding to the carrier sequence number, and/or, the carrier sequence number received by the receiving unit d1 is identified according to a physical identifier of the carrier corresponding to the carrier sequence number.

Further, the carrier status, included in the first carrier information acquired by the acquiring unit d3, of the carrier is carrier statuses of all the carriers.

Further, the receiving unit d1 is further configured to: before the communications unit d4 performs communication on the carrier according to the first carrier information, receive first signaling sent by the base station, where the first signaling carries a quantity of carriers whose carrier statuses have changed.

The carrier status, included in the first carrier information acquired by the acquiring unit d3, of the carrier is the carrier statuses of the carriers whose carrier statuses have changed.

Further, the receiving unit d1 is further configured to: before the determining unit d2 determines the physical downlink shared channel for carrying the first carrier information, receive instruction information that is sent by the base station by using higher layer signaling, where the instruction information is used to instruct the user equipment to detect the downlink physical control channel for indicating the physical downlink shared channel or the physical broadcast channel for indicating the physical downlink shared channel.

The determining unit d2 is further configured to detect the downlink physical control channel or the physical broadcast channel according to the instruction information received by the receiving unit d1, to determine the physical downlink shared channel for carrying the first carrier information.

Further, the receiving unit d1 is further configured to: before receiving the physical downlink shared channel, receive the downlink control information that is repeatedly encoded on the downlink physical control channel.

Alternatively, the receiving unit d1 is further configured to: before receiving the physical downlink shared channel, receive the downlink control information that is encoded by using a first coding bit rate on the downlink physical control channel, where the first coding bit rate is lower than a second coding bit rate, and the second coding bit rate is a common coding bit rate.

Alternatively, the receiving unit d1 is further configured to: before receiving the physical downlink shared channel, receive, from the base station, multiple pieces of the downlink control information that is encoded.

Further, the downlink physical control channel includes: a physical downlink control channel PDCCH or an enhanced physical downlink control channel E-PDCCH.

Further, the carrier status acquired by the receiving unit d3 is the activated state or the deactivated state.

The communications unit d4 is further configured to: if the carrier status is the activated state, transmit a sounding reference signal SRS on the carrier, where the SRS is used for channel state detection; and/or, generate a channel state information CSI report on the carrier, where the CSI includes at least a channel quality indicator CQI, a precoding matrix indicator PMI, and a rank indication RI; and/or, detect a downlink physical control channel of the carrier; and/or, detect a downlink physical control channel that indicates a scheduling result on the carrier.

Further, the communication unit d4 is configured to: if the carrier status is the deactivated state, stop transmitting an SRS on the carrier; and/or, stop generating a CSI report on the carrier, where the CSI includes at least a CQI, a PMI, and an RI; and/or, stop detecting a downlink physical control channel of the carrier; and/or, stop detecting a downlink physical control channel that indicates a scheduling result on the carrier, and/or, stop transmitting a random access channel RACH signal on the carrier; and/or, stop transmitting an uplink shared channel on the carrier.

In the foregoing solution, user equipment may acquire first carrier information from a physical downlink shared channel, and perform communication on the carrier according to the first carrier information. Compared with the prior art in which an activated state or a deactivated state of the carrier is indicated to the user equipment by using a MAC CE, in the solution, the carrier status is acquired by the user equipment by using the physical downlink shared channel, which has a smaller delay and lower network load. Therefore, a delay of indicating the activated state or deactivated state of the carrier can be reduced, and efficiency of indicating the activated state or deactivated state of the carrier can be improved.

Embodiment 13

Figure 21:
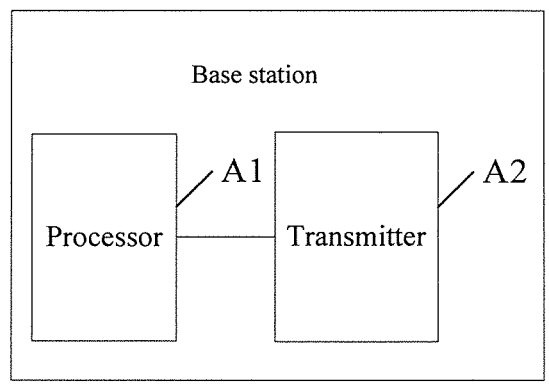
FIG. 21 is a schematic composition diagram of a base station in Embodiment 13 of the present invention.

This embodiment of the present invention provides a base station. As shown in FIG. 21, the base station includes a processor A1 and a transmitter A2.

The processor A1 is configured to determine a carrier status of a carrier, where the carrier status determined by the processor A1 is an activated state or a deactivated state.

The transmitter A2 is configured to indicate first carrier information to user equipment by using a downlink physical control channel, where the first carrier information sent by the transmitter A2 includes the carrier status, determined by the processor A1, of the carrier, and the first carrier information sent by the transmitter A2 is used to enable the user equipment to perform communication on the carrier according to the carrier status.

Further, the carrier status, included in the first carrier information, of the carrier includes: a carrier status of a carrier of the base station and/or a carrier status of a carrier of another base station.

Further, the transmitter A2 is further configured to indicate the first carrier information to the user equipment by using downlink control information carried by the downlink physical control channel.

The downlink control information sent by the transmitter A2 is downlink control information that is obtained by scrambling a cyclic redundancy check CRC of the downlink physical control channel by using a carrier activation radio network temporary identifier RNTI, and the carrier activation RNTI is an RNTI that is used to identify the downlink physical control channel carrying the first carrier information and that is configured by the base station for the user equipment.

Further, the carrier sent by the transmitter A2 is all carriers, whose carrier statuses can change, of the base station and/or the other base station.

The transmitter A2 is further configured to: before indicating the first carrier information to the user equipment by using the downlink physical control channel, indicate a carrier sequence number of each carrier in all the carriers to the user equipment by means of broadcasting.

Alternatively, the transmitter A2 is further configured to: before indicating the first carrier information to the user equipment by using the downlink physical control channel, send a carrier sequence number of each carrier in all the carriers to the user equipment by using dedicated signaling.

The carrier sequence number sent by the transmitter A2 is a sequence number configured for each carrier, each carrier has a different carrier sequence number, and the carrier sequence number and the carrier identified by the carrier sequence number are uniform for all user equipments served by the base station.

Further, the carrier sequence number sent by the transmitter A2 is identified according to a central frequency of the carrier corresponding to the carrier sequence number, and/or, the carrier sequence number sent by the transmitter A2 is identified according to a physical identifier of the carrier corresponding to the carrier sequence number.

Further, the carrier status, included in the first carrier information sent by the transmitter A2, of the carrier is carrier statuses of all the carriers.

Further, the user equipment is multiple user equipments, the carrier status, included in the first carrier information sent by the transmitter A2, of the carrier is carrier statuses of all carriers whose carrier statuses can change, where all the carriers whose carrier statuses can change are directed, in the base station, against each user equipment in the multiple user equipments.

Further, the transmitter A2 is further configured to: before indicating the first carrier information to the user equipment by using the downlink physical control channel, indicate, to the user equipment by using second signaling, a quantity of carriers whose carrier statuses have changed.

The carrier status, included in the first carrier information sent by the transmitter A2, of the carrier is the carrier statuses of the carriers whose carrier statuses have changed.

Further, the downlink control information sent by the transmitter A2 is a downlink control information DCI format 3 or 3A; and a transmit power control TPC command in the DCI format 3 or 3A is also used for indicating the carrier status of the carrier.

Further, the transmitter A2 is further configured to indicate the first carrier information of the carrier of each user equipment in the multiple user equipments to the multiple user equipments by using multiple TPC commands in the downlink control information carried by the downlink physical control channel.

Further, the transmitter A2 is further configured to: before indicating the first carrier information to the user equipment by using the downlink physical control channel, notify each user equipment of a carrier activation index by using first signaling, where the carrier activation index is used to indicate a location, in the downlink control information, of the first carrier information of the carrier of each user equipment.

Further, the carrier status of the carrier sent by the transmitter A2 is identified by means of a bitmap; or the carrier status of the carrier sent by the transmitter A2 is encoded in unified encoding mode.

Further, the transmitter A2 is further configured to: before indicating the first carrier information to the user equipment by using the downlink physical control channel, send instruction information to the user equipment by using higher layer signaling, where the instruction information is used to instruct the user equipment to determine, by means of detection, the downlink physical control channel for indicating the first carrier information.

Further, the processor A1 is further configured to: before the transmitter A2 indicates the first carrier information to the user equipment by using the downlink physical control channel, encode the downlink control information.

The processor A1 is further configured to repeatedly encode the downlink control information.

Alternatively, the processor A1 is further configured to encode the downlink control information by using a first coding bit rate, where the first coding bit rate is lower than a second coding bit rate, and the second coding bit rate is a common coding bit rate.

Alternatively, the transmitter A2 is further configured to repeatedly send the downlink control information encoded by the processor A1 to the user equipment.

Further, the downlink physical control channel includes: a physical downlink control channel PDCCH or an enhanced physical downlink control channel E-PDCCH.

The base station in the foregoing solution may indicate first carrier information to user equipment by using a downlink physical control channel, where the first carrier information includes a carrier status of the carrier, so that the user equipment performs communication on the carrier according to the carrier status of the carrier. Compared with the prior art in which an activated state or a deactivated state of the carrier is indicated to the user equipment by using a MAC CE, in the solution, the carrier status is broadcast to the user equipment by using the downlink physical control channel, which has a smaller delay and lower network load. Therefore, a delay of indicating the activated state or deactivated state of the carrier can be reduced, and efficiency of indicating the activated state or deactivated state of the carrier can be improved.

Embodiment 14

Figure 22:
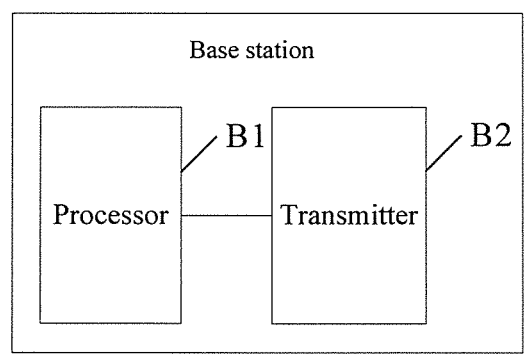
FIG. 22 is a schematic composition diagram of a base station in Embodiment 14 of the present invention.

This embodiment of the present invention further provides a base station. As shown in FIG. 22, the base station includes a processor B1 and a transmitter B2.

The processor B1 is configured to determine a carrier status of a carrier, where the carrier status determined by the processor B1 is an activated state or a deactivated state.

The transmitter B2 is configured to indicate first carrier information to user equipment by using a physical downlink shared channel that is indicated by a physical broadcast channel or by downlink control information, where the downlink control information sent by the transmitter B2 is carried by a downlink physical control channel.

The first carrier information sent by the transmitter B2 includes the carrier status, determined by the processor B1, of the carrier, the first carrier information is used to enable the user equipment to perform communication on the carrier according to the carrier status, the downlink control information sent by the transmitter B2 is obtained by scrambling a cyclic redundancy check CRC of the downlink physical control channel by using a carrier activation radio network temporary identifier RNTI; the first carrier information is obtained by means of scrambling using the carrier activation RNTI; and the carrier activation RNTI is an RNTI that is used to identify the downlink physical control channel carrying the downlink control information and that is configured by the base station for the user equipment, and an RNTI that is used to identify the first carrier information on the physical downlink shared channel and that is configured by the base station for the user equipment.

Further, the carrier status, included in the first carrier information, of the carrier includes: a carrier status of a carrier of the base station and/or a carrier status of a carrier of another base station.

Further, the carrier sent by the transmitter B2 is all carriers, whose carrier statuses can change, of the base station and/or the other base station.

The transmitter B2 is further configured to: before indicating the first carrier information to the user equipment by using the physical downlink shared channel that is indicated by the physical broadcast channel or by the downlink control information, indicate a carrier sequence number of each carrier in all the carriers to the user equipment by means of broadcasting.

Alternatively, the transmitter B2 is further configured to: before indicating the first carrier information to the user equipment by using the physical downlink shared channel that is indicated by the physical broadcast channel or by the downlink control information, send a carrier sequence number of each carrier in all the carriers to the user equipment by using dedicated signaling.

The carrier sequence number sent by the transmitter B2 is a sequence number configured for each carrier, each carrier has a different carrier sequence number, and the carrier sequence number and the carrier identified by the carrier sequence number are uniform for all user equipments served by the base station.

Further, the carrier sequence number sent by the transmitter B2 is identified according to a central frequency of the carrier corresponding to the carrier sequence number; and/or, the carrier sequence number sent by the transmitter B2 is identified according to a physical identifier of the carrier corresponding to the carrier sequence number.

Further, the carrier status, included in the first carrier information sent by the transmitter B2, of the carrier is carrier statuses of all the carriers.

Further, the transmitter B2 is further configured to: before indicating the first carrier information to the user equipment by using the physical downlink shared channel that is indicated by the physical broadcast channel or by the downlink control information, indicate, to the user equipment by using first signaling, a quantity of carriers whose carrier statuses have changed.

The carrier status, included in the first carrier information sent by the transmitter B2, of the carrier is the carrier statuses of the carriers whose carrier statuses have changed.

Further, the transmitter B2 is further configured to: before indicating the first carrier information to the user equipment by using the physical downlink shared channel that is indicated by the physical broadcast channel or by the downlink control information, send instruction information to the user equipment by using higher layer signaling, where the instruction information sent by the transmitter B2 is used to instruct the user equipment to detect the physical downlink shared channel for indicating the first carrier information.

Further, the processor B1 is further configured to: before the transmitter B2 indicates the first carrier information to the user equipment by using the physical downlink shared channel that is indicated by the downlink control information, encode the downlink control information.

The processor B1 is further configured to repeatedly encode the downlink control information.

Alternatively, the processor B1 is further configured to encode the downlink control information by using a first coding bit rate, where the first coding bit rate is lower than a second coding bit rate, and the second coding bit rate is a common coding bit rate.

Alternatively, the transmitter B2 is further configured to repeatedly send the downlink control information encoded by the processor B1 to the user equipment.

Further, the downlink physical control channel includes: a physical downlink control channel PDCCH or an enhanced physical downlink control channel E-PDCCH.

In the foregoing solution, a base station may indicate first carrier information to user equipment by using a physical downlink shared channel, where the first carrier information includes a carrier status of a carrier, so that the user equipment performs communication on the carrier according to the carrier status of the carrier. Compared with the prior art in which an activated state or a deactivated state of the carrier is indicated to the user equipment by using a MAC CE, in the solution, the carrier status is broadcast to the user equipment by using the physical downlink shared channel, which has a smaller delay and lower network load. Therefore, a delay of indicating the activated state or deactivated state of the carrier can be reduced, and efficiency of indicating the activated state or deactivated state of the carrier can be improved.

Embodiment 15

Figure 23:
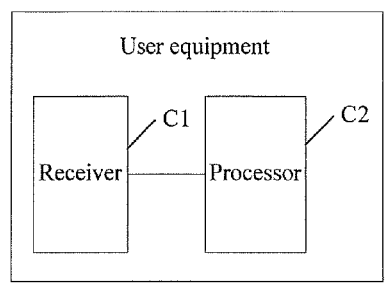
FIG. 23 is a schematic composition diagram of user equipment in Embodiment 15 of the present invention.

This embodiment of the present invention further provides user equipment. As shown in FIG. 23, the user equipment includes a receiver C1, and a processor C2.

The receiver C1 is configured to receive a downlink physical control channel sent by a base station, where the downlink physical control channel includes first carrier information, the first carrier information received by the receiver C1 includes a carrier status of a carrier, and the carrier status is an activated state or a deactivated state.

Further, the carrier status, included in the first carrier information, of the carrier includes: a carrier status of a carrier of the base station and/or a carrier status of a carrier of another base station.

The processor C2 is configured to perform communication on the carrier according to the first carrier information received by the receiver C1.

Further, the processor C2 is further configured to descramble a cyclic redundancy check CRC of the downlink physical control channel by using a carrier activation radio network temporary identifier RNTI, to identify the downlink physical control channel for carrying the first carrier information; and acquire the downlink control information carried by the identified downlink physical control channel, where the downlink control information includes the first carrier information.

The carrier activation RNTI is an RNTI that is used to identify the downlink physical control channel carrying the first carrier information and that is configured by the base station for the user equipment.

Further, the carrier received by the receiver C1 is all carriers, whose carrier statuses can change, of the base station and/or the other base station.

The receiver C1 is further configured to: before receiving the downlink physical control channel sent by the base station, acquire a carrier sequence number that is of each carrier in all the carriers and that is indicated by the base station to the user equipment by means of broadcasting.

Alternatively, the receiver C1 is further configured to: before receiving the downlink physical control channel sent by the base station, receive dedicated signaling sent by the base station, where the dedicated signaling carries a carrier sequence number of each carrier in all the carriers.

The carrier sequence number received by the receiver C1 is a sequence number configured for each carrier, each carrier has a different carrier sequence number, and the carrier sequence number and the carrier identified by the carrier sequence number are uniform for all user equipments served by the base station.

Further, the carrier sequence number received by the receiver C1 is identified according to a central frequency of the carrier corresponding to the carrier sequence number, and/or, the carrier sequence number received by the receiver C1 is identified according to a physical identifier of the carrier corresponding to the carrier sequence number.

Further, the carrier status, included in the first carrier information received by the receiver C1, of the carrier is carrier statuses of all the carriers.

Further, the carrier status, included in the first carrier information received by the receiver C1, of the carrier is: carrier statuses of all carriers whose carrier statuses can change, which are directed against the user equipment and among all carriers whose carrier statuses can change.

Further, the receiver C1 is further configured to: before receiving the downlink physical control channel sent by the base station, where the downlink physical control channel includes the first carrier information, receive second signaling sent by the base station, where the second signaling received by the receiver C1 carries a quantity of carriers whose carrier statuses have changed.

The carrier status, included in the first carrier information received by the receiver C1, of the carrier is the carrier statuses of the carriers whose carrier statuses have changed.

Further, the downlink control information received by the receiver C1 is a downlink control information DCI format 3 or 3A; and a transmit power control TPC command in the DCI format 3 or 3A is also used for indicating the carrier status of the carrier.

Further, the receiver C1 is further configured to: receive the downlink control information carried by the downlink physical control channel, and acquire the TPC command in the downlink control information, where the TPC command received by the receiver C1 is used for indicating the first carrier information of the carrier of the user equipment.

Further, the receiver C1 is further configured to: before receiving the downlink physical control channel sent by the base station, where the downlink physical control channel includes the first carrier information, receive first signaling sent by the base station, where the first signaling received by the receiver C1 carries a carrier activation index.

The processor C2 is further configured to determine a location, in the downlink control information, of the first carrier information of the carrier of the user equipment according to an indication of the carrier activation index received by the receiver C1.

Further, the processor C2 is further configured to: after the receiver C1 receives the downlink physical control channel sent by the base station, where the downlink physical control channel includes the first carrier information, determine the carrier status of the carrier by means of a bitmap, where the carrier status of the carrier received by the receiver C1 is identified by the base station by means of a bitmap.

Alternatively, the processor C2 is further configured to: after the receiver C1 receives the downlink physical control channel sent by the base station, where the downlink physical control channel includes the first carrier information, determine the carrier status of the carrier in unified decoding mode, where the carrier status of the carrier received by the receiver C1 is encoded by the base station in unified encoding mode corresponding to the unified decoding mode.

The carrier status received by the receiver C1 is the activated state or the deactivated state.

Further, the receiver C1 is further configured to: before receiving the downlink physical control channel sent by the base station, receive instruction information that is sent by the base station by using higher layer signaling.

The processor C2 is further configured to detect downlink physical control channels according to the instruction information received by the receiver C1, to determine the downlink physical control channel for indicating the first carrier information.

The instruction information received by the receiver C1 is used to instruct the user equipment to detect the downlink physical control channel for indicating the first carrier information.

Further, the receiver C1 is further configured to receive the downlink control information that is repeatedly encoded on the downlink physical control channel.

Alternatively, the receiver C1 is further configured to receive the downlink control information that is encoded by using a first coding bit rate on the downlink physical control channel, where the first coding bit rate is lower than a second coding bit rate, and the second coding bit rate is a common coding bit rate.

Alternatively, the receiver C1 is further configured to receive, from the base station, multiple pieces of the downlink control information that is encoded.

Further, the downlink physical control channel includes: a physical downlink control channel PDCCH or an enhanced physical downlink control channel E-PDCCH.

Further, the carrier status received by the receiver C1 is the activated state or the deactivated state.

The processor C2 is further configured to: if the carrier status is the activated state, transmit a sounding reference signal SRS on the carrier, where the SRS is used for channel state detection; and/or, generate a channel state information CSI report on the carrier, where the CSI includes at least a channel quality indicator CQI, a precoding matrix indicator PMI, and a rank indication RI; and/or, detect a downlink physical control channel of the carrier; and/or, detect a downlink physical control channel that indicates a scheduling result on the carrier.

The processor C2 is further configured to: if the carrier status is the deactivated state, stop transmitting an SRS on the carrier; and/or, stop generating a CSI report on the carrier, where the CSI includes at least a CQI, a PMI, and an RI; and/or, stop detecting a downlink physical control channel of the carrier; and/or, stop detecting a downlink physical control channel that indicates a scheduling result on the carrier, and/or, stop transmitting a random access channel RACH signal on the carrier; and/or, stop transmitting an uplink shared channel on the carrier.

In the foregoing solution, user equipment may acquire first carrier information from a downlink physical control channel, and perform communication on the carrier according to the first carrier information. Compared with the prior art in which an activated state or a deactivated state of the carrier is indicated to the user equipment by using a MAC CE, in the solution, the carrier status is acquired by the user equipment by using the downlink physical control channel, which has a smaller delay and lower network load. Therefore, a delay of indicating the activated state or deactivated state of the carrier can be reduced, and efficiency of indicating the activated state or deactivated state of the carrier can be improved.

Embodiment 16

Figure 24:
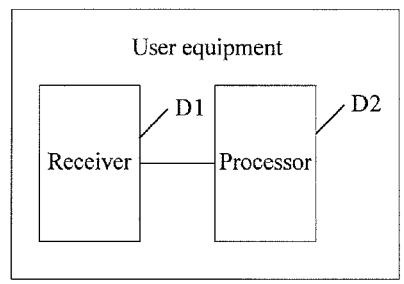
FIG. 24 is a schematic composition diagram of user equipment in Embodiment 16 of the present invention.

This embodiment of the present invention further provides user equipment. As shown in FIG. 24, the user equipment includes a receiver D1, and a processor D2.

The receiver D1 is configured to receive physical downlink shared channels.

The processor D2 is configured to determine, in the physical downlink shared channels received by the receiver D1, a physical downlink shared channel for carrying first carrier information; acquire the first carrier information from the determined physical downlink shared channel, where the first carrier information includes the carrier status of the carrier, and the carrier status received by the receiver D1 is an activated state or a deactivated state; and perform communication on the carrier according to the first carrier information.

Further, the carrier status, included in the first carrier information, of the carrier includes: a carrier status of a carrier of the base station and/or a carrier status of a carrier of another base station.

Further, the processor D2 is further configured to: descramble a cyclic redundancy check CRC of a downlink physical control channel by using a carrier activation radio network temporary identifier RNTI, to identify the downlink physical control channel for carrying downlink control information; and acquire the downlink control information carried by the identified downlink physical control channel, and determine, according to the downlink control information, the physical downlink shared channel for carrying the first carrier information.

The downlink control information received by the receiver D1 is used to indicate the physical downlink shared channel for carrying the first carrier information.

Further, the receiver D1 is further configured to receive a physical broadcast channel.

The processor D2 is further configured to determine, according to the physical broadcast channel received by the receiver D1, the physical downlink shared channel for carrying the first carrier information.

The physical broadcast channel is used to indicate the physical downlink shared channel for carrying the first carrier information.

Further, the processor D2 is further configured to descramble the determined physical downlink shared channel by using the carrier activation RNTI, to acquire the first carrier information.

Further, the carrier received by the receiver D1 is all carriers, whose carrier statuses can change, of the base station and/or the other base station.

The receiver D1 is further configured to: before the processor D2 performs communication on the carrier according to the first carrier information, acquire a carrier sequence number that is of each carrier in all the carriers and that is indicated by the base station to the user equipment by means of broadcasting.

Alternatively, the receiver D1 is further configured to: before the processor D2 performs communication on the carrier according to the first carrier information, receive dedicated signaling sent by the base station, where the dedicated signaling carries a carrier sequence number of each carrier in all the carriers.

The carrier sequence number received by the receiver D1 is a sequence number configured for each carrier, each carrier has a different carrier sequence number, and the carrier sequence number and the carrier identified by the carrier sequence number are uniform for all user equipments served by the base station.

Further, the carrier sequence number received by the receiver D1 is identified according to a central frequency of the carrier corresponding to the carrier sequence number, and/or, the carrier sequence number received by the receiver D1 is identified according to a physical identifier of the carrier corresponding to the carrier sequence number.

Further, the carrier status, included in the first carrier information received by the receiver D1, of the carrier is carrier statuses of all the carriers.

Further, the receiver D1 is further configured to: before the processor D2 performs communication on the carrier according to the first carrier information, receive first signaling sent by the base station, where the first signaling carries a quantity of carriers whose carrier statuses have changed.

The carrier status, included in the first carrier information received by the receiver D1, of the carrier is the carrier statuses of the carriers whose carrier statuses have changed.

Further, the receiver D1 is further configured to: before the processor D2 determines the physical downlink shared channel for carrying the first carrier information, receive instruction information that is sent by the base station by using higher layer signaling, where the instruction information received by the receiver D1 is used to instruct the user equipment to detect the downlink physical control channel for indicating the physical downlink shared channel or the physical broadcast channel for indicating the physical downlink shared channel.

The processor D2 is further configured to detect the downlink physical control channel or the physical broadcast channel according to the instruction information received by the receiver D1, to determine the physical downlink shared channel for carrying the first carrier information.

Further, the receiver D1 is further configured to: before receiving the physical downlink shared channel, receive the downlink control information that is repeatedly encoded on the downlink physical control channel.

Alternatively, the receiver D1 is further configured to: before receiving the physical downlink shared channel, receive the downlink control information that is encoded by using a first coding bit rate on the downlink physical control channel, where the first coding bit rate is lower than a second coding bit rate, and the second coding bit rate is a common coding bit rate.

Alternatively, the receiver D1 is further configured to: before receiving the physical downlink shared channel, receive, from the base station, multiple pieces of the downlink control information that is encoded.

Further, the downlink physical control channel includes: a physical downlink control channel PDCCH or an enhanced physical downlink control channel E-PDCCH.

Further, the carrier status received by the receiver D1 is the activated state or the deactivated state.

The processor D2 is further configured to: if the carrier status is the activated state, transmit a sounding reference signal SRS on the carrier, where the SRS is used for channel state detection; and/or, generate a channel state information CSI report on the carrier, where the CSI includes at least a channel quality indicator CQI, a precoding matrix indicator PMI, and a rank indication RI; and/or, detect a downlink physical control channel of the carrier, and/or, detect a downlink physical control channel that indicates a scheduling result on the carrier.

Further, the processor D2 is further configured to: if the carrier status is the deactivated state, stop transmitting an SRS on the carrier; and/or, stop generating a CSI report on the carrier, where the CSI includes at least a CQI, a PMI, and an RI; and/or, stop detecting a downlink physical control channel of the carrier; and/or, stop detecting a downlink physical control channel that indicates a scheduling result on the carrier, and/or, stop transmitting a random access channel RACH signal on the carrier; and/or, stop transmitting an uplink shared channel on the carrier.

In the foregoing solution, user equipment may acquire first carrier information from a physical downlink shared channel, and perform communication on the carrier according to the first carrier information. Compared with the prior art in which an activated state or a deactivated state of the carrier is indicated to the user equipment by using a MAC CE, in the solution, the carrier status is acquired by the user equipment by using the physical downlink shared channel, which has a smaller delay and lower network load. Therefore, a delay of indicating the activated state or deactivated state of the carrier can be reduced, and efficiency of indicating the activated state or deactivated state of the carrier can be improved.

According to the description about the foregoing implementation manners, it may be clearly understood by a person skilled in the art that, for the purpose of convenient and brief description, division of the foregoing functional modules is used as an example for illustration. In actual application, the foregoing functions can be allocated to different functional modules and implemented according to a requirement, that is, an inner structure of an apparatus is divided into different functional modules to implement all or some of the functions described above. For a detailed working process of the foregoing system, apparatus, and unit that are described above, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiments are merely exemplary. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or some of the technical solutions may be implemented in the form of a software product. The software product is stored in a storage medium and includes several instructions for instructing a computer device (which may be a personal computer, a server, or a network device) or a processor to perform all or some of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A carrier status indication method, comprising:
   determining, by a base station, a carrier status of a carrier, wherein the carrier status is an activated state or a deactivated state, the carrier status is determined according to channel state information (CSI) of user equipment, and the CSI includes at least a channel quality indicator (CQI), a precoding matrix indicator (PMI), and a rank indication RI; and indicating, by the base station, first carrier information to the user equipment by using downlink control information carried by a downlink physical control channel, wherein the first carrier information comprises the carrier status of the carrier, the downlink control information is downlink control information obtained by scrambling a cyclic redundancy check (CRC) of the downlink physical control channel by using a carrier activation radio network temporary identifier (RNTI) used to identify the downlink physical control channel carrying the first carrier information and that is configured by the base station for the user equipment, the downlink physical control channel comprises a physical downlink control channel (PDCCH) or an enhanced physical downlink control channel (E-PDCCH), and the first carrier information is used to enable the user equipment to perform communication on the carrier according to the carrier status.

2. The method according to claim 1, wherein:
the carrier status of the carrier is identified by means of a bitmap; or
the carrier status of the carrier is encoded in unified encoding mode.

3. A carrier status indication method, comprising:
receiving, by user equipment, downlink control information carried by a downlink physical control channel sent by a base station, wherein:
the downlink physical control channel comprises first carrier information,
the first carrier information comprises a carrier status of a carrier,
the carrier status is determined according to channel state information (CSI) of the user equipment, and the CSI includes at least a channel quality indicator (CQI), a precoding matrix indicator (PMI), and a rank indication RI,
the downlink control information is downlink control information obtained by scrambling a cyclic redundancy check (CRC) of the downlink physical control channel by using a carrier activation radio network temporary identifier (RNTI) used to identify the downlink physical control channel carrying the first carrier information and that is configured by the base station for the user equipment,
the downlink physical control channel comprises a physical downlink control channel (PDCCH) or an enhanced physical downlink control channel (E-PDCCH), and
the carrier status is an activated state or a deactivated state; and
performing, by the user equipment, communication on the carrier according to the first carrier information.

4. The method according to claim 3, wherein receiving, by user equipment, a downlink physical control channel sent by a base station, wherein the downlink physical control channel comprises first carrier information, comprises:
descrambling, by the user equipment, a cyclic redundancy check (CRC) of the downlink physical control channel by using the carrier activation RNTI, to identify the downlink physical control channel for carrying the first carrier information; and
acquiring, by the user equipment, the downlink control information carried by the identified downlink physical control channel, wherein the downlink control information comprises the first carrier information.

5. The method according to claim 3, wherein the carrier status of the carrier comprises: carrier statuses of all carriers whose carrier statuses can change, which are directed against the user equipment and among all carriers whose carrier statuses can change.

6. The method according to claim 5, wherein:
the carrier status is the activated state or the deactivated state; and
if the carrier status is the activated state, performing, by the user equipment, communication on the carrier according to the first carrier information comprises:
transmitting, by the user equipment, a sounding reference signal (SRS) on the carrier, wherein the SRS is used for channel state detection; and/or
generating, by the user equipment, a CSI report on the carrier; and/or
detecting, by the user equipment, a downlink physical control channel of the carrier; and/or
detecting, by the user equipment, a downlink physical control channel that indicates a scheduling result on the carrier.

7. The method according to claim 3, wherein:
the carrier status is the activated state or the deactivated state; and
if the carrier status is the deactivated state, performing, by the user equipment, communication on the carrier according to the first carrier information comprises:
stopping, by the user equipment, transmitting a sounding reference signal (SRS) on the carrier; and/or
stopping, by the user equipment, generating a channel state information (CSI) report on the carrier, wherein the CSI comprises at least a channel quality indicator (CQI), a precoding matrix indicator (PMI), and a rank indication (RI); and/or
stopping, by the user equipment, detecting a downlink physical control channel of the carrier; and/or
stopping, by the user equipment, detecting a downlink physical control channel that indicates a scheduling result on the carrier; and/or
stopping, by the user equipment, transmitting a random access channel (RACH) signal on the carrier; and/or
stopping, by the user equipment, transmitting an uplink shared channel on the carrier.

8. A base station, comprising:
a processor configured to determine a carrier status of a carrier, wherein the carrier status is an activated state or a deactivated state; and
a transmitter configured to indicate first carrier information to user equipment by using downlink control information carried by a downlink physical control channel, wherein:
the first carrier information comprises the carrier status,
the carrier status is determined according to channel state information (CSI) of the user equipment, and the CSI includes at least a channel quality indicator (CQI), a precoding matrix indicator (PMI), and a rank indication RI,
the downlink control information is downlink control information obtained by scrambling a cyclic redundancy check (CRC) of the downlink physical control channel by using a carrier activation radio network temporary identifier (RNTI) used to identify the downlink physical control channel carrying the first carrier information and that is configured by the base station for the user equipment,
the downlink physical control channel comprises a physical downlink control channel (PDCCH) or an enhanced physical downlink control channel (E-PDCCH), and the first carrier information is used to enable the user equipment to perform communication on the carrier according to the carrier status.

9. The base station according claim 8, wherein:
the carrier status, comprised in the first carrier information indicated by the transmitter of the carrier is identified by means of a bitmap; or
the carrier status, comprised in the first carrier information indicated by the transmitter of the carrier is encoded in unified encoding mode.

10. User equipment, comprising:
a receiver configured to receive downlink control information carried by a downlink physical control channel sent by a base station, wherein:
the downlink physical control channel comprises first carrier information, the first carrier information comprises a carrier status of a carrier,
the carrier status is determined according to channel state information (CSI) of user equipment, and the CSI includes at least a channel quality indicator (CQI), a precoding matrix indicator (PMI), and a rank indication RI,
the downlink control information is downlink control information obtained by scrambling a cyclic redundancy check (CRC) of the downlink physical control channel by using a carrier activation radio network temporary identifier (RNTI) used to identify the downlink physical control channel carrying the first carrier information and that is configured by the base station for the user equipment,
the downlink physical control channel comprises a physical downlink control channel (PDCCH) or an enhanced physical downlink control channel (E-PDCCH), and
the carrier status is an activated state or a deactivated state; and
a processor configured to perform communication on the carrier according to the first carrier information received by the receiving unit.

11. The user equipment according to claim 10, wherein the receiver is further configured to:
descramble a cyclic redundancy check (CRC) of the downlink physical control channel by using the carrier activation RNTI, to identify the downlink physical control channel for carrying the first carrier information; and
acquire the downlink control information carried by the downlink physical control channel identified by the identification module, wherein the downlink control information comprises the first carrier information.

12. The user equipment according to claim 11, wherein the carrier status of the carrier comprises: carrier statuses of all carriers whose carrier statuses can change, which are directed against the user equipment and among all carriers whose carrier statuses can change.

13. The user equipment according to claim 10, wherein:
the carrier status is the activated state or the deactivated state; and
the processor is further configured to: if the carrier status is the activated state:
transmit a sounding reference signal (SRS) on the carrier, wherein the SRS is used for channel state detection, and/or
generate a channel state information (CSI) report on the carrier, wherein the CSI comprises at least a channel quality indicator (CQI), a precoding matrix indicator (PMI), and a rank indication (RI), and/or
detect a downlink physical control channel of the carrier, and/or
detect a downlink physical control channel that indicates a scheduling result on the carrier.

14. The user equipment according to claim 10, wherein:
the carrier status is the activated state or the deactivated state; and
the processor is configured to: if the carrier status is the deactivated state:
stop transmitting a sounding reference signal (SRS) on the carrier, and/or
stop generating a CSI report on the carrier, and/or
stop detecting a downlink physical control channel of the carrier, and/or
stop detecting a downlink physical control channel that indicates a scheduling result on the carrier, and/or
stop transmitting a random access channel (RACH) signal on the carrier, and/or
stop transmitting an uplink shared channel on the carrier.

* * * * *